(12) United States Patent
Thompson et al.

(10) Patent No.: US 11,740,377 B2
(45) Date of Patent: Aug. 29, 2023

(54) SPECTRAL ANALYSIS AND MACHINE LEARNING FOR DETERMINING CLUSTER EFFICIENCY DURING FRACKING OPERATIONS

(71) Applicant: Origin Rose LLC, Boulder, CO (US)

(72) Inventors: Reid Daniel Thompson, Edmond, OK (US); Jeffrey Neal Rose, Boulder, CO (US); Jonathan Swanson Rose, Boulder, CO (US)

(73) Assignee: Origin Rose LLC, Boulder, CO (US)

( * ) Notice: Subject to any disclaimer, the term of this patent is extended or adjusted under 35 U.S.C. 154(b) by 0 days.

(21) Appl. No.: 17/782,125

(22) PCT Filed: Dec. 10, 2020

(86) PCT No.: PCT/US2020/064327
§ 371 (c)(1),
(2) Date: Jun. 2, 2022

(87) PCT Pub. No.: WO2021/119324
PCT Pub. Date: Jun. 17, 2021

(65) Prior Publication Data
US 2023/0025091 A1    Jan. 26, 2023

Related U.S. Application Data

(60) Provisional application No. 63/058,534, filed on Jul. 30, 2020, provisional application No. 63/058,548, (Continued)

(51) Int. Cl.
*E21B 43/26* (2006.01)
*G01V 1/50* (2006.01)
(Continued)

(52) U.S. Cl.
CPC ............... *G01V 1/42* (2013.01); *E21B 41/00* (2013.01); *E21B 43/26* (2013.01); *E21B 47/095* (2020.05);
(Continued)

(58) Field of Classification Search
CPC ................................. E21B 43/26; G01V 1/50
See application file for complete search history.

(56) References Cited

U.S. PATENT DOCUMENTS

| 4,665,511 | A | 5/1987 | Rodney et al. |
| 4,757,873 | A | 7/1988 | Linyaev et al. |

(Continued)

FOREIGN PATENT DOCUMENTS

| EP | 2327857 B1 | 3/2014 |
| EP | 2746527 B1 | 10/2020 |

(Continued)

OTHER PUBLICATIONS

Sun Hwa Lee, "International Preliminary Report on Patentability Regarding International Patent Application No. PCT/US2020/064294", dated Jun. 23, 2022, pp. 11, Published in: CH.

(Continued)

*Primary Examiner* — Kenneth L Thompson
(74) *Attorney, Agent, or Firm* — Neugeboren O'Dowd PC

(57) ABSTRACT

This disclosure presents systems, methods, and apparatus for determining cluster efficiency during hydraulic fracturing, the method comprising: measuring acoustic vibrations in fracking fluid in a fracking wellhead, circulating fluid line, or standpipe of a well; converting the acoustic vibrations into an electrical signal in a time domain; recording the electrical signal to memory; analyzing the electrical signal in the time domain for a window of time and identifying two amplitude peaks corresponding to a fracture initiation; measuring a time between the two amplitude peaks; dividing the (Continued)

time by two to give a result; multiplying the result by a speed of sound in the fracking fluid to give a distance between the fracture initiation and a plug at an end of a current fracking stage of the well; and returning a location of the fracture initiation to an operator based on the distance between the fracture initiation and the plug.

55 Claims, 21 Drawing Sheets

Related U.S. Application Data filed on Jul. 30, 2020, provisional application No. 62/945,953, filed on Dec. 10, 2019, provisional application No. 62/945,949, filed on Dec. 10, 2019, provisional application No. 62/945,957, filed on Dec. 10, 2019, provisional application No. 62/945,929, filed on Dec. 10, 2019.

(51) Int. Cl.
　　*G01V 1/42* (2006.01)
　　*G01V 1/30* (2006.01)
　　*E21B 41/00* (2006.01)
　　*E21B 47/095* (2012.01)
　　*E21B 49/00* (2006.01)
　　*E21B 47/06* (2012.01)

(52) U.S. Cl.
　　CPC .............. *E21B 49/00* (2013.01); *G01V 1/301* (2013.01); *G01V 1/50* (2013.01); *E21B 47/06* (2013.01); *E21B 2200/22* (2020.05); *G01V 2210/646* (2013.01)

(56) References Cited

U.S. PATENT DOCUMENTS

| | | |
|---|---|---|
| 5,031,155 A | 7/1991 | Hsu |
| 5,130,950 A | 7/1992 | Orban et al. |
| 5,170,378 A * | 12/1992 | Mellor .................. E21B 49/008 73/152.58 |
| 5,214,251 A | 5/1993 | Orban et al. |
| 5,235,984 A | 8/1993 | D'Sa |
| 5,341,345 A | 8/1994 | Warner et al. |
| 5,459,697 A | 10/1995 | Chin et al. |
| 5,515,336 A | 5/1996 | Chin et al. |
| 5,753,812 A | 5/1998 | Aron et al. |
| 5,995,447 A | 11/1999 | Mandal et al. |
| 6,002,639 A | 12/1999 | Birchak et al. |
| 6,088,294 A | 7/2000 | Leggett, III et al. |
| 6,213,250 B1 | 4/2001 | Wisniewski et al. |
| 6,366,531 B1 | 4/2002 | Varsamis et al. |
| 6,564,899 B1 | 5/2003 | Arian et al. |
| 6,672,163 B2 | 1/2004 | Han et al. |
| 6,995,500 B2 | 2/2006 | Yogeswaren |
| 7,036,363 B2 | 5/2006 | Yogeswaren |
| 7,075,215 B2 | 7/2006 | Yogeswaren |
| 7,339,494 B2 | 3/2008 | Shah et al. |
| 7,460,435 B2 | 12/2008 | Garcia-Osuna et al. |
| 7,513,147 B2 | 4/2009 | Yogeswaren |
| 7,587,936 B2 | 9/2009 | Han |
| 7,819,188 B2 * | 10/2010 | Auzerais ................ E21B 47/107 166/250.1 |
| 7,999,695 B2 | 8/2011 | Rodney et al. |
| 8,162,050 B2 | 4/2012 | Roddy et al. |
| 8,818,779 B2 | 8/2014 | Sadlier et al. |
| 8,898,044 B2 | 11/2014 | Craig |
| 9,194,967 B2 | 11/2015 | Lacazette |
| 9,477,002 B2 * | 10/2016 | Miller .................. E21B 33/124 |
| 9,557,434 B2 | 1/2017 | Keller et al. |
| 9,567,819 B2 | 2/2017 | Cavender et al. |
| 9,988,900 B2 | 6/2018 | Kampfer et al. |
| 10,030,497 B2 | 7/2018 | Dawson et al. |
| 10,385,670 B2 | 8/2019 | James et al. |
| 10,392,916 B2 * | 8/2019 | Moos ..................... E21B 43/263 |
| 10,400,584 B2 * | 9/2019 | Palomarez .............. E21B 43/26 |
| 10,415,376 B2 | 9/2019 | Song et al. |
| 10,458,233 B2 | 10/2019 | Xia |
| 10,465,505 B2 | 11/2019 | Disko et al. |
| 10,480,308 B2 | 11/2019 | Morrow et al. |
| 10,781,690 B2 | 9/2020 | Malik et al. |
| 11,313,215 B2 * | 4/2022 | Yi ........................... E21B 44/00 |
| 11,608,740 B2 * | 3/2023 | Moos ..................... E21B 43/00 |
| 2010/0118657 A1 | 5/2010 | Trinh et al. |
| 2012/0111559 A1 | 5/2012 | Deady et al. |
| 2012/0111560 A1 | 5/2012 | Hill et al. |
| 2013/0206398 A1 | 8/2013 | Tufano et al. |
| 2014/0110167 A1 | 4/2014 | Goebel et al. |
| 2014/0172306 A1 | 6/2014 | Brannigan et al. |
| 2015/0233232 A1 | 8/2015 | Rodney et al. |
| 2015/0285937 A1 | 10/2015 | Keller et al. |
| 2015/0337653 A1 | 11/2015 | Hill et al. |
| 2016/0115778 A1 | 4/2016 | van Oort et al. |
| 2017/0241221 A1 | 8/2017 | Seshadri et al. |
| 2018/0120865 A1 | 5/2018 | Nuryaningsih et al. |
| 2018/0171773 A1 | 6/2018 | Nessjoen et al. |
| 2019/0033898 A1 | 1/2019 | Shah et al. |
| 2019/0120044 A1 | 4/2019 | Langnes et al. |
| 2019/0120047 A1 | 4/2019 | Jin et al. |
| 2019/0203585 A1 | 7/2019 | Nguyen et al. |
| 2019/0242253 A1 | 8/2019 | Felkl et al. |
| 2019/0257972 A1 | 8/2019 | Palmer et al. |
| 2019/0353557 A1 | 11/2019 | Zhang et al. |
| 2021/0140312 A1 * | 5/2021 | Dumoit .................... G01V 1/46 |
| 2022/0049601 A1 * | 2/2022 | Jaaskelainen ........... E21B 47/12 |
| 2022/0186605 A1 * | 6/2022 | Quan ...................... E21B 47/06 |
| 2022/0365239 A1 * | 11/2022 | Rose ....................... E21B 49/00 |

FOREIGN PATENT DOCUMENTS

| | | |
|---|---|---|
| WO | 2016185435 A1 | 11/2016 |
| WO | 2018117890 A1 | 6/2018 |
| WO | 2018217201 A1 | 11/2018 |

OTHER PUBLICATIONS

Thomas, Shane, "International Search Report and Written Opinion Regarding International Application No. PCT/US20/64294", dated Apr. 21, 2021, pp. 13, Published in: US.

Xiaofan Tang, "International Preliminary Report on Patentability Regarding International Application No. PCT/US2020/064303", dated Jun. 23, 2022, pp. 11, Published in: CH.

Young, Lee, "International Search Report and Written Opinion Regarding International Application No. PCT/US20/06430303", dated Mar. 4, 2021, pp. 16, Published in: US.

Nora Lindner, "International Preliminary Report on Patentability Regarding International Patent No. PCT/US2020/064327", dated Jun. 23, 2022, pp. 7, Published in: CH.

Copenheaver, Blaine, "International Search Report and Written Opinion Regarding International Application No. PCT/US2020/064327", dated May 24, 2021, pp. 12, Published in: US.

Xin Wang, "International Preliminary Report on Patentability Regarding International Patent No. PCT/US2020/064314", dated Jun. 23, 2022, pp. 9, Published in: CH.

Thomas, Shane, "International Search Report and Written Opinion Regarding International Application No. PCT/US2020/64314", dated Mar. 4, 2021, pp. 15, Published in: US.

Anderson, "Fighting Water With Water How Engineers Are Turning the Tides on Frac Hits", Dec. 4, 2018, pp. 10, Publisher: Abra Controls Inc.

American Petroleum Institute, "Wellbore Pressure and Fluid Communication Associated With Hydraulic Fracturing", 2014, pp. 1-4, Publisher: American Petroleum Institute, Published in: US.

Baig et al., "Do Hydraulic Fractures Induce Events Large Enough to be Felt on Surface", CSEG Recorder, Oct. 2012, pp. 11, Publisher: Retrieved from https://csegrecorder.com/articles/view/do-

(56) References Cited

OTHER PUBLICATIONS hydraulic-fractures-induce-events-large-enough-to-be-felt-on-surface on Nov. 22, 2019, Published in: CA.

Chen et al., "Toward the Origin of Long-Period Long-Duration Seismic Events During Hydraulic Fracturing Treatmeant: a Case Study in the Shale Play of Sichuan Basin, China", Seismilogical Research Letters, Jun. 2018, pp. 1075-1083, vol. 89, No. 3.

Daneshy et al., "Fracture Shadowing: a Direct Method for Determining of HTE Reach and Propagation Pattern of Hydraulic Fractures in Horizontal Wells", SPE Hydraulic Fracturing Technology Conf., 2012, pp. 1-9, Publisher: Society of Petroleum Engineers.

fibrecompletions.com, "Distributed Acoustic Sensing Systems (DAS)", , pp. 7, Publisher: Retrieved from https://fibrecompletions.com/distributed-acoustic-sensing-das/ on Oct. 21, 2019.

Elmer, William, "Abstract For 2017 ALRDC Seminar on New Artifical Lift Technology: Smart ESD With Frac Hit Detection", 2017, pp. 2.

Halliburton, "Frac Communication", pp. 1, Publisher: Retrieved from https://ww.halliburton.com/en-US/ps/testing-subsea/reservoir-testing-analysis/data-acquisition/spidr/frac-communication.html on Nov. 22, 2019.

Halliburton, "SPIDR—Self Powered Intelligent Data Retriever", pp. 3, Publisher: Retrieved from https://www.halliburton.com/en-US/ps/testing-subsea/reservoir-testing-analysis/data-acquisition/spidr.html on Nov. 22, 2019.

Zheng et al., "Frac-Hits Mapped By Tube Waves: a Diagnostic Tool to Complement Microseismic Monitoring", 2018 SEG International Exposition and Annual Meeting, Oct. 14-19, Anaheim, California, USA, Oct. 14, 2018, pp. 2887-2891.

Haydu, Carter, "Sensor Suite Illuminates Downhole Fracture Development, Production Efficiency", New Technology Magazine Special Issue, 2015, pp. 12-17.

Jacobs, Trent, "Innovative Pressure Map Offers Insights on Frac Hits", Aug. 7, 2018, pp. 5, Publisher: Retrieved from https://pubs.spe.org/en/jpt/jpt-article-detail/?art=4462 on Oct. 21, 2019.

Jacobs, Trent, "To Solve Frac Hits, Unconventional Engineering Must Revolve Around Them", Feb. 8, 2019, pp. 19, Publisher: Retrieved from https://pubs.spe.org/en/jpt/jpt-article-detail/?art=5089 on Oct. 18, 2019.

Jin et al., "Machine Learning-Based Fracture-Hit Detection Algoritm Using LFDAS Signal", The Leading Edge, Jul. 1, 2019, pp. 12, vol. 38, No. 7.

Jacobs, Trent, "To Right Size Fractures, Producers Adopt Robust Monitoring and Custom Completions", Sep. 1, 2019, pp. 17, Publisher: Retrieved from https://pubs.spe.org/en/jpt/jpt-article-detail/?art=5862.

Maxwell, Shawn, "What Does Microseismic Tell Us About Hydraulic Fracture Deformation", Oct. 2011, pp. 30-45, Publisher: CSEG Recorder.

Merkel Technologies Ltd., "Particle Imaging Analysis—Flowcam: Oil and Gas", pp. 6, Publisher: Retrieved from merke.co.il/flowcam-oil-and-gas on Feb. 6, 2020.

Molenaar et al., "Field Cases of Hydraulic Fracture Stimulation Diagnostics Using Fiber Optic Distributed Acoustic Sensing (DAS) Measurements and Analyses", SPE Unconventional Gas Conference and Exhibition, Jan. 28-30, Muscat, Oman, 2013, pp. 10, Publisher: Society of Petroleum Engineers.

Oleumtech, "Minimizing Risk and Well Damage From Frac Hits", Jan. 8, 2019, pp. 7, Publisher: Retrieved from https://oleumtech.com/news-and-blogs/2019/01/wireless-solution-for-minimizing-well-damage-from-fracking on Oct. 21, 2019.

Platt et al., "Estimating the Creation and Removal Date of Fracking Ponds Using Trend Analysis of Landsat Imageryu", Environmental Management, 2018, pp. 310-320, vol. 61, Publisher: Springer.

Richter, Pete, "High-Resolution DAS in Frac Design", Jul. 30, 2019, pp. 6, Publisher: Retrieved from https://www.hartenergy.com/exclusives/high-resolution-das-frac-design-180999 on Oct. 12, 2019.

Richter et al., "Hydraulic Fracture Monitoring and Optimization in Unconventional Completions Using a High-Resolution Engineered Fibre-Optic Distributed Acoustic Sensor", First Break, Apr. 2019, pp. 63-68, vol. 37.

Sardinha et al., "Determing Interwell Connectiity and Reservoir Complexity Through Frac Pressure Hits and Production Interference Analysis", SPE/CSUR Unconventional Resources Conference—Canada held in Calgary, Alberta, Canada, Sep. 30, 2014-Oct. 2, 2014, 2014, pp. 14, Publisher: Society of Petroleum Engineers, Published in: CA.

Tary et al., "Interpretation of Resonance Frequencies Recorded During Hydraulic Fracturing Treatments", Journal of Geophysical Research: Solid Earth, Feb. 4, 2014, pp. 47, vol. 119, No. 2, Publisher: Retrieved from https://agupubs.onlinelibrary.wiley.com/doi/full/10.1002/2013JB010904 on Oct. 21, 2019.

Triepke, Joseph, "The Fracking Problem With Over Drilling", pp. 7, Publisher: Retrieved from https://www.alpha-sense.com/insights/fracking-problem-overdrilling on Oct. 18, 2019.

Vaidyanathan, "Hydraulic Fracturing: When 2 Wells Meet, Spills Can Often Follow", Aug. 5, 2013, pp. 4, Publisher: Retrieved from https://www.eenews net/stones/1059985587 on Oct. 18, 2019.

Zborowski, Matt, "Can Machine Learning Mitigate Frac Hits?", Nov. 2, 2018, pp. 5, Publisher: Retrieved from https://pubs.spe.org/en/jpt/jpt-article-detail/?art=4762 on Nov. 25, 2019.

\* cited by examiner

ND MACHINE
SPECTRAL ANALYSIS AND MACHINE LEARNING FOR DETERMINING CLUSTER EFFICIENCY DURING FRACKING OPERATIONS

CLAIM OF PRIORITY UNDER 35 U.S.C. § 119

The present application is a National Phase Application based on PCT/US20/64327 filed Dec. 10, 2020 which claims priority to U.S. Provisional Application Nos. 62/945,929, 62/945,949, 62/945,953, 63/058,534, 63/058,548 and 62/945,957 entitled "Spectral Analysis and Machine Learning to Detect Offset Well Communication Using High Frequency Acoustic or Vibration Sensing", "Acoustic and Vibrational Sensor Based Micro-Seismic Analysis", "Spectral Analysis and Machine Learning of Well Activity Using High Frequency Pressure Sensing of Phase-Locked Stimulation", "Spectral Analysis and Machine Learning of Acoustic Signature of Wireline Sticking", "Spectral Analysis, Machine Learning, and Frac Score Assignment to Acoustic Signatures of Fracking Events", and "Spectral Analysis and Machine Learning of Acoustic Signature of Drill Bit Positive Displacement Motor Torque and Drill Bit Wear", respectively, each of which are assigned to the assignee hereof and hereby expressly incorporated by reference herein.

FIELD OF THE DISCLOSURE

The present disclosure relates generally to oil field monitoring. In particular, but not by way of limitation, the present disclosure relates to systems, methods and apparatuses for determining cluster efficiency during hydraulic fracturing operations.

DESCRIPTION OF RELATED ART

Unconventional reservoirs include reservoirs such as tight-gas sands, gas and oil shales, coalbed methane, heavy oil and tar sands, and gas-hydrate deposits. These reservoirs have little to no porosity, thus the hydrocarbons may be trapped within fractures and pore spaces of the formation. Additionally, the hydrocarbons may be adsorbed onto organic material, for instance, of a shale formation. In some cases, these reservoirs may require special recovery operations distinct from conventional operating practices in order to mobilize and extract the oil.

The rapid development of extracting hydrocarbons from these unconventional reservoirs can be tied to the combination of horizontal drilling and induced fracturing (also called "hydraulic fracturing" or simply "fracking") of the formations. Hydraulic fracturing operations may include at least drilling of a well or borehole into the subterranean formation, perforation gun (or perf gun) firing, frac fluid pumping, proppant pumping, and plug installation. Horizontal drilling has allowed for drilling along and within hydrocarbon reservoirs of a formation to capture the hydrocarbons trapped within the reservoirs. In some cases, an amount of mobilization may be related to the number of fractures in the formation, the size of fractures, and evenness of distribution of fractures throughout a stage.

SUMMARY

The following presents a simplified summary relating to one or more aspects and/or embodiments disclosed herein. As such, the following summary should not be considered an extensive overview relating to all contemplated aspects and/or embodiments, nor should the following summary be regarded to identify key or critical elements relating to all contemplated aspects and/or embodiments or to delineate the scope associated with any particular aspect and/or embodiment. Accordingly, the following summary has the sole purpose to present certain concepts relating to one or more aspects and/or embodiments relating to the mechanisms disclosed herein in a simplified form to precede the detailed description presented below.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of 'a', 'an', and 'the' include plural referents unless the context clearly dictates otherwise.

Aspects of the present disclosure generally relate to analyzing high frequency acoustic or vibration signals in a well to assess fracture distribution in real-time via time domain and/or spectral analysis of said signals. This technique is far superior to static or absolute pressure readings that have long been used to obtain much lower resolution and non-real time insights into subterranean activity. In some cases, the analyzed signals may be transmitted from the lower reaches of the well to the surface, for instance, through liquid in the well. This may not only allow real-time feedback during well operations but may also allow computer algorithms to determine cluster efficiency during hydraulic fracturing operations by comparing the feedback to feedback previously received as a result of certain fracking operations or subterranean activity (e.g., fracture initiation or high rate of fluid flow through a propped fracture). In some cases, by identifying multiple amplitude peaks corresponding to a fracture initiation (e.g., first and second amplitude peaks corresponding to arrival times of a primary wave and a reflected wave, respectively, generated by the fracture initiation), one or more of a distance from the fracture initiation to a plug and a location of the fracture initiation may be obtained. In this way, the distance from the fracture initiation to the plug may be used to create a cluster map of fracture initiations in the stage of a well, which may in turn be used to adjust well operations to more evenly disperse fractures within fracture clusters. In some cases, the adjustment may be automatic or manual (e.g., based on input from a human operator), and may facilitate optimizing well output/yield. The amount of dispersion of fractures within a stage is referred to throughout this disclosure as "cluster efficiency." Various distribution theories can be used to quantitatively score cluster efficiency, but generally, when different clusters of fractures are evenly spaced from each other and each of those clusters has a similar number of fractures, then cluster efficiency is greatest (or closest to 1 on a scale of 0-1 scale).

Some embodiments of the disclosure may relate to a system for determining cluster efficiency during hydraulic fracturing operations, the system comprising: a sensor coupled to a fracking wellhead, circulating fluid line, or standpipe of a well and configured to convert acoustic vibrations measured in fracking fluid in the fracking wellhead, circulating fluid line, or standpipe into an electrical signal in a time domain; a memory configured to store the electrical signal; a machine-learning system trained on previous electrical signals measured as a result of previous fracture initiations, the machine-learning system comprising tangible non-transient computer readable media encoded with processor reasonable instructions that when executed cause the machine-learning system to: analyze the electrical signal in the time domain for a window of time and identify two amplitude peaks corresponding to the a fracture initiation, a first of the two amplitude peaks corresponding to an arrival time of a primary wave generated by the fracture initiation, a second of the two amplitude peaks corresponding to an arrival time of a reflected wave generated by the fracture initiation and reflected off a plug at an end of a current fracking stage of the well; measure a time between the two amplitude peaks; divide the time by two to give a result; multiply the result by a speed of sound in the fracking fluid thought to be near the fracture initiation to give a distance from the fracture initiation to the plug; and a user interface configured to return a location of the fracture initiation to an operator based on the distance between the fracture initiation and the plug. In other embodiments, not just a location of a single fracture, but a map or score showing cluster efficiency for a plurality of fractures within one or more stages can be provided.

Some embodiments of the disclosure may relate to a system for determining cluster efficiency during hydraulic fracturing operations, the system comprising: a sensor coupled to a fracking wellhead, circulating fluid line, or standpipe of a well and configured to convert acoustic vibrations measured in fracking fluid in the fracking wellhead, circulating fluid line, or standpipe into an electrical signal in a time domain; a memory configured to store the electrical signal; a machine-learning system trained on previous electrical signals measured as a result of previous fracture initiations, the machine-learning system comprising tangible non-transient computer readable media encoded with processor reasonable instructions that when executed cause the machine-learning system to: analyze the electrical signal in the time domain for a window of time and identify two amplitude peaks corresponding to a fracture initiation, a first of the two amplitude peaks corresponding to an arrival time of a primary wave generated by the fracture initiation, a second of the two amplitude peaks corresponding to an arrival time of a reflected wave generated by the fracture initiation and reflected off a plug at an end of a current fracking stage of the well; measure a time between the two amplitude peaks; divide the time by two to give a result; multiply the result by a speed of sound in the fracking fluid to give a distance from the fracture initiation to the plug; and a user interface configured to return a location of the fracture initiation to an operator based on the distance between the fracture initiation and the plug.

Some other embodiments of the disclosure may relate to a method of determining cluster efficiency during hydraulic fracturing operations, the method comprising: measuring acoustic vibrations in fracking fluid in a fracking wellhead, circulating fluid line, or standpipe of a well; converting the acoustic vibrations into an electrical signal in a time domain; recording the electrical signal to a memory; analyzing the electrical signal in the time domain for a window of time and identifying two amplitude peaks corresponding to a fracture initiation; measuring a time between the two amplitude peaks; dividing the time by two to give a result; multiplying the result by a speed of sound in the fracking fluid to give a distance between the fracture initiation and a plug at an end of a current fracking stage of the well; and returning a location of the fracture initiation to an operator based on the distance between the fracture initiation and the plug.

Some other embodiments of the disclosure may relate to a method of more evenly dispersing fractures within fracture clusters during hydraulic fracturing operations, the method comprising: pumping fracking fluid into a stage of a well; measuring acoustic vibrations in fracking fluid in a wellhead, circulating fluid line, or standpipe of the well; converting the acoustic vibrations into an electrical signal in a time domain; recording the electrical signal to a memory; identifying a fracture initiation from the electrical signal in the time domain via identification of two amplitude peaks occurring within a threshold period of time of each other; measuring a time between the two amplitude peaks; dividing the time by two to give a result; multiplying the result by a speed of sound in the fracking fluid to give a distance between the fracture initiation and a plug at an end of a current fracking stage of the well; using the distance to create a cluster map of fracture initiations in the stage of the well; and adjusting a parameter of the hydraulic fracturing operations based on the cluster map to achieve more even dispersion of fractures in a subsequent stage.

Yet other embodiments of the disclosure may relate to a non-transitory, tangible computer readable storage medium, encoded with processor readable instructions to perform a method of more evenly dispersing fractures within fracture clusters during hydraulic fracturing operations, the method comprising: pumping fracking fluid into a stage of a well; measuring acoustic vibrations in fracking fluid in a wellhead, circulating fluid line, or standpipe of the well; converting the acoustic vibrations into an electrical signal in a time domain; recording the electrical signal to a memory; identifying a fracture initiation from a current frequency domain spectrum via a machine-learning system trained on previous frequency domain spectra measured as a result of previous fracture initiations and previously classified by the machine-learning system; analyzing the electrical signal in the time domain during a window of time and identifying two amplitude peaks corresponding to the fracture initiation found in the current frequency domain spectrum; measuring a time between the two amplitude peaks; dividing the time by two to give a result; multiplying the result by a speed of sound in fracking fluid thought to be near the fracture initiation to give a distance from the fracture initiation to a plug; using the distance to create a cluster map of fracture initiations in the stage of the well; and adjusting a parameter of the hydraulic fracturing operations based on the cluster map to achieve more even dispersion of fractures in a subsequent stage.

Yet other embodiments of the disclosure may relate to a non-transitory, tangible computer readable storage medium, encoded with processor readable instructions to perform a method for determining cluster efficiency during hydraulic fracturing operations, the method comprising: converting the acoustic vibrations into an electrical signal in a time domain; recording the electrical signal to a memory; identifying a fracture initiation from the electrical signal in the time domain via identification of two amplitude peaks occurring within a threshold period of time of each other; measuring a time between the two amplitude peaks; dividing the time by two to give a result; multiplying the result by a speed of sound in the fracking fluid to give a distance between the fracture initiation and a plug at an end of a current fracking stage of the well; and using the distance to create a cluster map of fracture initiations in the stage of the well.

BRIEF DESCRIPTION OF THE DRAWINGS

Various objects and advantages and a more complete understanding of the present disclosure are apparent and more readily appreciated by referring to the following detailed description and to the appended claims when taken in conjunction with the accompanying drawings:

DETAILED DESCRIPTION

Figure 1:
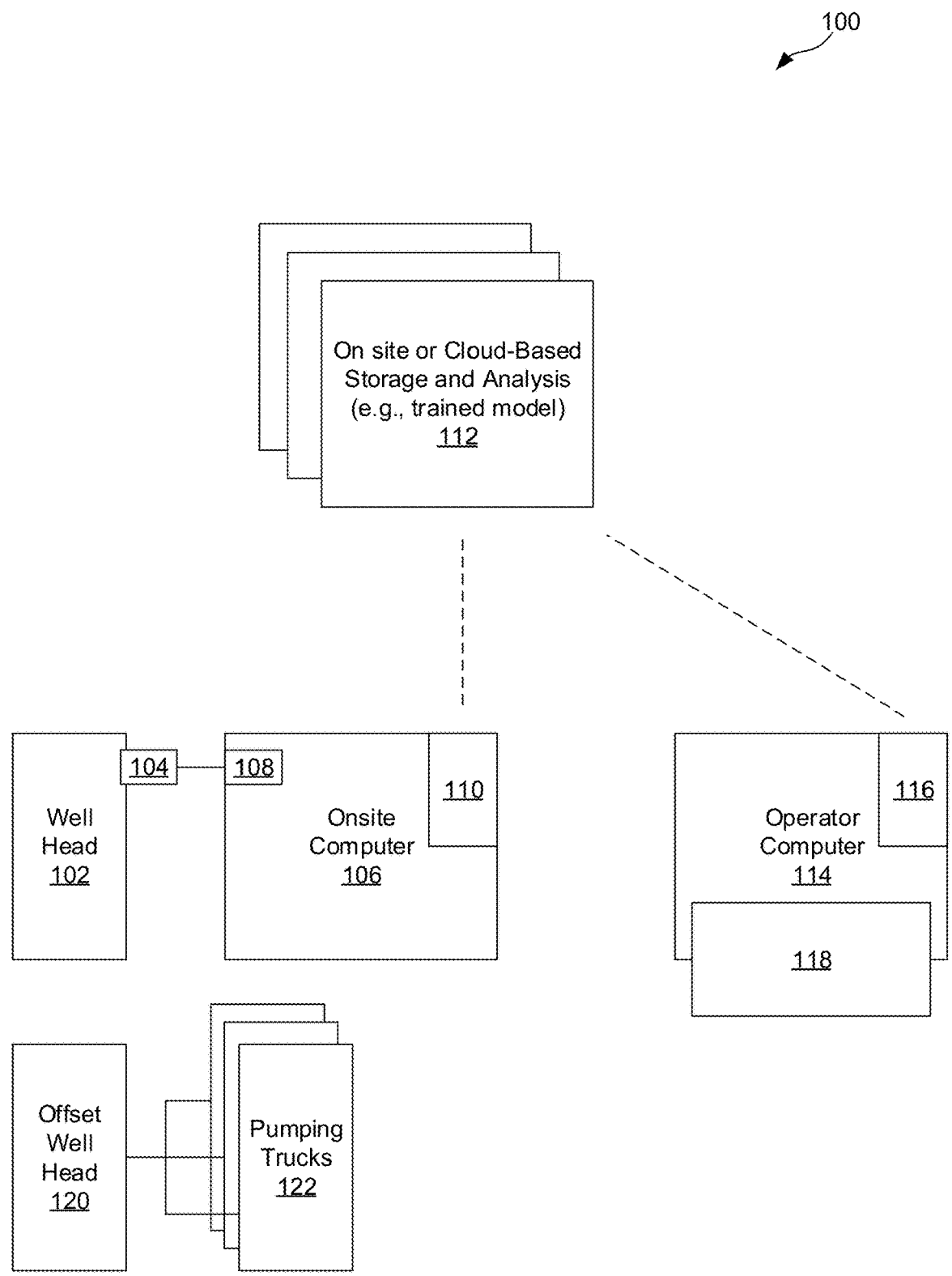
FIG. 1 illustrates a drilling system for monitoring acoustic or vibration signals in an observation well according to an embodiment of the disclosure.

The word "exemplary" is used herein to mean "serving as an example, instance, or illustration." Any embodiment described herein as "exemplary" is not necessarily to be construed as preferred or advantageous over other embodiments.

Preliminary note: the flowcharts and block diagrams in the following Figures illustrate the architecture, functionality, and operation of possible implementations of systems, methods and computer program products according to various embodiments of the present invention. In this regard, some blocks in these flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The present disclosure relates generally to oil field monitoring. In particular, but not by way of limitation, the present disclosure relates to systems, methods and apparatuses for time domain as well as spectral analysis of acoustic, vibration, and optionally pressure signals received at a well head to quantify cluster efficiency.

Acoustic and Vibration Pressure

Existing pressure sensing techniques for oil field monitoring involve recording pressure changes (e.g., absolute changes over long periods of time) with reference to an absolute pressure of fluid in the well. However, currently used static pressure sensors usually have a slow sample rate (e.g., slower than 1 Hz) and are incapable of sensing fracture initiations. However, analyzing relative fluctuations or vibrations in the fluid in a well, for instance, in both a frequency domain and a time domain may serve to provide a more accurate understanding of cluster efficiency, fracture dispersion, potential washout (i.e., is water or fluid going toward one crack because it is softer than others) and/or screen out situations, to name a few non-limiting examples, than is possible using traditional static pressure sensors. In some cases, determining cluster efficiency may provide insight on fracture dispersion (i.e., how evenly distributed are fractures throughout a stage) within fracture clusters of a stage. An even distribution may enhance oil production from a given well. In typical cases, fracture dispersion is not even (i.e., low cluster efficiency), which adversely impacts production. However, according to aspects of this disclosure, real-time analysis of acoustic vibrations at the wellhead together with adjustment of one or more parameters of the hydraulic fracturing operations may allow a more even dispersion of fractures, thus optimizing efficiency and oil production.

It has been found that analyzing rapid fluctuations or vibrations in fluid in a well (e.g., fracking fluid) in a frequency domain, rather than a time domain, or in combination with time domain analysis, may provide a more accurate understanding of fracture locations. In some cases, this spectrum may also be referred to as an acoustic or vibration spectral frequency signature (or a frequency signature). In some embodiments, the analysis may comprise generating machine learning (ML) models, or other artificial intelligence (AI) models, and training the models to recognize the acoustic or vibration signatures of different events, especially fracture initiations. By training on different events, such as rushing water compared to a fracture initiation, the model can more accurately distinguish fracture initiations from other events. Once models have been trained to recognize the acoustic or vibration signatures of different events, real-time acquired data may be compared to the model or analyzed by the model for real-time assessment of a number, rate of creation, location, dispersion, and quality of fractures being created in a given stage, which may be used to adjust fracking parameters such as stage timeline, pH, fracking fluid pressure, perforation gun pressure, distance from peroration gun to plug prior to firing, etc. In some examples, the real-time acquired data may also be used to differentiate between actual crack openings and mere horizontal shifts in the subterranean formation.

In contrast, known well-monitoring techniques often involve operators making decisions based on geological modeling performed hours before an operating step or using trial and error to make informed decisions before a particular step. However, the systems and methods disclosed herein alleviate some of the deficiencies of current techniques by utilizing real-time quantitative and qualitative analysis of crack formation and fluid flow via acoustic and vibration data analyzed in the time domain and optionally also in the frequency domain, to more accurately assess the choices that operators make to achieve higher cluster efficiency, and to optionally provide automated and optimized control of fracking operations to achieve higher cluster efficiency.

In some embodiments, the cluster efficiency may be determined by analyzing the fluctuations or vibrations in the fracking fluid in a wellhead, circulating fluid line, or standpipe of the well (i.e., via measurement of acoustics in the fluid), or alternatively, by feeling vibrations through a metal component of the wellhead. In some cases, this analysis may involve acquiring dynamic acoustic or vibration data from the well's fluid (e.g., fracking fluid) in a time domain, and optionally converting it into a frequency spectrum or frequency domain. In some circumstances, the analysis can focus on identifying distinct amplitude peaks in the time domain corresponding to a fracture initiation, wherein a first amplitude peak may correspond to an arrival time of a primary wave generated by the fracture initiation, while a second amplitude peak may correspond to an arrival time of a reflected wave (e.g., a wave reflected off a plug at an end of a current fracking stage of the well) generated by the fracture initiation. Using the frequency domain may provide further accuracy to distinguish these peaks from noise that might otherwise dominate in the time domain.

Acoustic and Vibration Sensors

Figure 14:
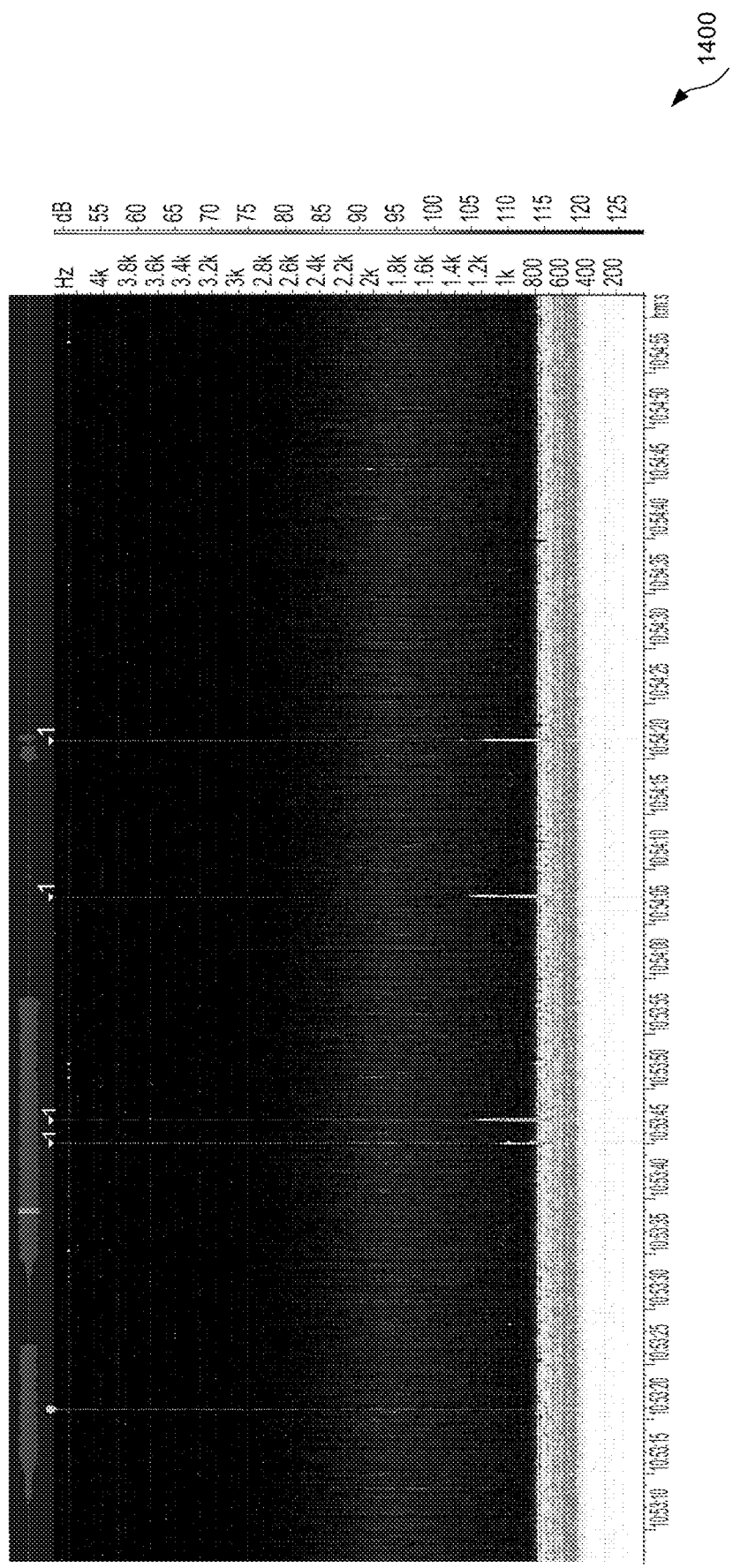
FIG. 14 illustrates a first exemplary spectral plot with frequency spikes associated with frac initiation in an observation well, in accordance with one or more implementations.
Figure 15:
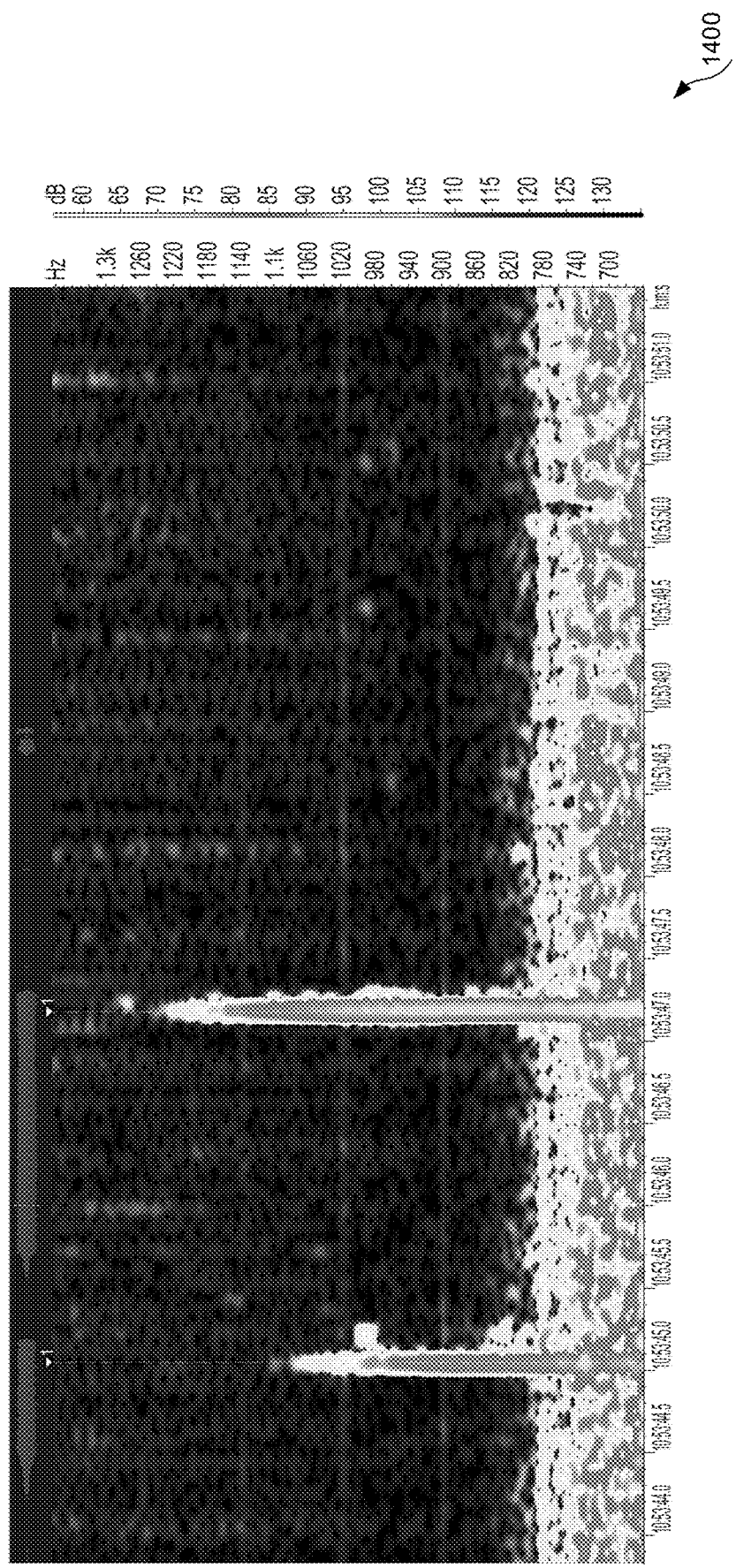
FIG. 15 illustrates a second exemplary spectral plot with frequency spikes associated with frac initiation in an observation well, in accordance with one or more implementations.
Figure 16:
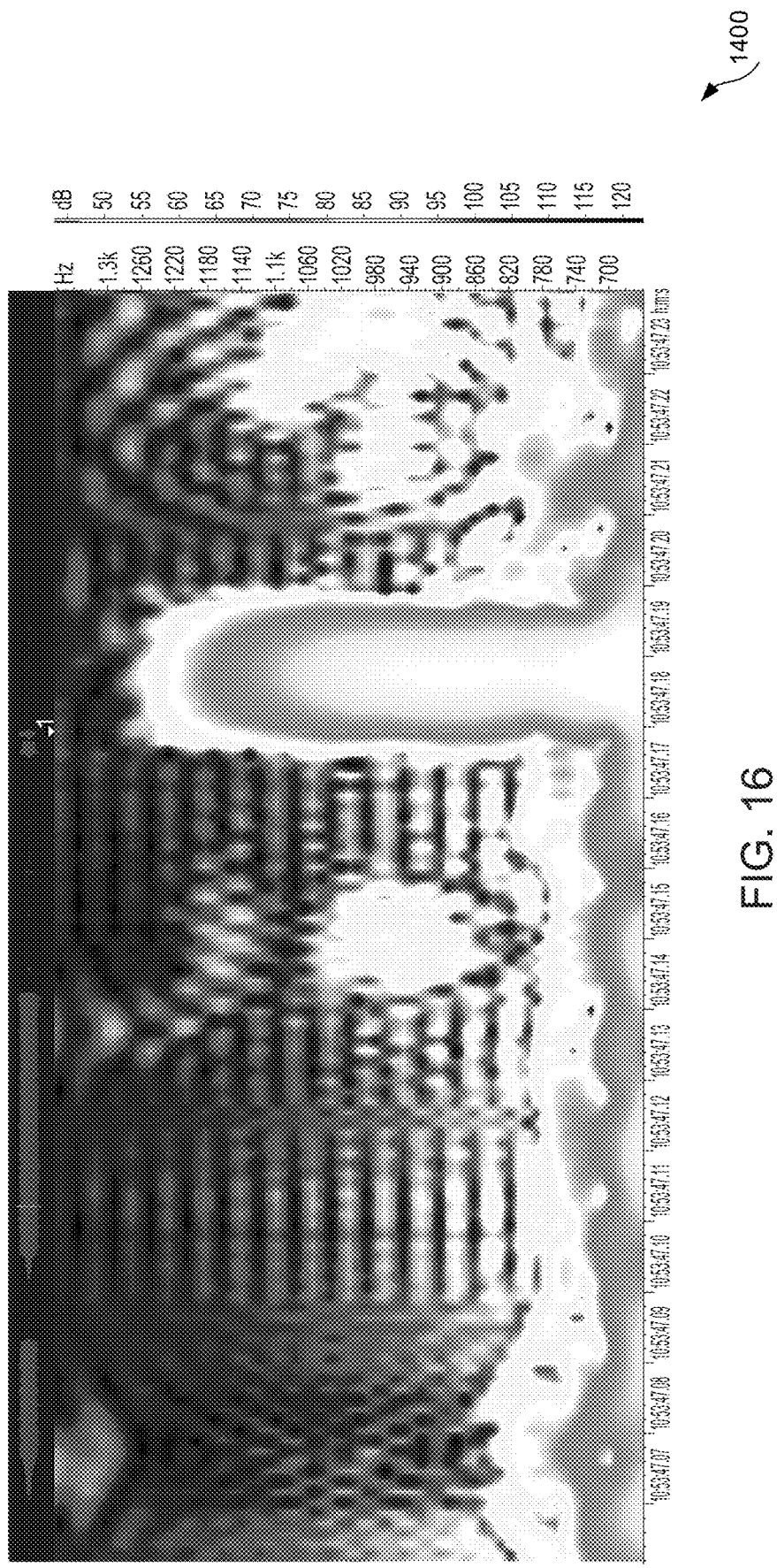
FIG. 16 illustrates a third exemplary spectral plot with frequency spikes associated with frac initiation in an observation well, in accordance with one or more implementations.

In some cases, the techniques described in this disclosure may utilize a high frequency (e.g., greater than 1 kHz) acoustic or vibration sensor directly coupled to a well, for instance at the well head, circulating fluid line, or standpipe. This acoustic or vibration sensor may be in direct physical contact with fluid in the well, the well casing, the well head pipe, the circulating fluid line, the standpipe, or the well pad (e.g., vibration sensors on the well pad can obviate the need to have direct contact with fluid in the well), to name a few non-limiting examples of structural connections allowing acoustic and vibration sensing of well fluid. In some embodiments, a vibration sensor need not be directly coupled to a component of the well, but instead can indirectly measure vibrations in the fluid. For instance, a laser reflecting off a surface of the well, such as a viewing window, could measure vibrations of the viewing window using optical methods. For the sake of brevity, an acoustic or vibration sensor may be used wherever the term acoustic sensor is seen in this disclosure. In some examples, the high frequency acoustic or vibration sensor may provide a digital or analog signal indicative of high frequency pressure fluctuations. Additionally or alternatively, the signal may be indicative of vibrations in the fluid. In some examples, this signal may be passed to a conversion and analysis component, or a converter (e.g., spectrum analyzer), configured to identify frequency components of the signal (e.g., via an algorithm that transforms pressure or vibration data in the time domain to the frequency domain such as a Fast Fourier Transform (FFT) and compares the frequency domain signal to previously measured frequency domain signals or signatures). FIGS. 14-16 show examples of frequency spectra that were used to identify subterranean events such as fracture initiation or extension much sooner than is possible with traditional techniques, or using fewer sensors (e.g., one).

In some examples, the acoustic sensors described throughout this disclosure may or may not have a reference pressure. Furthermore, the acoustic sensors may be configured to measure at least changes in pressure. Thus, in some cases, the acoustic sensors may be configured to measure both absolute pressure and dynamic pressure (i.e., if a reference pressure is being used). Additionally or alternatively, for instance, if no reference pressure is being used, the acoustic sensors may be used in parallel with a separate absolute pressure sensor. In some cases, the absolute pressure sensor may be configured to measure static or absolute pressures, where the absolute pressure may be used as a baseline (or reference) for the higher sensitivity data from the acoustic sensor looking at dynamic pressure.

It should be noted that throughout this disclosure, a vibration sensor may be used in addition (or as an alternative) to a high frequency acoustic pressure sensor.

Acquiring Data

As previously noted, the term acoustic sensor may be broadly used to refer to a high frequency acoustic pressure sensor and/or a vibration sensor (e.g., sampling at ~1 kHz or greater). One non-limiting example of a vibration sensor may comprise a piezoelectric vibration sensor. In some cases, piezoelectric vibration sensors may be configured to generate a current or voltage proportional to an amount of piezoelectric material movement. The piezoelectric material can be in direct physical contact with the fluid in the well or may be physically coupled to a protective membrane that is in direct physical contact with the fluid. Either way, vibrations in the fluid may be transmitted to the piezoelectric material, which may cause movement or vibrations of the piezoelectric material. Movement of the piezoelectric material may generate a current or voltage, where the current or voltage may be proportional to the amount of vibration or movement of the piezoelectric material. The ICP Pressure Sensor, Model Number 113B23, is one non-limiting example of an acoustic or vibration sensor.

In some cases, the generated current or voltage may be recorded and stored, and there may be a 1 to 1 mapping of vibration data to current or voltage data. The measured current or voltage readings may be used to determine vibration data, for instance, by mapping the current or voltage readings to corresponding vibration values in a look-up table. In some cases, raw data may comprise one or more of the mapped vibration data, and the measured current and/or voltage readings. This raw data can be passed through a transform operation such as a Fourier Transform, and further analyzed in the frequency domain (e.g., via a spectrum analyzer), further described below.

Analysis of Acquired Data and Example Applications/Use Cases

Raw Time Domain and Frequency Domain Analysis

In some embodiments, underground events such as fracking fluid movement or fracture initiation can be the source of acoustic signals, and analysis can look both at the frequency spectra as well as time domain data. By using a combination of analysis methods, more accurate identification of subterranean formations and events may be possible, further described below.

In some examples, a transform component and a conversion and analysis component (e.g., converter or spectrum analyzer) may be implemented as a software program, firmware module, hardware comprising analog circuits, or a combination thereof. In some embodiments, a conversion function (e.g., Fourier Transform) may comprise the use of wavelet analysis techniques. In some cases, wavelet analysis may refer to the use of a custom function that is stretched and scaled. In some aspects, wavelet analysis may facilitate in optimizing analysis of detailed timing of events in a signal.

For the purposes of this disclosure, a conversion and analysis component (e.g., spectrum analyzer) may be configured to measure the magnitude of an input signal at different frequencies. Said another way, the conversion and analysis component may analyze signals in the frequency domain, rather than the time domain. Typically, the conversion and analysis component may receive electrical signals as an input. In some other cases, the conversion and analysis component may receive acoustic or vibration signals via an appropriate transducer. In some embodiments, the conversion and analysis component may utilize a Fourier Transform or another applicable transform algorithm to convert raw acoustic or vibration data from the time domain to the frequency domain.

Fracking pads may include one or more acoustic sensors (e.g., one acoustic sensor for each well head) or one or more static and one or more acoustic sensors (e.g., one static and one acoustic sensor for each well head). The acoustic sensors may be high frequency pressure sensors (e.g., sampling at ~1 kHz or greater). Each fracking pad may include a transceiver for transmitting raw data from its sensor(s) to a local or cloud-based conversion and analysis component. Additionally or alternatively, the raw data may be transmitted to a processing resource that receives and analyses outputs from various conversion and analysis components. In one embodiment, a set of pads may comprise a master transceiver configured to receive data from one or more other pads on a local network. Each pad can transmit raw data or converted data (i.e., frequency domain data) to the master transceiver, and the master transceiver may transmit (i.e., relay) the data received on the local network to a cloud-based resource, such as a server farm where more complex analysis takes place (e.g., comparison to a model; training a model).

Further, the acoustic sensors may be coupled to one or more conversion and analysis components. In some cases, the number of conversion and analysis components may vary (e.g., one for each pad, one for each well head, or one for a network of sensors, to name a few non-limiting examples). The conversion and analysis component may be configured to execute an algorithm, such as a FFT algorithm, for transforming raw data from the time domain to the frequency domain. In some other cases, the conversion and analysis component may be used in concert with another device or software module that can perform FFT.

Using spectral analysis rather than static pressure-based sensing enables higher signal to noise ratios than traditional static pressure-based sensors. For instance, a fracture initiation or extension may cause an acoustic pop or a rapid surge in acoustic energy at a certain frequency. Static (or absolute) pressure may not change or may see a very subtle changes from this event, the type of pressure change that is difficult to discern from noise (typical variations in static/absolute pressure). However, when viewed in the frequency spectrum, this pop may look like the spectral signatures seen in FIGS. 14-16, sharp and well-defined peaks with large amplitudes as compared to the spectral noise floor, and thus be easily delineated from steady state and other downhole events. By training a model based on frequency signatures of previous fractures, it is possible to associate a current frequency spectrum with one caused by a previous fracture initiation, and thus use acoustic measurements to identify fracture initiation. In other cases, after identifying pops associated with fracture initiation via an FFT algorithm (or another Discrete Fourier Transform (DFT) algorithm), the distance of a fracture initiation or cluster from a plug may be obtained to pin-point an origination of the shockwave (i.e., location of the fracture initiation). Specifically, since the location of the plug and the speed of sound/acoustic vibrations through the fracking fluid are known, the distance of the fracture initiation may be obtained based on a comparison of the timing of the primary wave generated by the fracture initiation with respect to a secondary or reflected wave reflected off the plug. In some other cases, horizontal shifting, an event that does not improve hydrocarbon recovery, but does cause significant vibrations that may look like a fracture to traditional micro-seismic arrays, has a unique frequency signature compared to fracture initiation. By comparing a current frequency signature to known signatures measured during previous horizontal shifts and fracture initiations or extensions, one can accurately distinguish between horizontal shifts and fracture initiation.

In another example, fluid, mud, and proppant flowing through the well holes, perforations in stage walls, and fractures may also be associated with identifiable signatures in the frequency domain. For instance, an unknown/natural fracture may have created a weak spot causing all fluids to head down a cluster to the natural crack, or alternatively, a substantially solid area may not be receiving any proppant. In such cases, frequency domain analysis may be used to identify such areas (i.e., hard or soft regions). Corrective suggestions can be generated or actions taken. In one example, where a soft region or natural crack in the subterranean formation has been identified, closing up the soft area may serve to put more pressure on a hard region, allowing a more even dispersion of fractures. In some cases, rock salt or benzoic acid may be sent downhole and seal or close up the soft area. Due to their natural solubility, the rock salt or benzoic acid may partially plug fractures in the short run, but dissolve by the time production is started.

In another example, sand moving along edges of a pipe, well hole, or fracture may generate acoustic or vibration waves at a unique frequency (or frequencies) (e.g., at a different frequency or frequencies from signals generated by clean water moving through the same structure). In such cases, different areas associated with different geological and flow properties may be identifiable based on analyzing signals in the frequency domain. In such cases, the conversion and analysis component may identify frequency signatures associated with specific activities and/or arriving from specific locations in the observation or offset well, where the identifying may be based at least in part on distinguishing between different processes or events during development of a well. In some cases, the frequency signatures may be dependent on fluid flow properties. As an example, a first area (e.g., where fluids become turbulent) may be associated with a frequency signature that is distinct from another frequency signature associated with a second area (e.g., associated with laminar fluid flow).

In some cases, sound or pressure waves may reflect off of various structures, interfaces between different fluids, etc., within a well. In such cases, the conversion and analysis component may be used to identify beat frequencies or resonances caused by such reflections. In one example, a pump truck may create a 33 Hz signal (i.e., a first frequency signature) during pumping operations. In some embodiments, the 33 Hz signal (i.e., frequency signature) may reflect off of one or more surfaces, including a heel of the well, toe of the well, one or more other structures at the well or well head, plug and/or perforation gun, etc. In some cases, the reflective bouncing off of the one or more surfaces (e.g., one or more times per second for a 1-mile deep surface-to-heel well) may affect the resonant frequency identified by the conversion and analysis component. For instance, after reflecting and bouncing off of one or more surfaces and/or structures at the well head, or a plug, a generated signal, such as the 33 Hz signal, may be identified as a ~1 Hz signal (or another frequency different from 33 Hz). In other words, the conversion and analysis component may identify a ~1 Hz signal as the resonant frequency for pump truck signals reflecting up and down through the vertical segment of a well (either the observation well or an adjacent well). In this way, the resonant frequency may be used to better understand the structure of a well, including one or more of the length of the borehole, length of horizontal sections, length of fractures extending from the horizontal section, etc.

In some other cases, a time difference between arrival of primary and reflected waves (e.g., reflected off a plug) may be used to extrapolate a location of the fracture initiation. For instance, by dividing the time difference between amplitude peaks corresponding to a primary wave and a reflected wave by two to get a result, and then multiplying the result by a speed of a sound in the fracking fluid, a distance from the fracture initiation to the plug may be obtained. Further, a location of the fracture initiation may also be determined based on the distance between the fracture initiation and the plug since the location of the plug is known. As shown by equation (1), a distance from the plug may be obtained by measuring a direct or primary wave, as well as a secondary or reflected wave exiting a perforation. It should be noted that, the direct or primary wave may travel up hole as soon as it exits the perforation, while the secondary wave may first travel downhole, reflect off of the plug, and then travel up hole. Thus, the primary and secondary waves may be identified as distinct amplitude peaks in the time domain data.

$$D=(A_2-A_1)*S/2 \quad (1),$$

where D=Distance from Plug; $A_1$=Arrival Time of Primary Wave; $A_2$=Arrival Time of Reflected Wave; and S=Speed of sound in current (fracking) fluid.

In some cases, S may be calculated when a perforating (or perf) gun is fired. For instance, a wave travelling from the perf gun may reflect off of a fluid end (e.g., at the surface), go back down hole, and then reflect off of the plug. This reflected wave may be measured by the sensor, and its characteristics recorded and analyzed to calculate S. Equation (2) may be employed to calculate S:

$$S=G+P+2*(F+E)/A_2-A_1 \quad (2)$$

where S=Speed of sound in current fluid; G=Perforating Gun Firing Depth; P=Plug Depth; F=Sensor distance from wellhead; and E=Distance from Sensor to closest fluid end.

In this way, equations (1) and (2) may be utilized to determine locations of fractures and thus a probable cluster location, as well as a dispersion of fractures within a fracture cluster, and dispersion of clusters within a stage.

In some examples, resonant frequencies may also be used in assessing dimensions and shapes of underground chambers, such as reservoirs or natural cracks, or the thickness of different layers of underground materials, or even the density (i.e., hard or soft region) of a formation surrounding a crack. All of these may present unique frequency spectra that an acoustic sensor at or near a wellhead can measure and that can be matched with previous spectra associated with similar structures.

Machine Learning

Fourier Analysis

Some embodiments of this disclosure pass acoustic or vibration data in the frequency domain to a machine learning model for analysis, labeling, and training of the model. In some embodiments, the model may be configured to use artificial intelligence based on, for example, a neural network or other type of machine learning algorithm. In some cases, the artificial intelligence algorithm or model may receive time domain data converted to a frequency domain, for instance, using a FFT algorithm or another algorithm for computing the discrete Fourier transform (DFT) of a sequence. A DFT may be obtained by decomposing a sequence of values into components of different frequencies. In some cases, a conversion and analysis component may be utilized to perform the conversion from time to frequency domain. In some other cases, the acoustic or vibration data in the time domain may be passed to a machine learning model without conversion. In such cases, the conversion and analysis component may be responsible for analysis, but not conversion, of the time domain data. It should be noted that, even though no conversion of time domain data into the frequency domain takes place, the model may still have access to frequency information associated with the measured signal. In some cases, the model may look at a window of data in one shot (or one local section of a signal as it changes over time) and learn to detect, for instance, high and low frequency waveforms and structures. The model or neural network may encompass knowledge of frequency space decomposition of a signal and may be configured to deconstruct a single waveform in time into a composite of simpler, underlying waveforms (e.g., sinusoidal waveforms). Thus, in some aspects, the model may be trained to perform something akin to Fourier analysis. In some other cases, the model may utilize a Short-time Fourier transform (STFT) to determine the sinusoidal frequency and phase content of local sections of a signal as it changes over time. STFT computation may involve dividing a longer time signal into shorter segments of equal length and then computing the Fourier transform separately on each shorter segment. In some cases, once the Fourier spectrum is revealed for each shorter segment, the changing spectra may be plotted as a function of time (i.e., also known as a spectrogram or waterfall plot).

Example Machine Learning Algorithms

In some embodiments, a plurality of distinct machine-learning algorithms may be operated in parallel. In some aspects, the use of multiple machine-learning algorithms may also decrease incorrect identifications of fracture initiation, or other fracture parameters as compared to the use of a single machine learning algorithm. In some cases, a combination of three or four machine learning algorithms may be operated in parallel, which may provide a balance of high accuracy versus system complexity. Some non-limiting examples of machine learning algorithms may include a neural network, a decision tree, a support vector machine, and Bayesian methods.

Neural Networks

In some cases, a neural network may comprise a plurality of input nodes, where an input node refers to a point within the neural network to which a parameter (e.g., a drilling parameter) may be provided for further processing. Further, the neural network may comprise one or more output nodes, where each output node represents a calculated and/or predicted parameter based on the input data at the input nodes. In some cases, one or more layers of hidden nodes may lie between the input and output nodes, where the hidden nodes may be coupled to some or all of the input nodes and/or the output nodes. Each of the hidden nodes may be configured to perform a mathematical function that is determined or learned during a training phase of the neural network, where the mathematical function may be determined based on the data of the input nodes to which it is coupled. Likewise, the output nodes may perform mathematical functions based on data provided from the hidden nodes. In some embodiments, the neural network may be provided one or more drilling parameters in real-time, as well as one or more historical values of the drilling parameters based on preprocessing, for instance, by frac initiation software. In other words, the neural network may be trained using historical data from fracking and drilling operations where fracture initiation, extension, or horizontal shifting actually occurred. In such cases, the neural network may produce a value at an output node based on an input value provided to the input node, where the value may be a probability of occurrence of a fracture initiation or extension event, or some other subterranean occurrence. Some non-limiting examples of drilling parameters may include a value indicative of fracking fluid pressure; a value indicative of stage time; a value indicative of pH; and a value indicative of perforation spacing.

Decision Trees

With regards to fracking and drilling operations, a decision tree machine learning algorithm may be an example of a predictive model comprising a plurality of interior nodes that may be traversed based on a set of input parameters (e.g., fracking parameters, such as fracking fluid pressure, stage length, pH, etc.). In such cases, the predicted value (e.g., of fracture initiation, or a value associated with frac dispersion) may be based on arriving at an end node following transitioning from node to node, where the transitioning may be based on the set of input parameters. In such cases, the end node may be dictated by the input parameters. It should be noted that, in some cases, decision trees may also be referred to as classification or regression trees.

Support Vector Machines

In some cases, support vector machines are a class of machine-learning algorithms that perform classifications of data into groups. In particular, support vector machines can be thought of as performing classification by analysis of the data in a multidimensional space. Training data for support vector machines may be "plotted" or "mapped" into the multidimensional space and classified or grouped spatially. It should be noted that the plotting or mapping need not be a true physical plotting, but a conceptual operation. After the training phase, data to be analyzed may be plotted or mapped into the multidimensional space. Further, the support vector machine may be configured to determine the most likely classification of the data. In some cases, the classification of the data to be analyzed may be a "distance" calculation between the spatial location of the data to be analyzed in the mappings and the "nearest" classification. In one non-limiting example, the support vector machine may be provided one or more fracking parameters from fracking operations. In this case, the support vector machine may be configured to plot the data in a multidimensional space and classify the data. During actual fracking operations (i.e., when real-time fracking parameters are provided to the support vector machine), the support vector machine may plot a data point under test in the multidimensional space, and predict a result (i.e., a probability of fracture initiation or increased production) based on the spatial position of the plotted point relative to a spatial delineation (or classification line) between data with fracture initiation or extension events and those without.

Bayesian Methods

In yet other cases, the machine learning algorithm may comprise the use of Bayesian methods. Bayesian methods represent a logically different view of data and probabilities and may be thought of as testing the plausibility of a hypothesis (e.g., a fracture extension will occur in the future) based on a previous set of data. In some aspects, Bayesian methods may be considered non-deterministic since they generally assume the plausibility of a hypothesis is based on unknown or unknowable underlying data or assumptions. In some embodiments, a value indicative of plausibility of a hypothesis may be determined based on the previous data (e.g., the training data), following which plausibility may be tested again in view of new data (i.e., with the fracking parameters applied). From the evaluation, a plausibility of the truth of the hypothesis may be determined.

Figure 20:
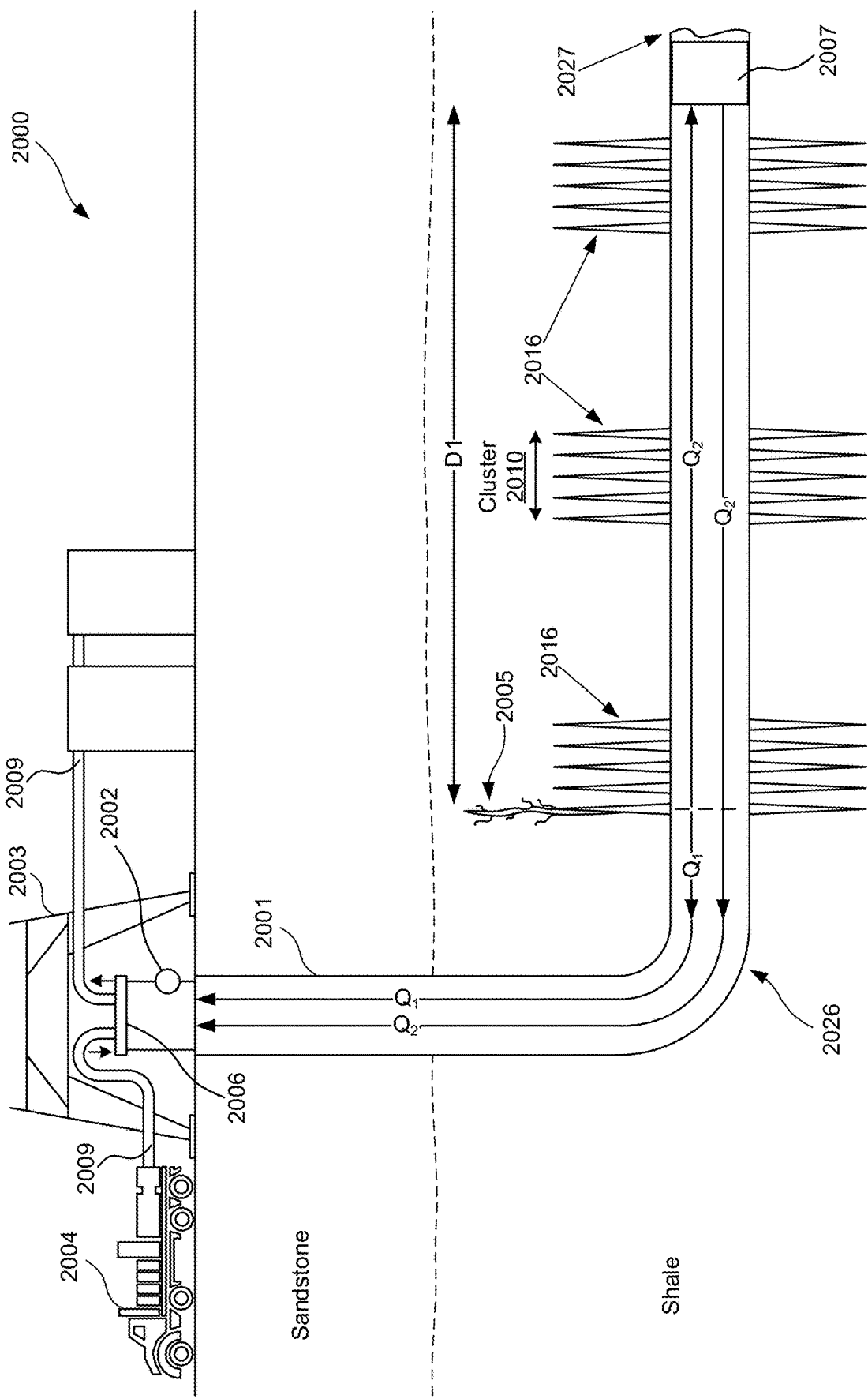
FIG. 20 illustrates a drilling system for determining cluster efficiency, and optionally controlling fracking operations, according to an embodiment of the disclosure.

FIG. 1 illustrates a drilling system 100 for monitoring acoustic or vibration signals (referred to simply as, signals) in an observation well. The signals can either be sourced or generated at (or in) the observation well or an optional offset well. As shown, the drilling system 100 can include a well head 102 of the observation well and optionally an offset well having an offset well head 120. The well head 102 of the observation well can include a sensor 104 (e.g., acoustic or vibration sensor) in physical contact with fluid in the observation well or a component directly in contact with the fluid (e.g., a sensor affixed to an outside of the standpipe or wellhead). For instance, the sensor 104 can be arranged within the wellhead, a circulating fluid line, or the standpipe, as shown in FIG. 20. Alternatively, the sensor 104 can be arranged at an end of a T-junction that runs roughly perpendicular to piping of the wellhead, a circulating fluid line, or the standpipe. Alternatively, the sensor 104 can be arranged within a pipe parallel to piping of the wellhead, circulating fluid line, or standpipe. The sensor 104 can generate a signal and pass said signal to an onsite computer 106, for instance, via an analog-to-digital converter (ADC) 108. The onsite computer 106 may be configured to process signals from one or more wellheads of a pad, or alternatively, from multiple pads. The onsite computer 106 can include a transceiver or antenna 110 configured to transmit raw acoustic or vibration data to a conversion and analysis component. As illustrated, the conversion and analysis component may comprise an on-site or cloud-based storage and analysis unit 112. In some examples, the conversion and analysis component may be configured to convert the raw acoustic or vibration data from a time to a frequency domain. Further, the conversion and analysis component may be configured to identify frequency signatures indicative of one or more events. In some cases, identification of such events may further trigger a communication to an operator computer 114. Some non-limiting examples of such events may include a fracture initiation, a potential communication between wells, an eminent drill bit failure, wireline sticking, etc. In some cases, the operator computer 114 may be linked to the conversion and analysis component via a transceiver 116, and may further include a display 118 for providing visual warnings or other messages or indicators.

In some cases, the on-site or cloud-based storage and analysis unit 112 may include a trained model (e.g., as part of a machine-learning system) based on previous drilling or hydraulic fracturing operations and their frequency signatures (and optionally previously classified by the machine-learning system). For instance, the model may have been trained using acoustic or vibration data from previous drilling events, for instance, an event that led to a falloff in production. Additionally or alternatively, the model may have been trained using a cluster map associated with distances from prior fracture initiations to a plug. In this way, a mapping of fracture initiations in clusters associated with different plug positions may be determined for a fracking stage, for instance, by referencing the distance from the current fracture initiation to the plug with other distances and plug positions from prior fracture initiations. In some embodiments, the on-site or cloud-based storage and analysis unit 112 may be configured to provide automated feedback control to the well, for example, to reduce frac pressure, close or seal up a soft area to apply more pressure on a harder region, increase or decrease proppant pressure, vary fracturing frequency (e.g., instead of 1 frac every 2 seconds, adjust to 1 frac every 3 or 4 seconds), increase or decrease well spacing of future wells (or change a direction of a well to increase spacing between portions of adjacent wells), vary perforation cluster locations by controlling the wireline coupled to the perf gun, or perform another applicable action.

In some embodiments, the on-site or cloud-based storage and analysis 112 may monitor for a signature of pump trucks 122 pumping fluids into the offset well head 120. In some cases, these pump trucks 122 may operate at around 33 Hz. In such cases, the frequency signature (i.e., at 33 Hz) generated by the pump truck may have a greater amplitude than other frequency components generated by the illustrated drilling system 100.

In some cases, sound or pressure waves may reflect off of various structures, such as a plug or perf gun, interfaces between different fluids or materials, etc., within a well or between wells. In such cases, the conversion and analysis component may be used to identify beat frequencies or resonances caused by such reflections. In some embodiments, the 33 Hz signal (i.e., a first frequency signature) generated by the pump truck may reflect off of one or more surfaces, including a heel of the well, toe of the well, one or more other structures at the well or well head, one or more wireline tools (e.g., plug, perf gun), etc. In some cases, the reflective bouncing off of the one or more surfaces (e.g., one or more times per second for a 1-mile deep surface-to-heel well) may affect the resonant frequency identified by the conversion and analysis component. For instance, after reflecting and bouncing off of one or more surfaces and/or structures at the well head, a generated signal, such as the 33 Hz signal, may have a ~1 Hz beat frequency signal (or another frequency different from 33 Hz), corresponding to reflections. In other words, the conversion and analysis component may identify a ~1 Hz signal as the resonant or beat frequency for pump truck signals reflecting up and down through the vertical segment of a well (either the observation well or an adjacent well) in addition to the original 33 Hz signal. In this way, the resonant frequency may be used to better understand the structure of an observation or offset well, including one or more of the length of the borehole, length of horizontal sections, length and/or number of fractures extending from the horizontal section, dispersion or concentration of fractures, cluster spacing, etc.

Figure 2:
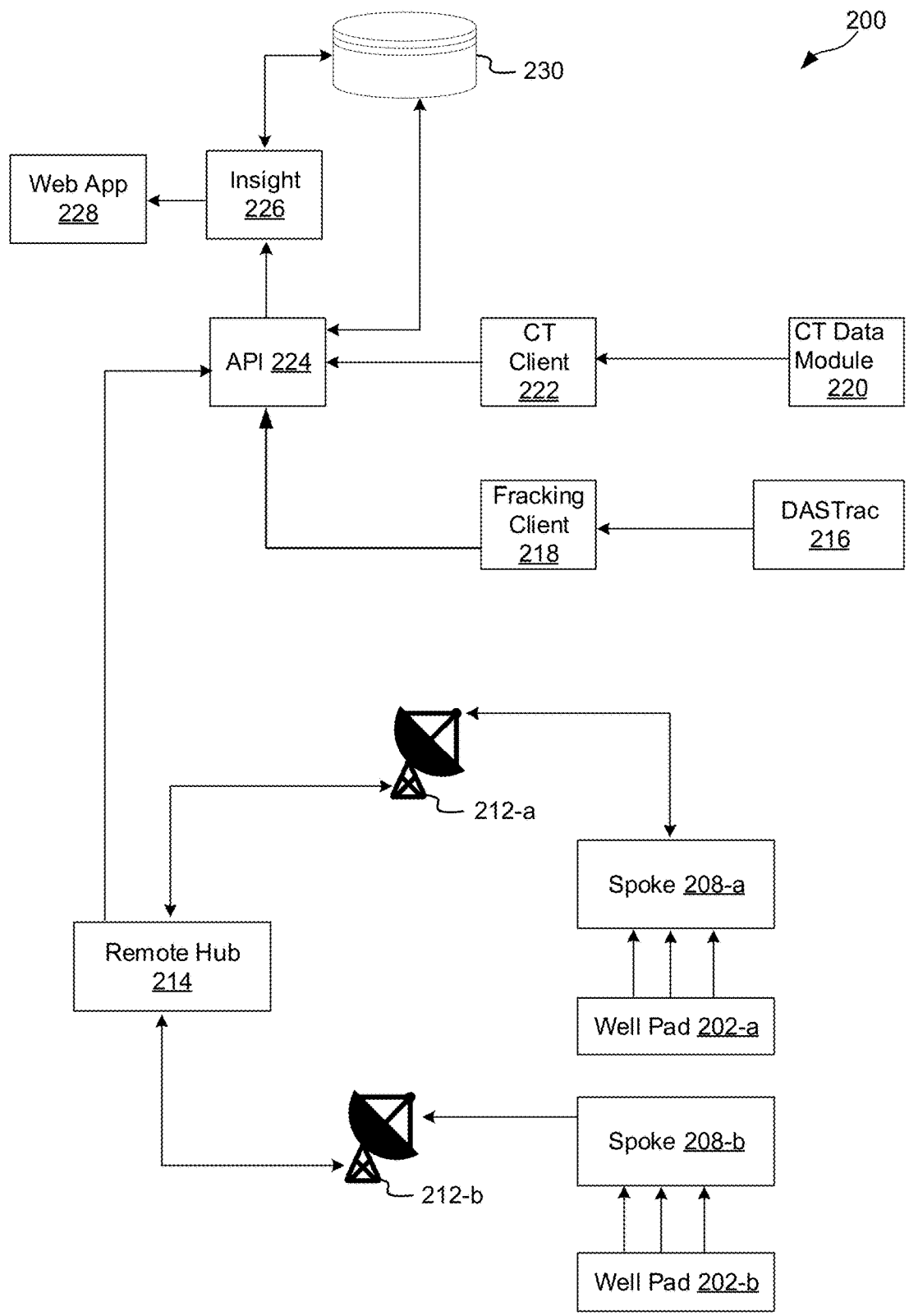
FIG. 2 illustrates a drilling system for monitoring acoustic or vibration signals in an observation well according to an embodiment of the disclosure.

FIG. 2 illustrates a drilling system 200 for monitoring acoustic or vibration signals in an observation well. In some examples, the drilling system 200 may implement one or more aspects of the figures described herein, including at least FIG. 1. As shown, drilling system 200 may comprise one or more well pads 202 (e.g., well pad 202-a, well pad 202-b), one or more spoke computers 208 (e.g., spoke computers 208-a, spoke computer 208-b), antenna systems 212 (e.g., antenna system 212-a, antenna system 212-b), a remote hub 214, and a database 230. While the illustrated embodiment shows two well pads 212, any number of well pads may be utilized. Each well pad 212 may include one or more well heads (shown as well head 102 in FIG. 1), where each well head can include a sensor (shown as acoustic sensor 104 in FIG. 1) and optionally an absolute pressure sensor (or static pressure sensor) directly coupled to fluids in the well (e.g., via the wellhead, circulating fluid line, or standpipe, to name a few non-limiting examples). Alternatively, each well may include an acoustic sensor and an optional absolute pressure sensor, and these sensors may not be directly coupled to fluids in the well via the well head. For instance, an adapter below the well head may be used to place the sensor(s) in direct communication with fluid in the well, or the vibration sensor may be coupled to a metal component (e.g., standpipe) of the well or well head.

The signals can either be sourced at the observation well (e.g., acoustic waves from a fracture initiation) or an adjacent or offset well (e.g., acoustic waves from a pumping truck). In some embodiments, the sensor(s) may be configured to couple to processors (e.g., Raspberry Pi) located in the spoke computers 208-a and/or 208-b. In some cases, a spoke computer 208 may comprise one or more processors for each well pad 202 in electronic communication with the respective spoke computer. In some embodiments, the one or more processors of the spoke computers 208 may be coupled to an antenna system 212. In some cases, the antenna system 212 may comprise an omnidirectional antenna, although other types of antennas are contemplated in different embodiments. Each antenna system 212 may be in communication with a wide area network (WAN), such as a 4G or 5G network. In another embodiment, the antennas of the antenna system 212 may form a local area wireless network wherein one of the antennas may be configured as an interface (e.g., a gateway) between the local area wireless network and a wide area network. In some embodiments, cellular (e.g., multi-beam antennas, sector antennas) or satellite (e.g., dish) antennas may be deployed for communication with a wide area network, to name a few non-limiting examples. Further, omnidirectional or Yagi type antennas, to name two non-limiting examples, may be utilized for local area network communication.

In some cases, the remote hub 214 may be in communication with the antenna systems 212 and the spoke computers 208. Further, the remote hub 214 may be configured to contact an insight program 226 via an Application Programming Interface (API) 224. In some examples, this communication may involve a local area network or a wide area network. Insight 226 may be configured to store data for a training model in the database 230, as well as to continually train the model using new data acquired from the acoustic sensors at the well heads. In some cases, the drilling system 200 may also support a web app 228 to provide one or more insights, warnings, feedback, and/or instructions to pad operators. In some examples, the web app 228 may be accessible via a user interface displayed on a user device (e.g., laptop, smartphone, tablet, etc.).

In some embodiments, the processors may comprise (or may be coupled to) a conversion and analysis component. In other embodiments, the processors may send their data through the network(s) to a centralized conversion and analysis component. In some cases, the centralized conversion and analysis component may or may not be located near the well pads 202. For instance, the centralized conversion and analysis component may be located off-site in some embodiments.

As illustrated, the drilling system 200 may further comprise one or more additional components, modules, and/or sub-systems, including, but not limited to, a Data Acquisition and Control System (DASTrac 216), a fracking client 218, a Coiled Tubing (CT) Data Acquisition module 220, and a CT client 222. In some cases, the DASTrac 216 may comprise a data acquisition and control program for acquiring fracking operations data from wellsite process control units and other sensors. Further, DASTrac 216 may be configured to display the acquired data from the data acquisition system in both numeric and graphical form in real time, which may enable operators to change job profiles, scale parameters, advance stages, change stages, and hold stages in response to seeing a determined cluster efficiency, to name a few non-limiting examples. In some cases, the CT Data Acquisition module 220 may be configured to measure and control technological parameters of coiled tubing units during repair and stimulation operations of oil and gas wells. The CT Data Acquisition module 220 may also be configured to record the measured technological parameters on electronic media, and optionally display and visualize them on an operator's computer display. In some cases, the CT client 222 may be configured to access coiled tubing data from the CT Data Acquisition module 220, for instance, directly via the API 224. In the oil and gas industry, coiled tubing may refer to a long metal pipe, usually anywhere between 1 to 3.25 inches in diameter (although other diameters are contemplated in different embodiments), which is supplied spooled on a reel. In some cases, coiled tubing may be used for interventions in oil and gas wells, as production tubing in depleted gas wells, and/or as an alternative to a wireline (i.e., the coiled tubing may be used to carry out operations similar to a wireline). In some embodiments, coiled tubing may be configured to perform open hole drilling and milling operations. Further, due to their high pressure tolerance abilities (e.g., ranging from 55,000 PSI to 120,000 PSI), they may also be utilized to fracture a reservoir. In some cases, one or more sensors (not shown) may be coupled to the coiled tubing and sent downhole. The CT Data Acquisition module 220 may collect real-time downhole measurements from the sensors, where the measurements may be used to model the fatigue on the coiled tubing, predict coiled tubing performance, fluid behavior at modeled downhole well conditions, to name a few non-limiting examples. In some cases, the real-time downhole measurements collected by the CT Data Acquisition module 220 may also be used to optimize treatments, for instance, during interventions (i.e., when the well is taken offline).

The spoke computers can include memory for storing electrical signals, a current frequency domain spectrum, or both, measured by sensors at one or more well heads, circulating fluid lines, or standpipes at the well pads 202-*a* and 202-*b*. The database 230 can also include memory for storing electrical signals, a current frequency domain spectrum, or both, measured by sensors at one or more well heads, circulating fluid lines, or standpipes at the well pads 202-*a* and 202-*b*. The database 230 can also be configured to store frequency domain spectra measured during previous hydraulic fracturing operations. The database 230 can also include previous classifications or identifications of subterranean activities and events associated with the previous frequency domain spectra. This may include a mapping between events or structures (e.g., a size, location, number, and/or dispersion of fractures) and previous frequency domain spectra. The database 230 may also store well outcomes associated with previous frequency domain spectra. For instance, an increase in well production after a fracking operation that resulted in some subterranean event (believed to be fracture initiation, extension or widening) that caused a certain previous frequency domain spectra. These outcomes can include well flow rate and fracture intersection with the wellbore, to name two non-limiting examples.

Figure 3:
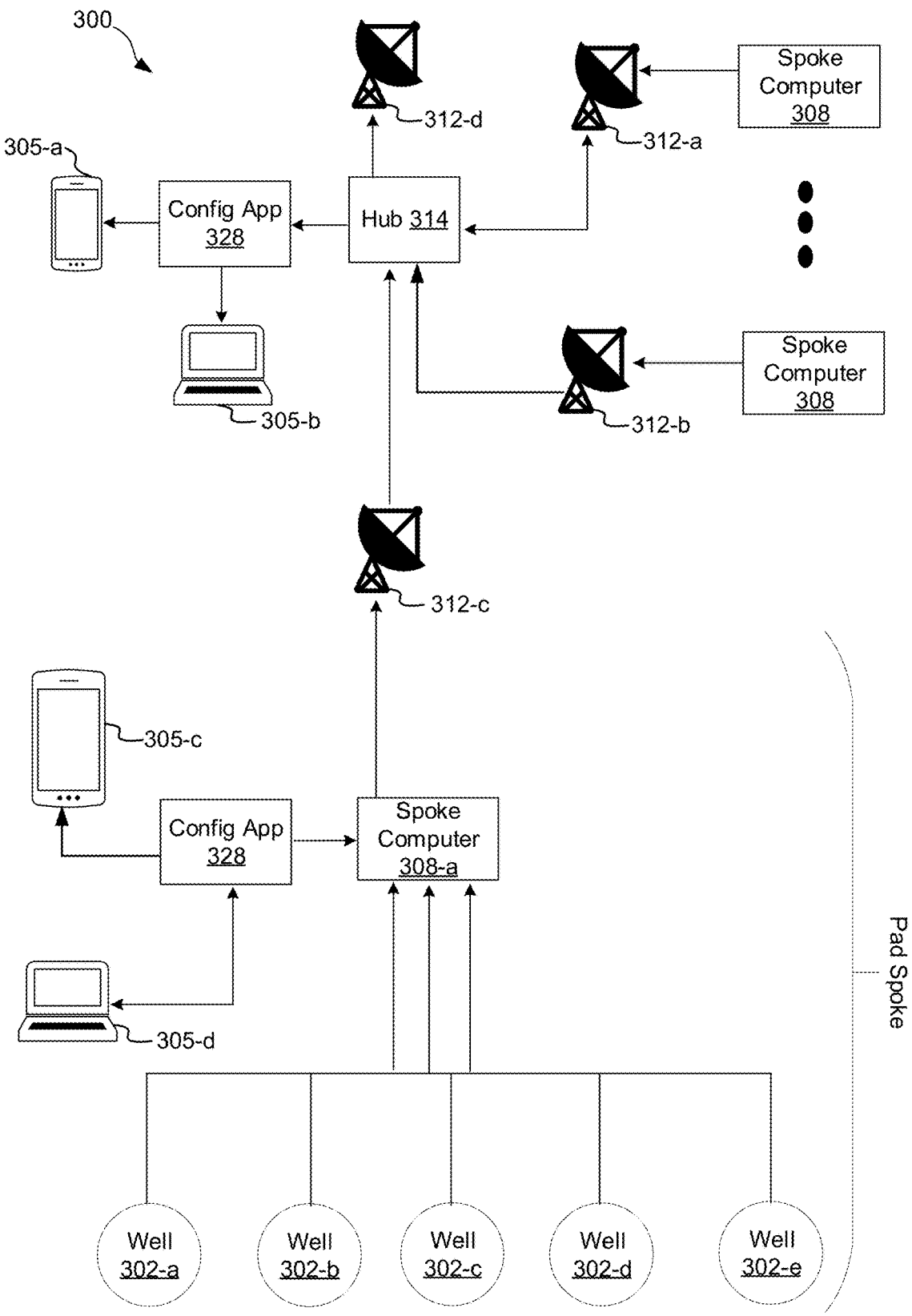
FIG. 3 illustrates a network structure for multiple spoke computers according to an embodiment of the disclosure.

FIG. 3 illustrates a network structure 300 for multiple spoke computers according to an alternate embodiment of the disclosure. As illustrated, the network structure 300 may comprise 'N' spoke computers 308, each including some or all the details shown in the spoke computer 308-*a*. In some examples, spoke computers 308 may be electronically and communicatively coupled to antenna systems 312. Further, each antenna system 312 may be in communication with a hub 314. Spoke computers 308, antenna systems 312, and hub 314 may be similar or substantially similar to spoke computers 208, antenna systems 212, and remote hub 214, respectively, previously described in relation to FIG. 2. In some examples, spoke computer 308-*a* may be in electronic communication with sensors (e.g., acoustic or vibration sensors) of a well pad (shown as well pad 202 in FIG. 2). As shown, the well pad may comprise one or more wells (i.e., wells 302-*a*, 302-*b*, 302-*c*, 302-*d*, and/or 302-*e*), each having an acoustic or vibration sensor. Further, these sensors may be configured to provide raw data (e.g., time domain acoustic or vibration signal data) to the spoke computer 308-*a*. In some embodiments, the spoke computers may be configured to wirelessly communicate with the hub 314. Furthermore, the hub 314 may be configured to communicate with a wide area network, for instance, via an antenna system 312 (e.g., 312-*d*). In some cases, one or more user/operator devices 305, such as user/operator devices 305-*a*, 305-*b*, 305-*c*, and/or 305 may be in communication with a configuration app 328. The configuration app (also referred to as config app 328) may be in communication with the hub 314 and may be used to assign sensors to particular wells 302 and/or spoke computers 308, for instance. The config app 328 may also be used for configuring one or more of the hub 314, the sensors, and the spoke computers 308.

Figure 4:
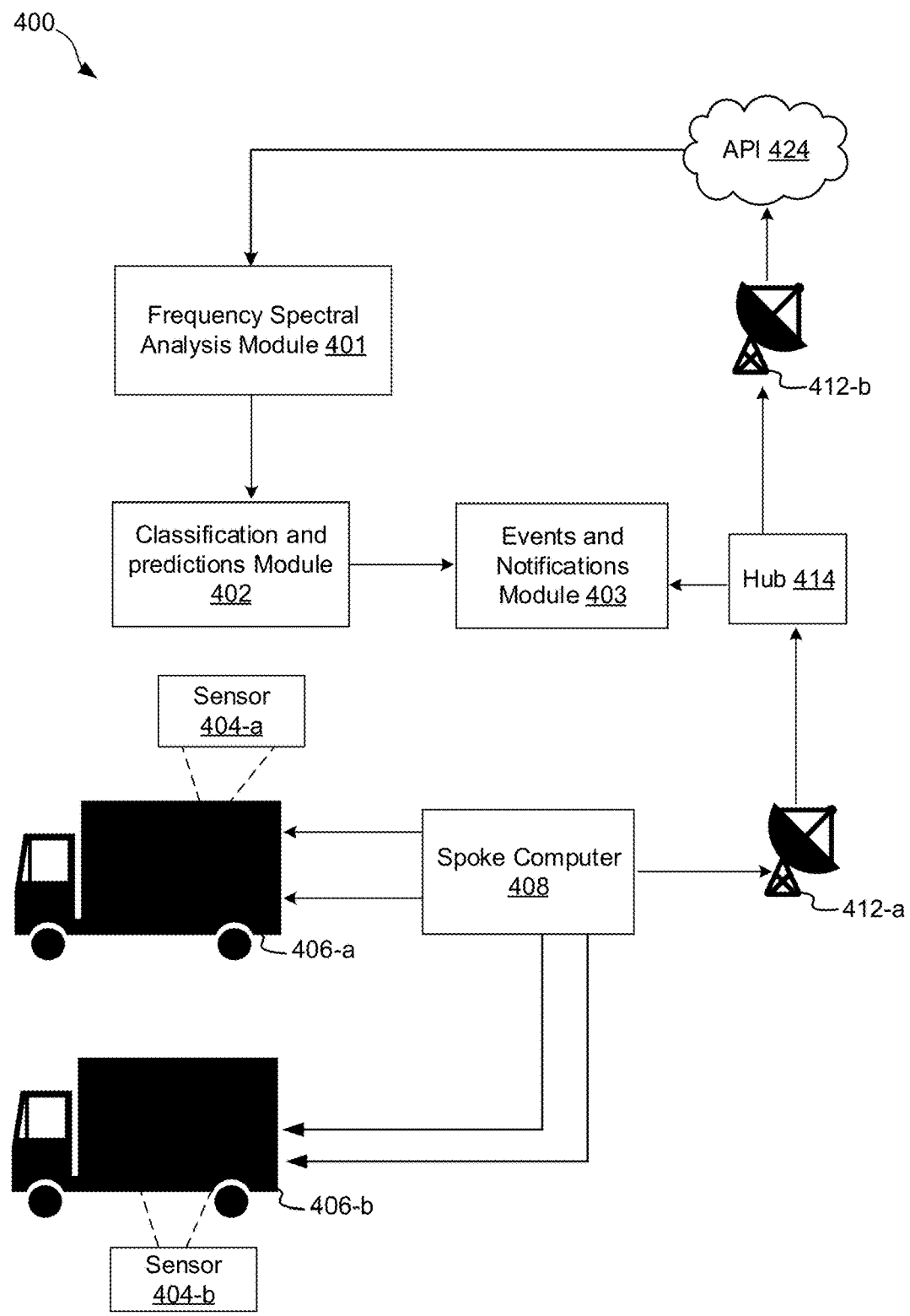
FIG. 4 illustrates a system for using frequency signatures of acoustic or vibration data to determine cluster efficiency according to an embodiment of the disclosure.

FIG. 4 illustrates a system 400 for using frequency signatures of acoustic or vibration data to determine cluster efficiency and/or for more evenly dispersing fractures within fracture clusters during hydraulic fracturing operations. In this illustration, one or more sensors 404 (e.g., sensor 404-a, sensor 404-b) are coupled to pump trucks 406 (e.g., pump truck 406-a, pump truck 406-b), where the one or more sensors 404 may be acoustic or vibration sensors. In some cases, the sensors 404 may be similar or substantially similar to the sensors 104 previously described in relation to FIG. 1. The sensors 404 can be configured to make direct or indirect measurements of acoustic or vibration waves in fracking fluid, for instance, via connection to a well's wellhead, circulating fluid lines, standpipe, or piping in a pump truck. In some embodiments, the sensors 404 may be configured to pass raw data (e.g., time domain acoustic or vibration signal data) to a spoke computer 408, which may implement one or more aspects of the spoke computers 208 and/or 308 described in FIGS. 2 and/or 3, respectively. Following reception of raw sensor data, the spoke computer 408 may transmit the raw data using wired or wireless communication to a hub 414. Alternatively, the spoke computer 408 may be configured to convert the raw data in the time domain to the frequency domain, for instance, using a FFT algorithm. As shown, the spoke computer 408 may be configured to communicate with the hub 414 using antenna system 412-a. Antenna systems 412 may be similar or substantially similar to the antenna systems 212 and 312 described in relation to FIGS. 2 and 3. The antenna systems 412 may comprise one or more of omnidirectional, Yagi, dish, and cellular antennas, to name a few non-limiting examples.

After hub 414 receives the data (e.g., raw data, or frequency domain sensor data) from spoke computer 408, it may further relay said data on to a frequency spectral analysis module 401 via antenna system 412-b and/or API 424. The API 424 may implement one or more aspects of API 224 discussed in relation to FIG. 2. In some examples, for instance, if the hub 414 receives time domain data from the spoke computer 408, the hub 414 may transmit the time domain data to a conversion and analysis component and receive converted frequency domain data, prior to relaying the frequency domain data to the API 424.

As illustrated, the frequency spectral analysis module 401 may be electronically and communicatively coupled to a classification and prediction module 402. The classification and prediction module 402 may be configured to determine if the frequency spectrum of the raw data aligns with signatures for known subterranean activity, such as fracture initiation, fracture extension, horizontal shifting, fracture intersection with well-bore, and fracture intersection with another fracture, to name a few non-limiting examples. Alignment with frequency signatures for known sizes, such as diameter and length of a fracture may also be looked for. If such a classification occurs, then an events and notification module 403 may be activated. In some circumstances, the events and notification module 403 may be configured to issue an indication to an operator of the pump truck 406 or well. Alternatively or in parallel, the classification and prediction module 402 may be configured to analyze raw time series data and determine if this raw data aligns with known time series signatures. If such a classification occurs, the events and notification module 403 may be activated to send an indicator to an operator.

Additionally or alternatively, the classification and prediction module 402 may be configured to analyze raw time series data, calculate fracture distance from the plug, calculate absolute fracture position based on a known position of the plug, repeat this for a plurality of fractures in a stage, and estimate a level of frac dispersion (i.e., are cracks dispersed or concentrated) and/or washout (i.e., is water going toward one crack because it is softer than other crack(s)), or even predict screenout, once positions of two or more fractures are known. As described later in the disclosure, a cluster efficiency may be assigned based on the estimations and/or predictions by the classification and prediction module 420. Furthermore, as previously described, fluid, mud, and proppant flowing through the well holes, perforations in stage walls, early screenout, washout, and/or fractures may be associated with identifiable signatures in the frequency domain and/or raw time domain data.

Figure 5:
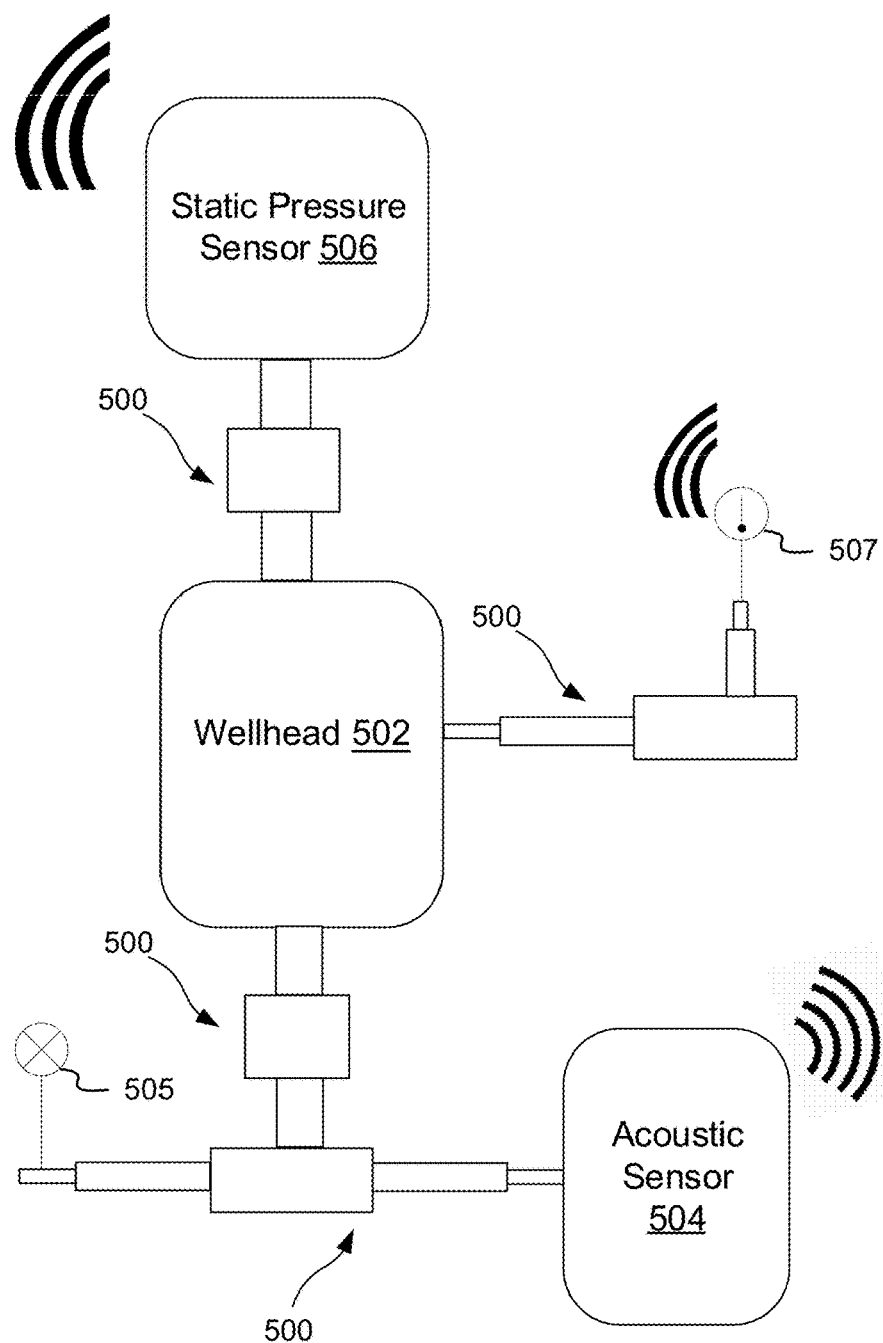
FIG. 5 illustrates a well head embodying the herein-disclosed acoustic sensor in accordance with one or more implementations.

FIG. 5 illustrates a wellhead assembly 500 comprising a wellhead 502 and one or more sensors. It should be noted that, the wellhead assembly 500 may be one of an observation or an offset wellhead assembly. As shown, the wellhead 502 may include several interfaces for various sensors such as a casing pressure sensor 505, a static pressure sensor 506, a tubing temperature sensor 507, an acoustic or vibration sensor 504, etc. In some embodiments, different sensors may be provided for the tubing and the casing since these are separate fluid paths. It should be noted that, the sensors depicted in FIG. 5 are not intended to be limiting, and more or fewer sensors may be utilized in other embodiments. For instance, in some examples, a tubing pressure sensor may be provided in addition to the casing pressure sensor 505. Additionally or alternatively, a casing temperature sensor may be provided along with the tubing temperature sensor 507. In some embodiments, the herein disclosed acoustic or vibration sensor 504 may be coupled to one of the interfaces of the wellhead 502, such that the acoustic or vibration sensor 504 is in direct physical contact with fluid in the wellhead 502. In some examples, the acoustic or vibration sensor 504 may comprise wireless transmission hardware for supporting communication with a spoke computer, hub, or wide area network (not shown).

In some cases, micro-fracturing in a well bore may be performed to define the stress field and fracture system, for instance, to optimize hydraulic fracturing well completion operations. It should be noted that, micro-fracturing is to be distinguished from fracturing of the bore hole after drilling, which is typically more intense and is done in order to facilitate the extraction of oil or gas from the well. In other words, micro-fracture testing may be performed for acquisition of information concerning the formation and may be used to optimize fracturing. In some cases, the sensors illustrated in FIG. 5, especially the pressure sensors, may be used for micro-fracture testing.

In some cases, acoustic data can be supplemented by graphs of pressure versus time and pressure versus pumped volume. These may be generated by a surface computer system (or alternatively, a remote computer system). An operator or user may control the conduct of the test based on the generated graphs. For example, the operator may run the pump pressurizing the bore hole until a drop off or leveling out of the pressure becomes evident, indicating that significant fracturing has occurred. In some cases, after the pump is shut down, the operator may continue to monitor the graph of pressure versus time in the bore hole. Examination of this data, together with surface pressure and flow data, may be used to determine the pressure at which fracture initiation occurs (i.e., the bore hole pressure below which the fractures will begin to close), when fractures are propagated (i.e., pressures at different flow rates (fracture conductivity)), and when primary and potentially later closure pressures are attained (i.e., when the test is completed).

In some cases, micro-fracture testing, unlike leak off tests, may be performed a number of times along the well bore within the producing reservoir. Microfracture testing may be used to study when and how fractures develop as pressure increases (e.g., a slight decrease in pressure may be observed when a fracture occurs when pressure rises to X). Study of microfracture testing graphs may also provide insight on how cracks propagate, as well as how fluids flow into extending or open fractures (e.g., after the slight drop in pressure from X, constant pressure Y may be observed despite the pump continuing to pump fluid into an isolated zone of the bore hole). In some cases, these microfracture testing graphs may provide insight on fracture dispersion, cluster efficiency and/or spacing, etc., which may be useful in optimizing current and subsequent fracturing stages. Furthermore, microfracture testing may also be used to understand the closure of fractures as pressure reduces. For instance, when the pump is stopped, a decay in pressure may be observed even though fluid continues to seep into the formation. However, in some circumstances, the rate of pressure decay may reduce over time, which is indicative of the closure of the fracture as the pressure reduces. In other words, as the fracture becomes smaller, the rate of fluid seepage into the formation, and therefore the rate of pressure decay, decreases. In some cases, after the pressure has decayed, the pressurization of the isolated zone may be repeated to gain additional information concerning the pressure(s) at which fractures in the formation proximate a zone of the bore hole will open and close.

As described above, in some embodiments, the cluster efficiency may be determined by analyzing the fluctuations or vibrations in the fracking fluid in a wellhead, circulating fluid line, or standpipe of the well (i.e., via measurement of acoustics in the fluid), or alternatively, by feeling vibrations through a metal component of the wellhead. In some cases, this analysis may involve acquiring dynamic acoustic or vibration pressure data from the well's fluid (e.g., fracking fluid) in a time domain, and optionally converting it into a frequency spectrum or frequency domain. In some circumstances, the analysis can focus on identifying distinct amplitude peaks corresponding to a fracture initiation, wherein a first amplitude peak may correspond to an arrival time of a primary wave generated by the fracture initiation, while a second amplitude peak may correspond to an arrival time of a reflected wave (e.g., a wave reflected off a plug at an end of a current fracking stage of the well) generated by the fracture initiation. In one example, after identifying pops associated with fracture initiation via an FFT algorithm (or another Discrete Fourier Transform (DFT) algorithm), the distance of a fracture initiation from a plug may be obtained (e.g., using equations (1) and (2) described above) to pin-point an origination of the shockwave (i.e., location of the fracture initiation). In some cases, since the location of the plug and the speed of sound/acoustic vibrations through the fracking fluid is known, the distance of the fracture initiation may be obtained based on a difference of the timing of the primary wave generated by the fracture initiation and the secondary or reflected wave reflected off the plug, along with one or more other known quantities.

Figure 6:
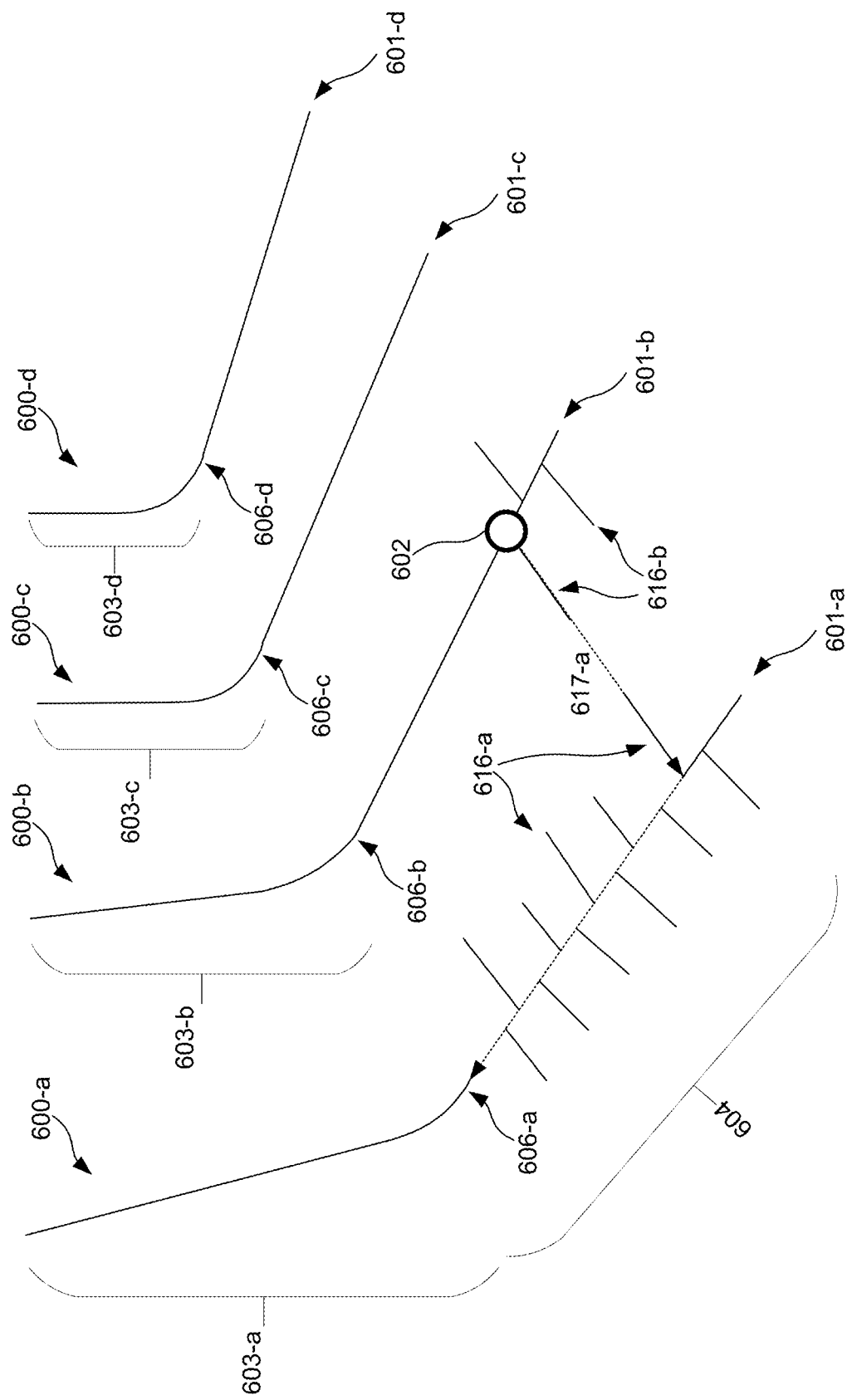
FIG. 6 illustrates an isometric view of four offset wells, each including a vertical and horizontal region separated by the heel, in accordance with one or more implementations and a first path of acoustic or vibration waves.

FIG. 6 illustrates an isometric view of four offset wells 600 (e.g., offset wells 600-a, 600-b, 600-c, and 600-d), each including a vertical (e.g., vertical regions 603-a, 603-b, 603-c, and 603-d) and a horizontal region 604 separated by a heel 606 (e.g., heel 606-a, 606-b, 606-c, 606-d). The horizontal region 604 of each offset well 600 connects a respective heel 606 to a toe 601 (e.g., toe 601-a, toe 601-b, toe 601-c, toe 601-d). In this example, an event 602 has occurred near the toe 601-b of the second offset well 600-b. An acoustic sensor or vibration as described earlier may be coupled to a top or wellhead of the first offset well 600-a (e.g., a wellhead, circulating fluid line, or standpipe). In this case, the first offset well 600-a may be referred to as the observation well. In some cases, the acoustic sensor at the wellhead of the first offset well 600-a may detect the event 602 at the second well based on detecting sound or vibrations passing through the underground formation separating the two offset wells 600-a and 600-b. In some cases, the sound or vibrations associated with the event 602 may also pass through one or more fractures 616 (e.g., fractures 616-a, 616-b) off of one or both wells, reflect off of a plug or perf gun (or another wireline tool) in the first and/or second offset well 600, etc. Because pressure or sound tend to move more quickly through dense rock than through fluids in a fracture or in a well, event 602 may be detected multiple times at the acoustic sensor. In some cases, the pressure or sound measured by the acoustic sensor may be recorded in a digital format as a time series or in the time domain, also referred to as a trace, over a given time period. In some cases, the sound or vibration energy recorded may be projected back to multiple possible points of origin for the event in the underground formation. A microseismic event such as a fracture emits energy (e.g., sound or vibrations) that is detected and recorded by the acoustic sensor at the top or wellhead of well 600-a. In some cases, multiple acoustic sensors may be utilized. For instance, each well 600 may comprise an acoustic sensor at its wellhead. The microseismic data recorded at the one or more acoustic sensors may be projected back to a possible point of origin for event 602, for instance, based on applying one or more time shifts.

In some circumstances, the analysis can focus on identifying distinct amplitude peaks corresponding to a fracture initiation, wherein a first amplitude peak may correspond to an arrival time of a primary wave generated by the fracture initiation, while a second amplitude peak may correspond to an arrival time of a reflected wave (e.g., a wave reflected off a plug at an end of a current fracking stage of the well) generated by the fracture initiation, further described below in relation to FIG. 20. In one example, after identifying pops associated with fracture initiation via an FFT algorithm (or another Discrete Fourier Transform (DFT) algorithm), the distance of a fracture initiation or cluster from a plug may be obtained (e.g., using equations (1) and (2) described above) to pin-point an origination of the shockwave (i.e., location of the fracture initiation).

Figure 7:
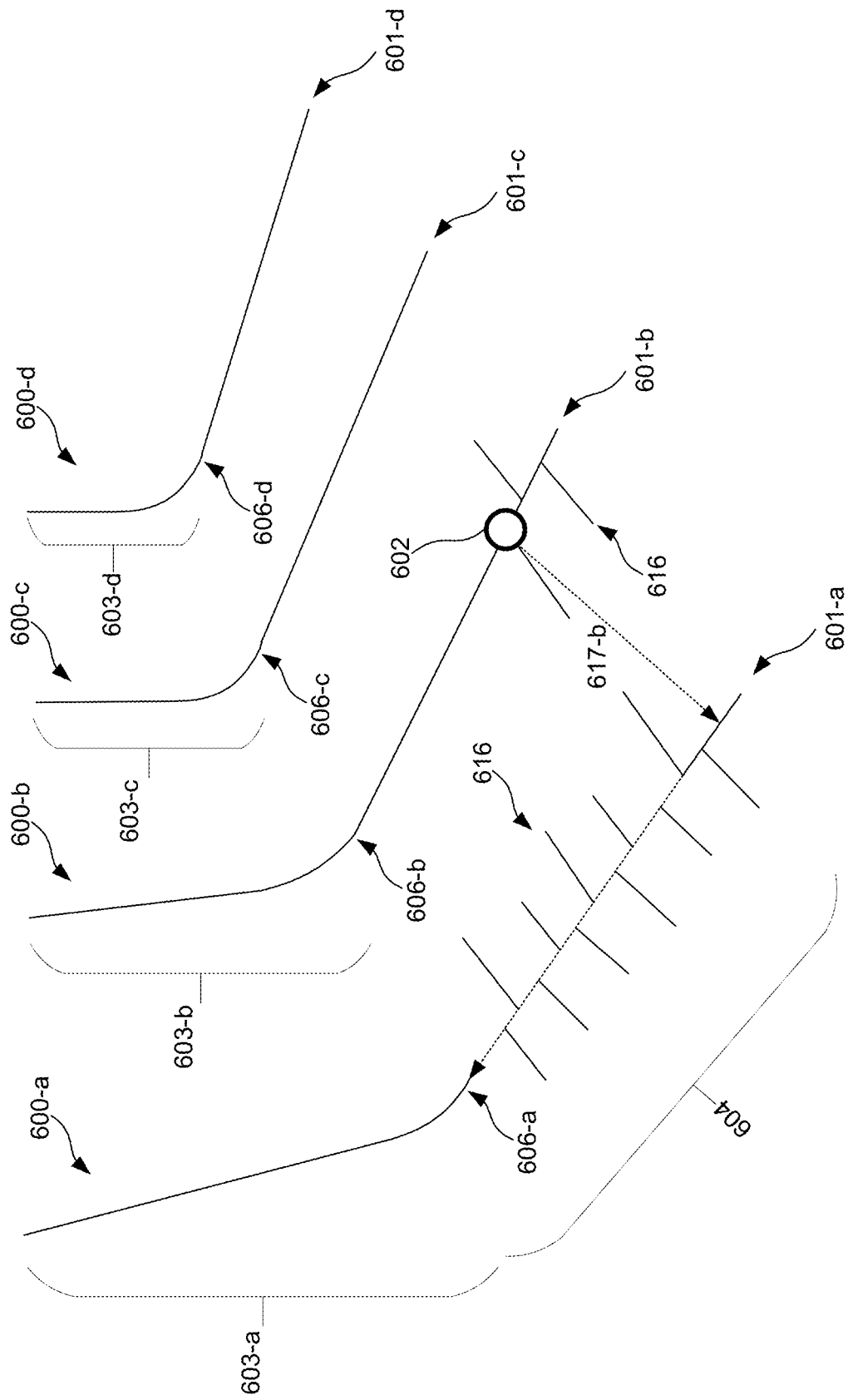
FIG. 7 illustrates the isometric view of the four offset wells of FIG. 6 and a second path of acoustic or vibration waves.
Figure 8:
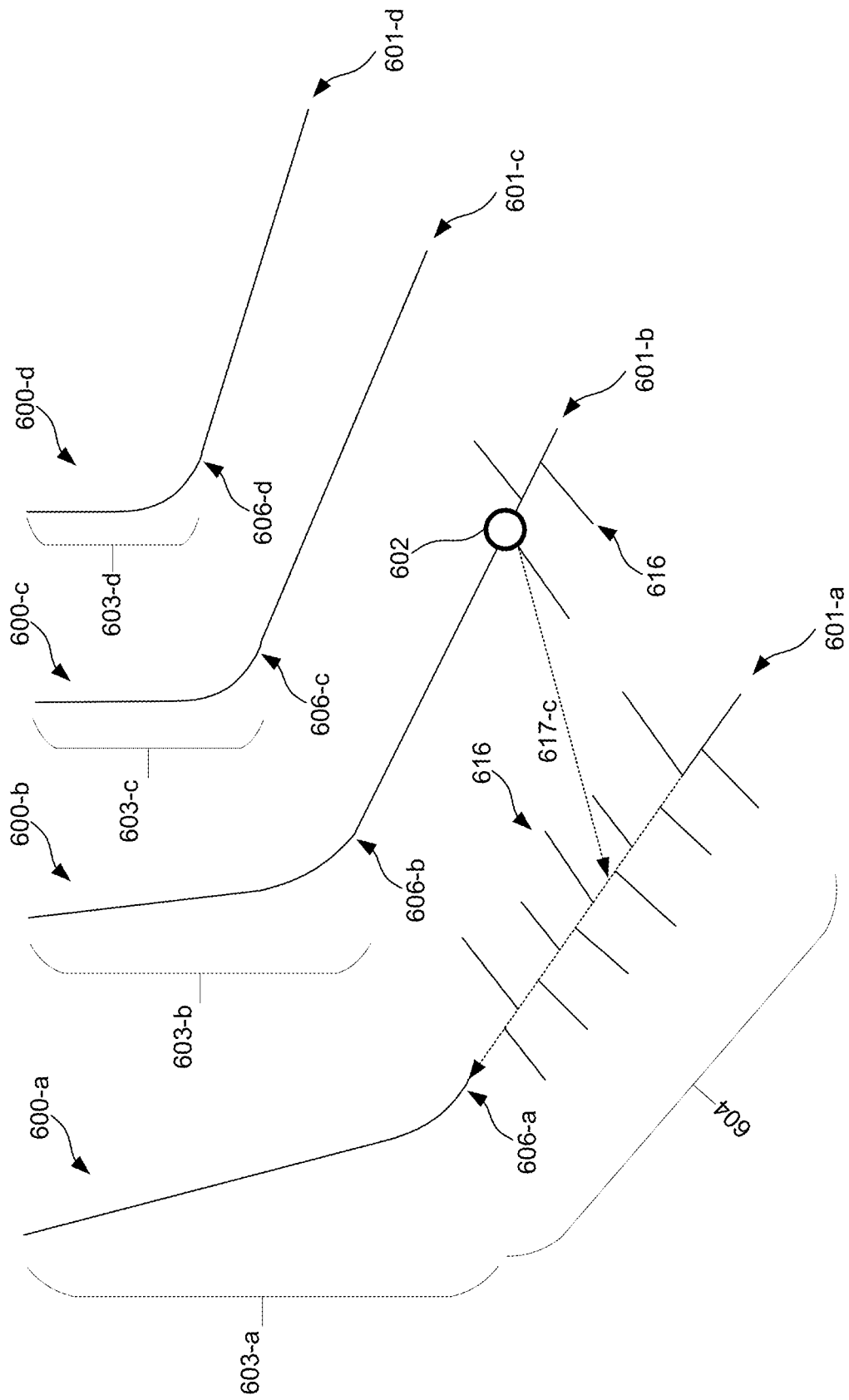
FIG. 8 illustrates the isometric view of the four offset wells of FIG. 6 and a third path of acoustic or vibration waves.
Figure 9:
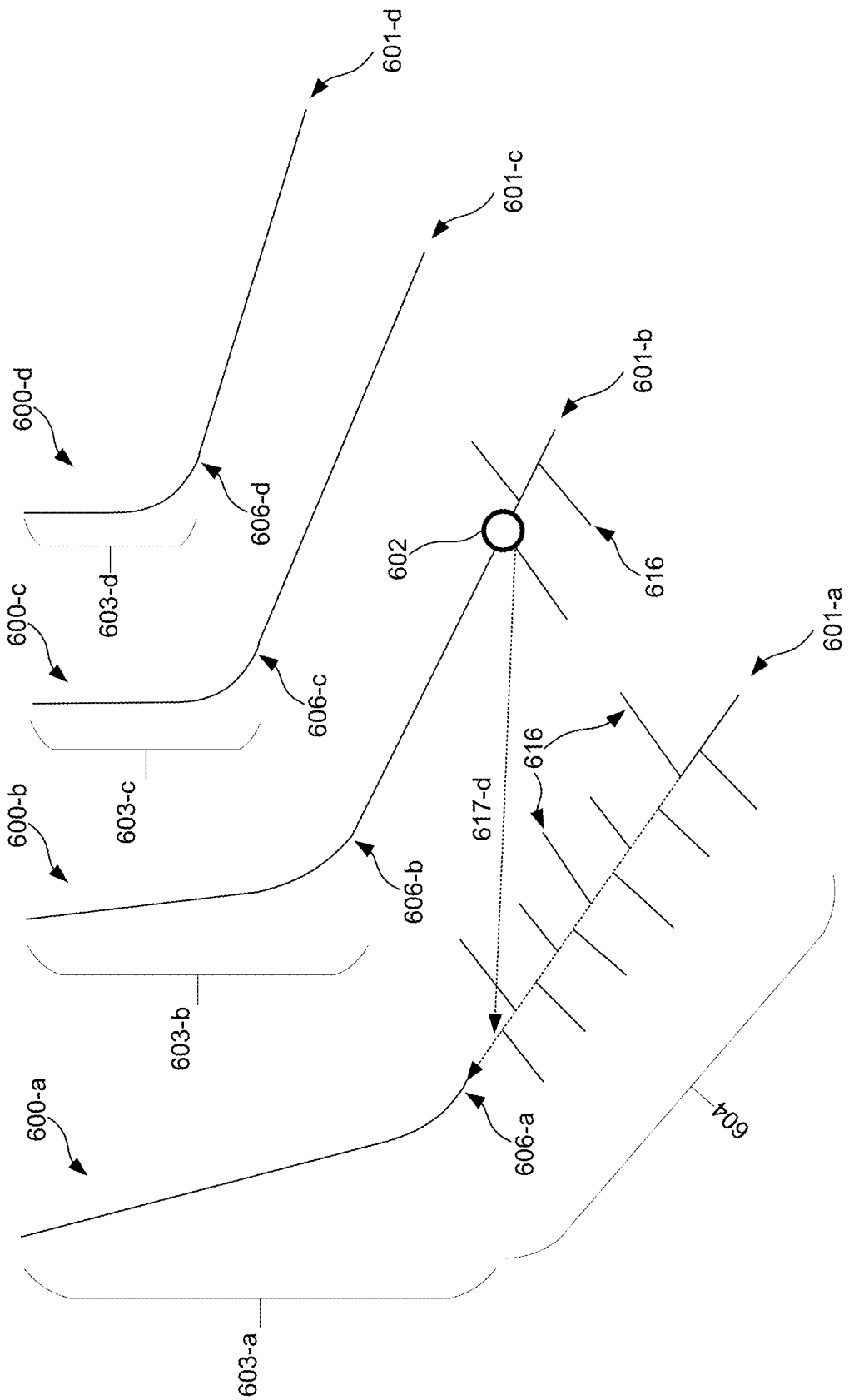
FIG. 9 illustrates the isometric view of the four offset wells of FIG. 6 and a fourth path of acoustic or vibration waves.
Figure 10:
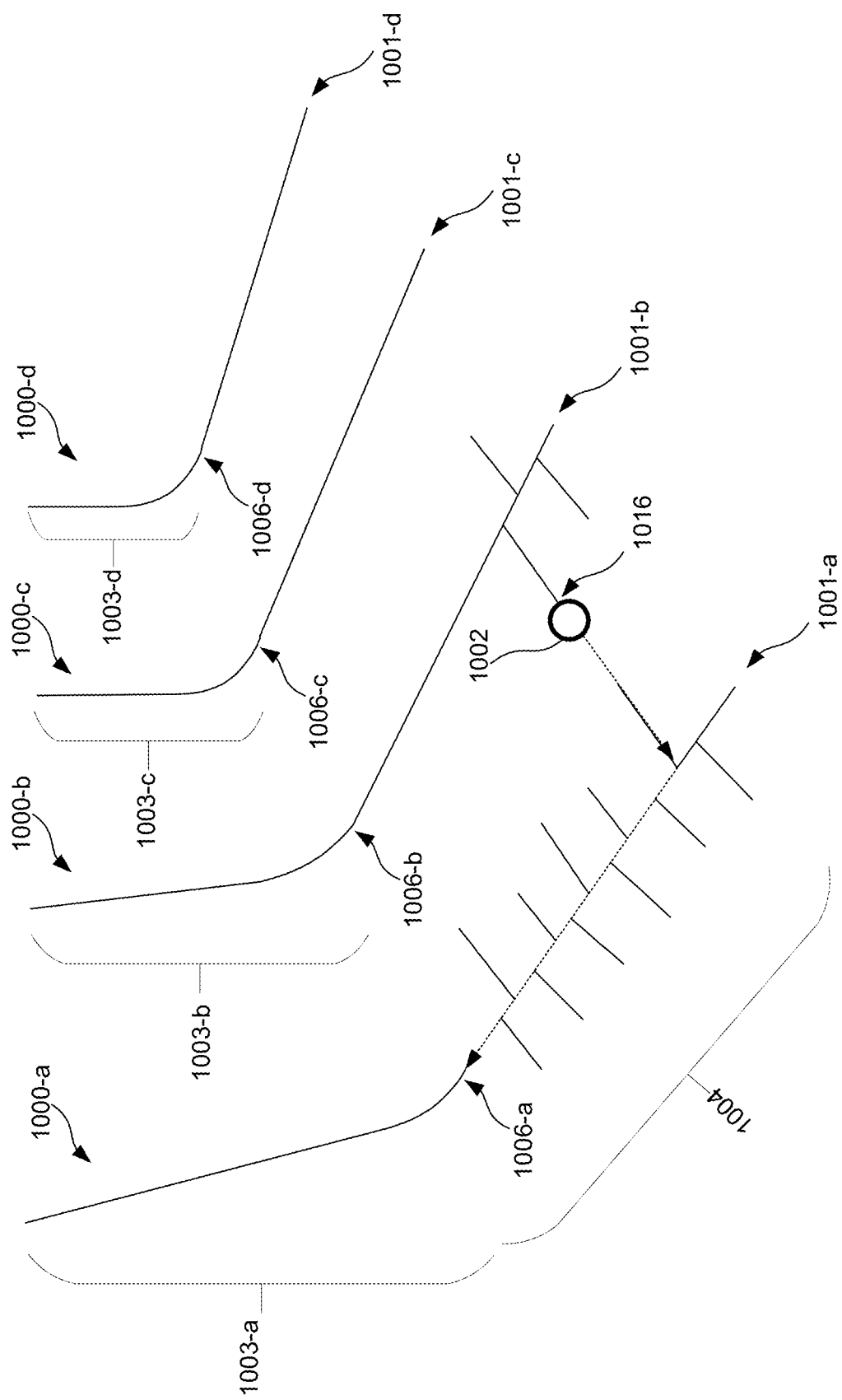
FIG. 10 illustrate the isometric view of the four offset wells of FIG. 6, but with a different fracture event and a first path of acoustic or vibration waves from the different fracture event.
Figure 11:
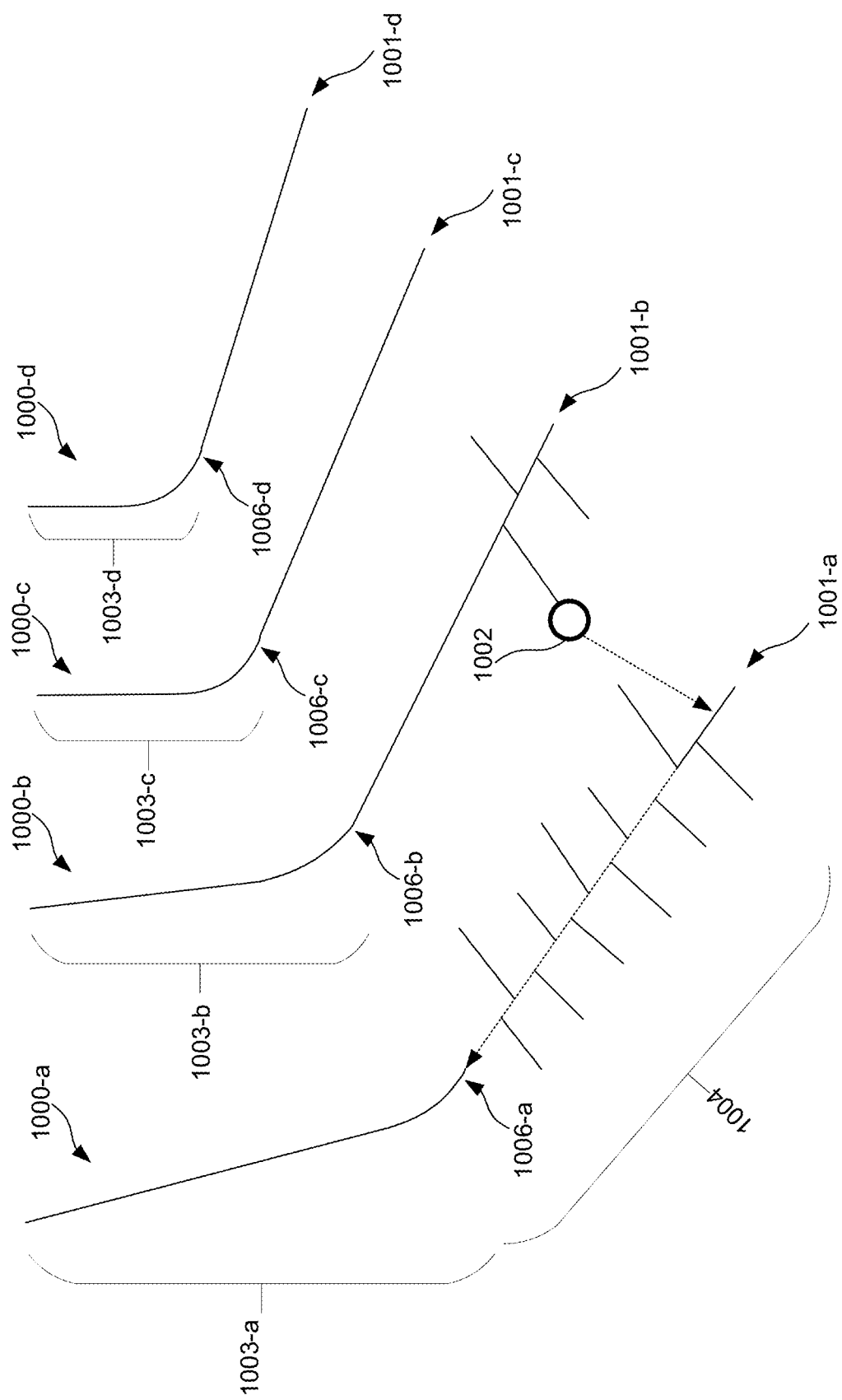
FIG. 11 illustrates the isometric view of the four offset wells of FIG. 10 and a second path of acoustic or vibration waves.
Figure 12:
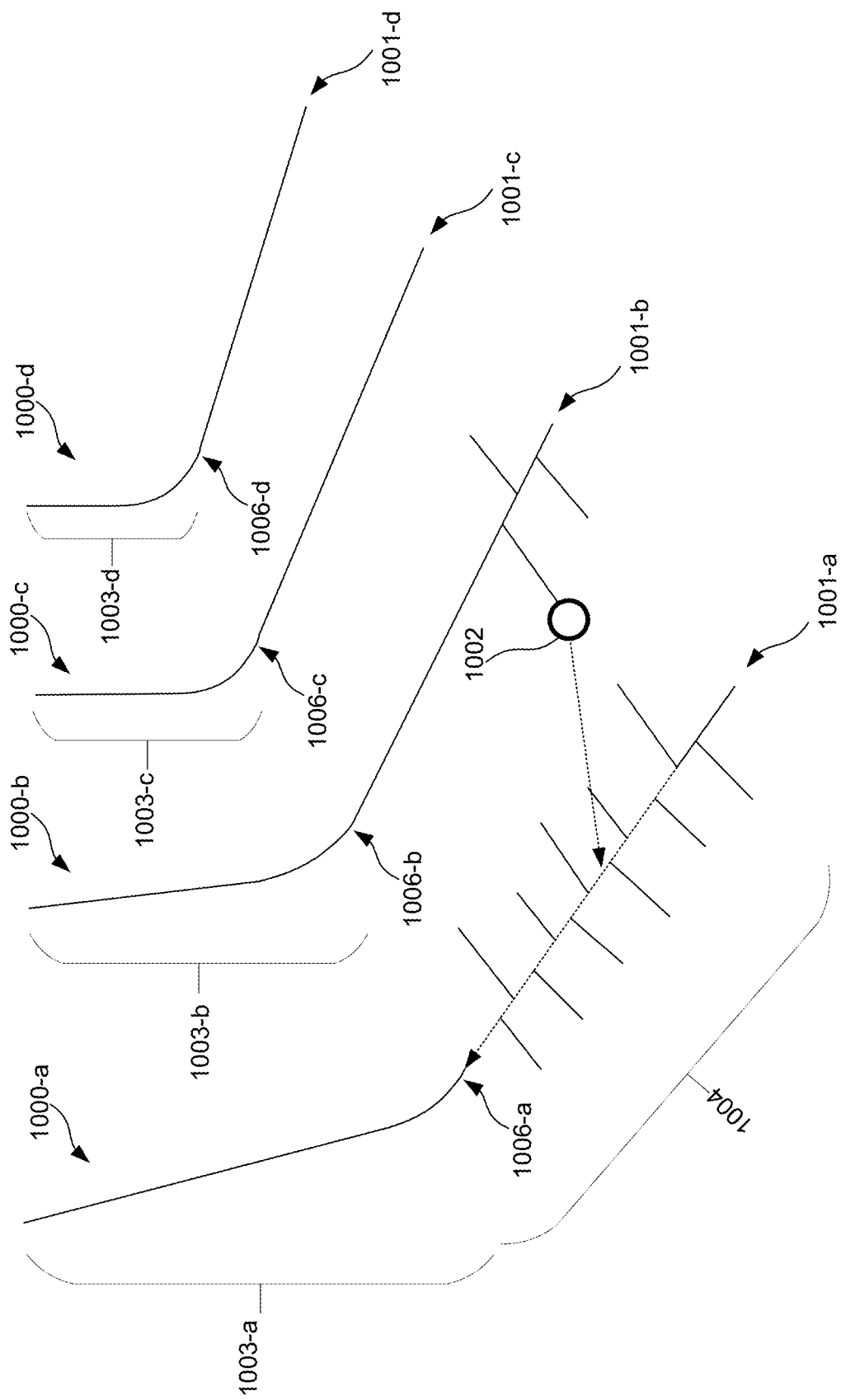
FIG. 12 illustrates the isometric view of the four offset wells of FIG. 10 and a third path of acoustic or vibration waves
Figure 13:
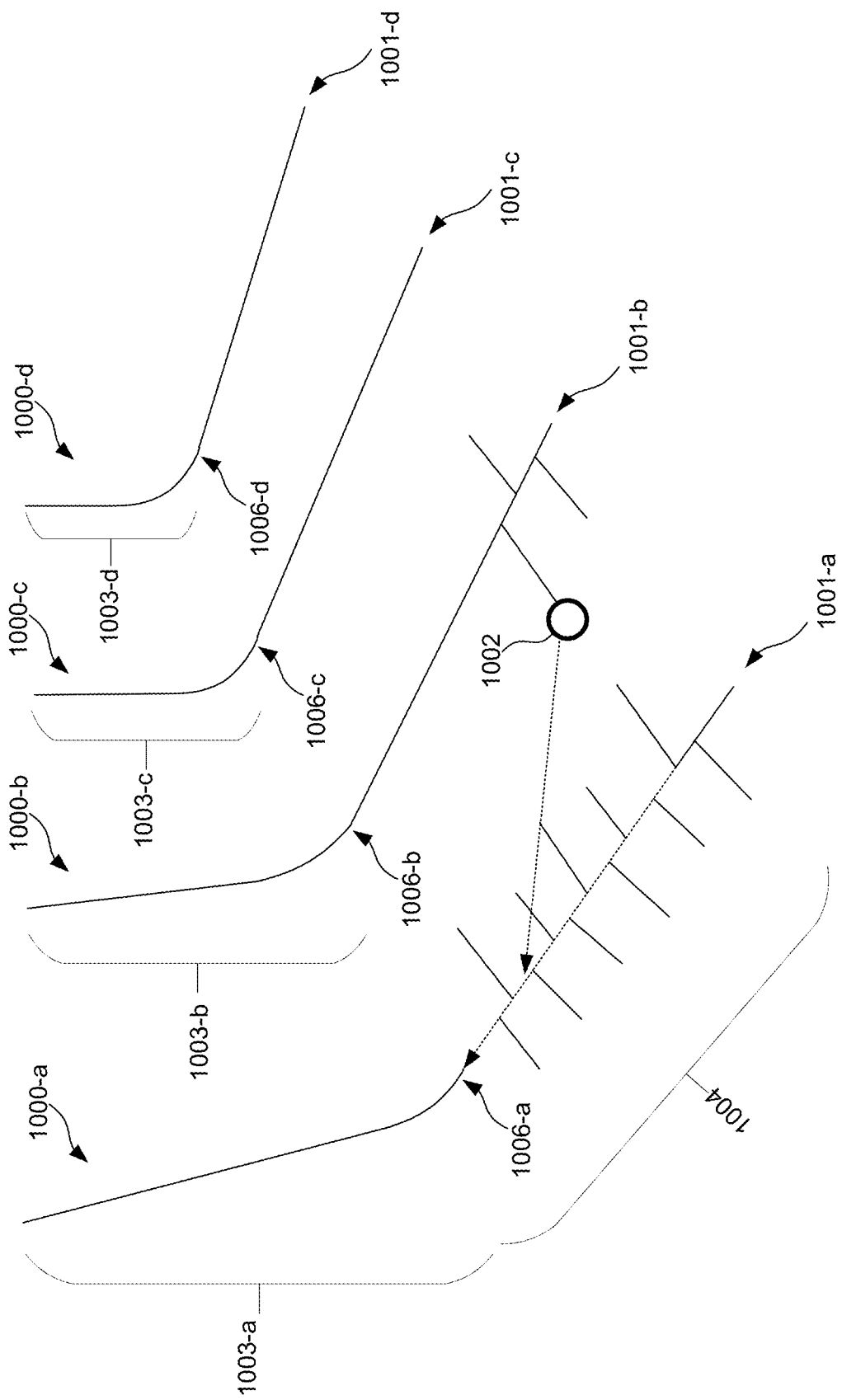
FIG. 13 illustrates the isometric view of the four offset wells of FIG. 10 and a fourth path of acoustic or vibration waves

FIGS. 7, 8, and 9 implement one or more aspects of the figures described herein, including at least FIG. 6. For instance, FIGS. 6-9 show example paths (i.e., path 617-a, path 617-b, path 617-c, and path 617-d) followed by the sound or vibrations from the event 602 to the heel 606-a of the first observation well 600-a. After arriving at the heel 606-a of the first observation well 600-a, the sound or vibration signals may follow the vertical wellbore (i.e., vertical region 603-a of the first observation well) and arrive at different times at the acoustic sensor of the wellhead. In particular, FIG. 6 shows sound or vibrations passing from the event 602 through fractures 616-a and 616-b of wells 600-a and 600-b, respectively, as well as a small portion of rock between those fractures. In some cases, the sound or vibrations may then travel through the horizontal region 604 of the well 600-a towards the heel 606-a. Because much of the path in FIG. 6 involves sound passing through fluids rather than solid rock, the path in FIG. 6 may be slower than the paths seen in FIGS. 7-9.

FIG. 7 shows a path slightly longer in distance than that in FIG. 6, but one where the sound or vibrations travel primarily through rock between the two wells 600-*a* and 600-*b* and then through the fluid in the well 600-*a* to the heel 606-*a*. As previously described, despite the longer distance traveled, the signal in FIG. 7 may arrive at the acoustic sensor before the signal in FIG. 6, since more of this path is through rock than the path seen in FIG. 6. FIGS. 8 and 9 show shorter paths than those seen in either of FIGS. 6 and 7. Further, the paths traveled by the sound or vibration from event 602 in FIGS. 8 and 9 may be primarily through rock. The combination of an overall shorter path length, as well as a greater path length through rock as compared to fluid, may enable the signals in FIGS. 8 and 9 to reach the acoustic sensor before the signals in either of FIGS. 6 and 7.

It should be noted that, the specifics of the FIGS. 6 through 7 are not as important as the fact that the acoustic or vibration sensor at the wellhead of the first well 600-*a* is likely to hear ringing, or multiple instances of the signal (or vibrations) associated with event 602, where each instance arrives at a different time. In some cases, deconvolution of the arriving signal may be used to separate each of the various signals following different paths and arriving from the event 602. In some embodiments, this ringing may be correlated with ringing from previously-monitored events. In this way, analyzing the ringing may allow a structure of the wells 600 and their fractures 616 to be assessed, assuming some knowledge about the rock formation. For instance, analysis of the ringing may provide operators with insight on a level of fracture dispersion and whether the cracks are dispersed or concentrated. Alternatively, if some understanding of the wells 600 and fractures 616 is already known, an analysis of the ringing may help determine a structure of the rock formation. In some circumstances, the rock formation may not be of a uniform density, and thus, some cracks may be softer than others. In such cases, water or other fluids flowing through the well bore may veer towards some cracks (e.g., softer cracks) over other cracks surrounded by a harder rock formation. Such a situation where water or fluids flow in an unequal manner towards different cracks based on their softness level may also be referred to as washout. In some cases, washout may be predicted by analyzing the ringing detected at the acoustic or vibration sensor at the wellhead.

FIGS. 10-13 show a similar concept as FIGS. 6-9, but for an offset well event 1002 occurring within or near an end of a fracture 1016. As shown, FIGS. 10-13 illustrate an isometric view of four offset wells 1000 (e.g., offset wells 1000-*a*, 1000-*b*, 1000-*c*, and 1000-*d*), each including a vertical (e.g., vertical regions 1003-*a*, 1003-*b*, 1003-*c*, and 1003-*d*) and a horizontal region 1004 separated by a heel 1006 (e.g., heel 1006-*a*, 1006-*b*, 1006-*c*, 1006-*d*). The horizontal region 1004 of each offset well 1000 connects a respective heel 1006 to a toe 1001 (e.g., toe 1001-*a*, toe 1001-*b*, toe 1001-*c*, toe 1001-*d*). In this example, an event 1002 has occurred within or near an end of the fracture 1016, where the fracture 1016 is located near proximal to the toe 1001-*b* (as opposed to the heel 1006-*b*) of the second offset well 1000-*b*. In some cases, an acoustic or vibration sensor (not shown) may be coupled to a top or wellhead of the first offset well 1000-*a* (e.g., at a wellhead, circulating fluid line, or standpipe). The acoustic sensor may be in direct or indirect contact with a fluid in the well or wellhead, and may be configured to measure acoustic signals in the fluid. Additionally or alternatively, a vibration sensor (not shown) may be attached to a component (e.g., metal component, such as a pipe) of the wellhead. In such cases, vibrations felt through the metal component may also be measured and recorded. Similar to FIGS. 6-9, the acoustic or vibration sensor at the well head of the observation well (i.e., first offset well 1000-*a*) may hear ringing, or multiple instances of the signal or vibrations associated with event 1002, since each instance may arrive at a different time based on the amount of path length through rock, fluid, etc. Analysis of this ringing and time or frequency signatures obtained from the signal data may allow a cluster efficiency or a distance from a frac initiation to the plug to be determined, for instance.

FIGS. 14-16 show different views of an exemplary spectral plot 1400 with four frequency spikes associated with a frac initiation in an observation well. This plot was created from actual acoustic sensor data taken over a period of time and then converted to a spectral plot via Fourier Transform. In this example, four frequencies dominate above the noise baseline and three of these spikes have relatively the same amplitude. In some cases, the amplitudes may be correlated to a size of the fracture (e.g., diameter, length, or volume). Further, these four frequencies may correspond to a formation of a fracture during one stage of a multi-stage fracturing process. While not shown, other frequencies, or other combinations of frequencies may indicate other events, such as communication between wells, frac initiation at an offset well, pump deployment at an offset well, etc. Furthermore, although spectral plot 1400 shows spikes for an event in an observation well (i.e., the well being monitored), in other illustrations, such spikes may represent activities in an offset well. In such cases, the events or activities may be heard or felt through intervening rock/soil between the observation and offset wells.

The spectral artifacts seen in FIGS. 14-16 are exemplary only but may be used to illustrate the analysis of any spectrum detected by the acoustic sensors. For instance, each of one or more spikes in a spectrum can be classified by intensity, amplitude, and/or stage relative perforation intensity (SRPI). There may be a separate classification for each spike, or an average of two or more spikes may be used in a classification. Each of one or more spikes may also be classified by the frac stage in which the spike occurred and/or a time that the spike occurred within a given frac stage. Each of one or more spikes may also be classified by a max or central frequency as well as a frequency width (i.e., the bandwidth or distance between high and low frequencies for a spike). In some embodiments, the spectral plot showing the frequency spikes may be used to generate a frequency signature, where the frequency signature may be associated with the event or activity. In some cases, the frequency signature may be labeled by a trained model and used to further train the model to identify similar frequency signatures associated with future events. Changes in the spectrum over time may also be associated with a frequency signature (e.g., where a frequency peak shifts at a recognizable rate).

In some embodiments, analysis of acoustic data may involve consideration of at least one model pertaining to the interaction of fluids with subterranean rock. For instance, uncoupled models can be used in cases where the stress/displacement analysis of the reservoir rock assumes that the rock is elastic. The fracture aperture can be computed from the elastic constants of the rock, in-situ stresses, and pressure distribution inside the fracture. Calculation of the fluid loss to the formation can be based on Carter's 1D diffusion solution, which predicts an instantaneous leakage inversely proportional to the square root of the wetting time. There is no direct interaction between the diffusion and deformation processes, except for a leak-off term in the mass-conservation equations of the fluid-flow analysis inside the fracture. In another example, partially coupled models can be used where the stress/displacement analysis is still based on the assumptions of elasticity. The fluid loss is calculated exactly, within the framework of the linear diffusion law, by distributing fluid sources along the fracture. The effect of pore-pressure gradient (caused by leakoff) on rock deformation and therefore on fracture width may be accounted for with the concept of back stress. In yet another example, fully coupled models can be implemented that include the full range of coupled diffusion/deformation effects predicted by Biot's theory of poroelasticity: sensitivity of the volumetric response of the rock to the rate of loading, pore-pressure change induced by the variation of mean stress, and back-stress effects already accounted for in the partially coupled models. The fully coupled model may assist in assessing fracture quality, including a level of fracture dispersion, cluster efficiency, counts (i.e., of fractures or cracks) for each cluster, presence of fractures that are either too long or too short, to name a few non-limiting examples.

In general, AI models aim to learn a function (f(X)) which provides the most precise correlation between input values (X) and output values (Y), such that Y=f(X). The artificial intelligence (AI) models described throughout this disclosure may be of a variety of types, for example linear regression models, logistic regression models, linear discriminant analysis models, decision tree models, naïve bayes models, K-nearest neighbors models, learning vector quantization models, support vector machines, bagging and random forest models, and deep neural networks.

In some embodiments, a plurality of distinct machine-learning algorithms may operate in parallel, which may serve to enhance the accuracy of the techniques described herein. In some aspects, the use of multiple machine-learning algorithms may also decrease false positive indications as compared to the use of a single machine learning algorithm. In some cases, a combination of three or four machine learning algorithms may operate in parallel, which may provide a balance of high accuracy versus system complexity. Some non-limiting examples of machine learning algorithms may include a neural network, a decision tree, a support vector machine, and Bayesian methods.

Cluster Efficiency

This disclosure now turns to using the acquisition and analysis of high frequency acoustic or vibration data in the time and/or frequency domain to provide real-time quantitative feedback on fracking operations (such as, but not limited to, fracture initiation or formation, number/count per cluster, and fracture dispersion). Whereas traditional subterranean analysis, such as microseismic monitoring, takes in massive amounts of data, requiring slow off-site computation, high frequency acoustic or vibration data can provide greater insights with less data processing by using one sensor per well. Further, since the processing requirements are significantly lower as compared to traditional techniques, feedback may be in real-time (or close to real time), and processing may be performed on cheaper, less computationally powerful, on-site computers. In some embodiments, a single acoustic or vibration sensor may be used to provide both position and quality information about cracks. In some cases, one or more of the following parameters may be determined for a given crack or a set of cracks: (1) connection to the well; (2) connection to another crack; (3) diameter; (4) length; (5) whether the crack has been propped or initiated; (6) quality and/or volume of fluid flow within the crack; (7) number; (8) location and/or depth, for instance with respect to the plug or the surface; and (9) cross-section.

In an embodiment, individual cracks can be identified in the frequency domain of the acoustic/vibration data. In some cases, the acoustic/vibration signal data may comprise a plurality of frequency domain features, where the frequency domain features are indicative of the acoustic or vibration signal across a frequency spectrum. By comparing the plurality of frequency domain features with one or more known frac initiation signatures and/or frac dispersion signatures, a level of frac dispersion (i.e., are cracks disperses or concentrated) may also be obtained. As previously noted, a Fourier Transform may be used to generate a frequency domain representation of the time domain data, for instance. In some embodiments, a Short Time Fourier Transform (STFT) technique, a Discrete Fourier Transform (DFT) technique, or a Fast Fourier Transform (FFT) algorithm may be used for the Fourier analysis.

In some other cases, "pops" or acoustic vibrations generated by a fracture initiation may be measured and recorded by the acoustic/vibration sensor. As noted above, one or more distinct waves (i.e., primary waves, reflected waves) may be measured and identified by analyzing an electrical signal in the time domain for a window of time. For instance, two amplitude peaks corresponding to the fracture initiation may be identified, where a first of the two amplitude peaks corresponds to an arrival time of a primary wave generated by the fracture initiation, while a second of the two amplitude peaks corresponds to an arrival time of a reflected wave generated by the fracture initiation and reflected off a plug at an end of a current fracking stage of the well. By measuring a time difference between when the two amplitude peaks arrive at the sensor and performing one or more operations shown in equations (1) and (2), above, a location of the fracture initiation may be estimated. The location of the fracture initiation may be based at least in part on the distance between the fracture initiation and the plug. Further, the distance between the fracture initiation and the plug may be calculated by dividing the time difference between the arrival of the first and second amplitude peaks by two and multiplying that result by a speed of sound in the fracking fluid.

Figure 17:
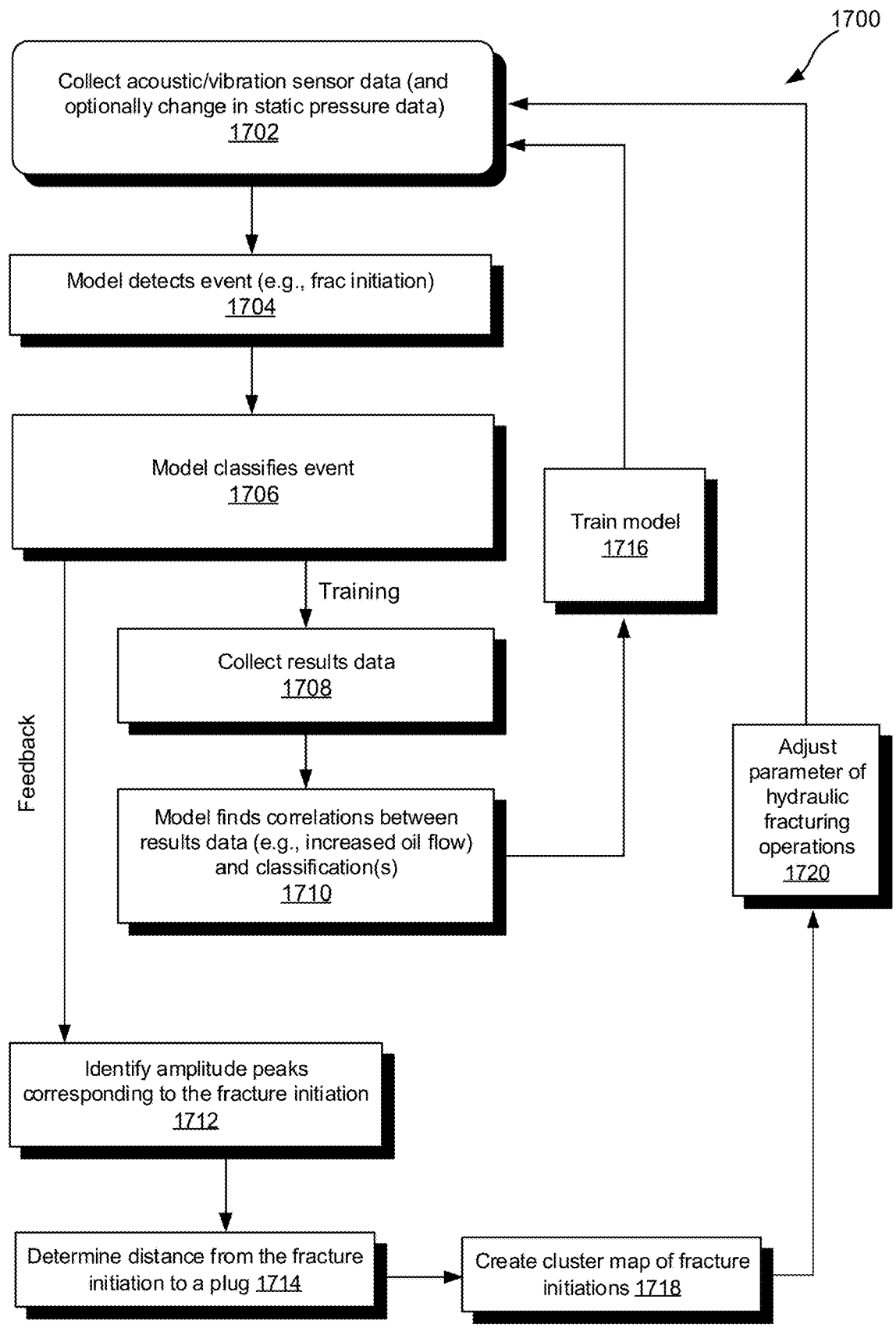
FIG. 17 shows an embodiment of a method for determining cluster efficiency, and optionally controlling fracking operations to achieve more even fracture dispersion, according to an embodiment of the disclosure.

FIG. 17 shows an embodiment of a method 1700 for determining cluster efficiency and dispersion of fractures during hydraulic fracturing operations. Optionally method 1700 may also be employed to adjust one or more parameters of the hydraulic fracturing operations based on a cluster map of fracture initiations in a stage of a well. The method 1700 will be described in association with components of the system 1800 shown in FIG. 18 and the system 1900 shown in FIG. 19. The method 1700 can include collecting high frequency acoustic or vibration data at an acoustic sensor (Block 1702), for instance, via one or more acoustic or vibration sensors 1808 and/or 1904. Optionally, the method 1700 may also involve monitoring and recording static pressure readings and/or changes in static pressure (Block 1702). In some embodiments, conversion to a frequency spectrum may be performed via a spectrum analyzer 1910 or other device for converting data from the time domain to frequency domain (e.g., the optional acoustic/vibration data converting module 1814). In some cases, conversion may involve performing a FFT on the time domain data to generate frequency domain data. For example, FFT or another transform may be performed to identify the acoustic vibrations associated with fracture initiation.

In some examples, the data from the acoustic or vibration sensor may be fed into a model for identifying spectral aspects of the data that may match (or resemble) known acoustic or vibration behavior of an event (Block 1704). For instance, the spectrum analyzer 1910 may pass frequency spectrum data to the machine learning system 1912 and/or the model 1914 to detect a frequency signature deserving further analysis. Additionally or alternatively, the data comparing module 1816 may also be used to perform this detection. For instance, background noise may be associated with a rounded peak around 1 kHz. In one example, amplitude spikes observed at around 5 and/or 10 kHz may be identified as events for comparing to known signatures in the model. In other words, the model may been previously trained to recognize a spectral signal associated with certain fracking events or crack types or crack parameters. Besides analyzing and assessing frequency spectrum data, the model may optionally be used to analyze changes in static pressure taken by the acoustic or vibration sensor (e.g., see FIG. 17), or by a second sensor that tracks pressure rather than acoustic or vibration data.

In some examples, the model may then classify the fracking event (Block 1706), for instance, by matching the sensor data with one or more categories of events. For instance, the model and/or a label assignment module 1818 may match the acquired sensor data with previous frequency domain spectra measured as a result of previous fracture initiations and previously classified by the machine-learning system. Additionally or alternatively, the model and/or the label assignment module 1818 may match the acquired sensor data with a category of crack sizes or crack lengths previously classified by the machine-learning system. In one example, a 5 kHz spike in the frequency domain may be associated with a formation of cracks, while a 10 kHz spike may generally be associated with an intersection of a crack and the main well. In this case, the label assignment module 1818 may match the acquired sensor data with these known frequency spikes. Additionally, in some embodiments, there may be smaller additional frequency spikes that the model has associated with fluid flow dynamics such as laminar versus turbulent flows. Thus, the event data can be compared to known frequency spectrum signatures for small crack formation, large crack formation, short crack formation, long crack formation, turbulent fluid flow in a crack, laminar fluid flow in a crack, crack formation that intersects the well, crack formation that does not intersect the well, and horizontal shifting, to name a few non-limiting examples. In some embodiments, existing categories or classifications may be stored in the model 1914.

As part of the feedback track of the method 1700, at least two amplitude peaks corresponding to the fracture initiation may be identified (Block 1712), for instance, if the model classified the event as a fracture initiation at Block 1706. Further, the method 1700 may include determining a distance from the fracture initiation to a plug within a wellbore or borehole (Block 1714), as previously described above. In some cases, the distance from the fracture initiation to the plug within the wellbore may be based at least in part on a time between arrival of the two amplitude peaks at the acoustic/vibration sensor, where the first amplitude peak corresponds to an arrival time of a primary wave generated by the fracture initiation, and the second amplitude peak corresponds to an arrival time of a reflected wave generated by the fracture initiation and reflected off the plug. In some embodiments, the plug may be located at an end of a current fracking stage of the well.

In some embodiments, a cluster map of fracture initiations in the stage of the well may be created based at least in part on the distance from the fracture initiation to the plug (Block 1718). Furthermore, one or more parameters of the hydraulic fracturing operations may be adjusted based at least in part on the cluster map, which may facilitate a more even dispersion of fractures within fracture clusters of a subsequent stage.

In some cases, cluster map module 1836 may be used to present a cluster map of fracture initiations in the stage of the well to operators, for instance, via an operator display 1916. In some cases, an operator may input manual changes to operations (e.g., adjust a parameter of the hydraulic fracturing operations) in response to different cluster maps, where the manual changes may be relayed to the controller 1918. Optionally, in parallel to presenting the cluster map via the display 1916, or alternatively, automated control of the controller 1918 can be performed (Block 1720). In some cases, the feedback/control module 1822 may be configured to automatically control fracking operations, for instance, via the controller 1918. In some instances, an algorithm may be used in conjunction with the feedback/control module 1822 and/or the controller 1918 to achieve a more even dispersion of fractures within fracture clusters (e.g., of a subsequent stage). For instance, the algorithm may analyze the resulting cluster map and adjust future frac stage parameters to optimize fracture dispersion within fracture clusters. In some embodiments, a count (i.e., of fractures or cracks) may be determined for each cluster. Further, a higher count in one area as compared to other areas in a stage may be indicative of the fractures or cracks in the area being too long (i.e., above a threshold). In such cases, the algorithm may be used to determine optimal frac stage parameter values, for instance, to ensure a more even distribution of fractures or cracks for each cluster. As shown, the method 1700 may then return to Block 1702 for collection of more data.

In some embodiments, after the model classifies events (Block 1706), the method 1700 may include collecting results data (i.e., as part of the model training track of the method 1700), where the results data may be associated with the event (Block 1708). It should be noted that, the training and feedback tracks may operate serially, or in parallel, based on use case. In some other cases, the training and feedback tracks may be alternatives. In some cases, results data may include any data type or information produced as a consequence of the event classified in Block 1706. For instance, results data could relate to increased oil flow in the well, during production, following fracture initiation in one or more perforation clusters of a stage of well, formation of one or more cracks during fracking, etc. In some other cases, results data may relate to a decrease in fracking fluid pressure following formation of a crack, to name another non-limiting example. In some embodiments, results data may be obtained from external resources 1834 such as a flow meter measuring oil/gas volume during production. In some cases, the model (e.g., model 1914) may then analyze the data to determine correlations (if any) between the results data and the classified event data (Block 1710). In some cases, the data comparing module 1816 (or another applicable module) may be configured to determine said correlations. In some cases, multiple sets of results data may be correlated to a single classified event. For instance, the method 1700 may be used to determine that frequency signatures classified as large crack formation may correlate to increased oil flow, whereas frequency signatures classified as small crack formation may correlate to steady oil flows. In some cases, these correlations may be used to train the model, following which the method 1700 may restart. In some cases, the model training module 1830 may be used to train the model 1914 (Block 1716).

Figure 18:
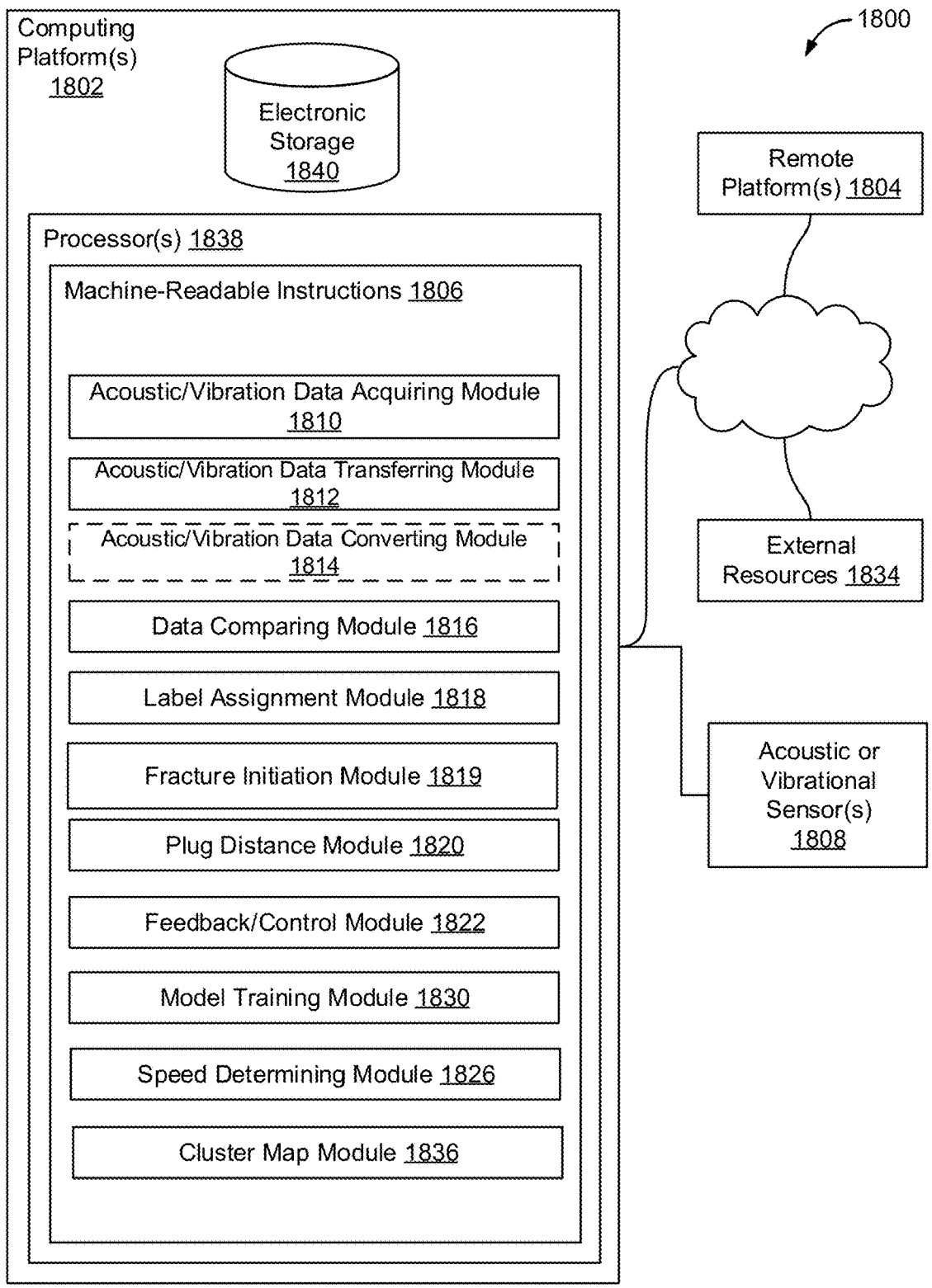
FIG. 18 illustrates a computing system configured for determining cluster efficiency, and optionally controlling fracking operations to achieve more even fracture dispersion, in accordance with one or more implementations.

In FIG. 18, the order of the blocks within the machine-readable instructions 1806 is non-limiting. For instance, the model training module 1830 can operate to train the model either before, after, or in parallel to operation of fracture initiation module 1819, plug distance module 1820, and/or feedback/control module 1822.

Figure 19:
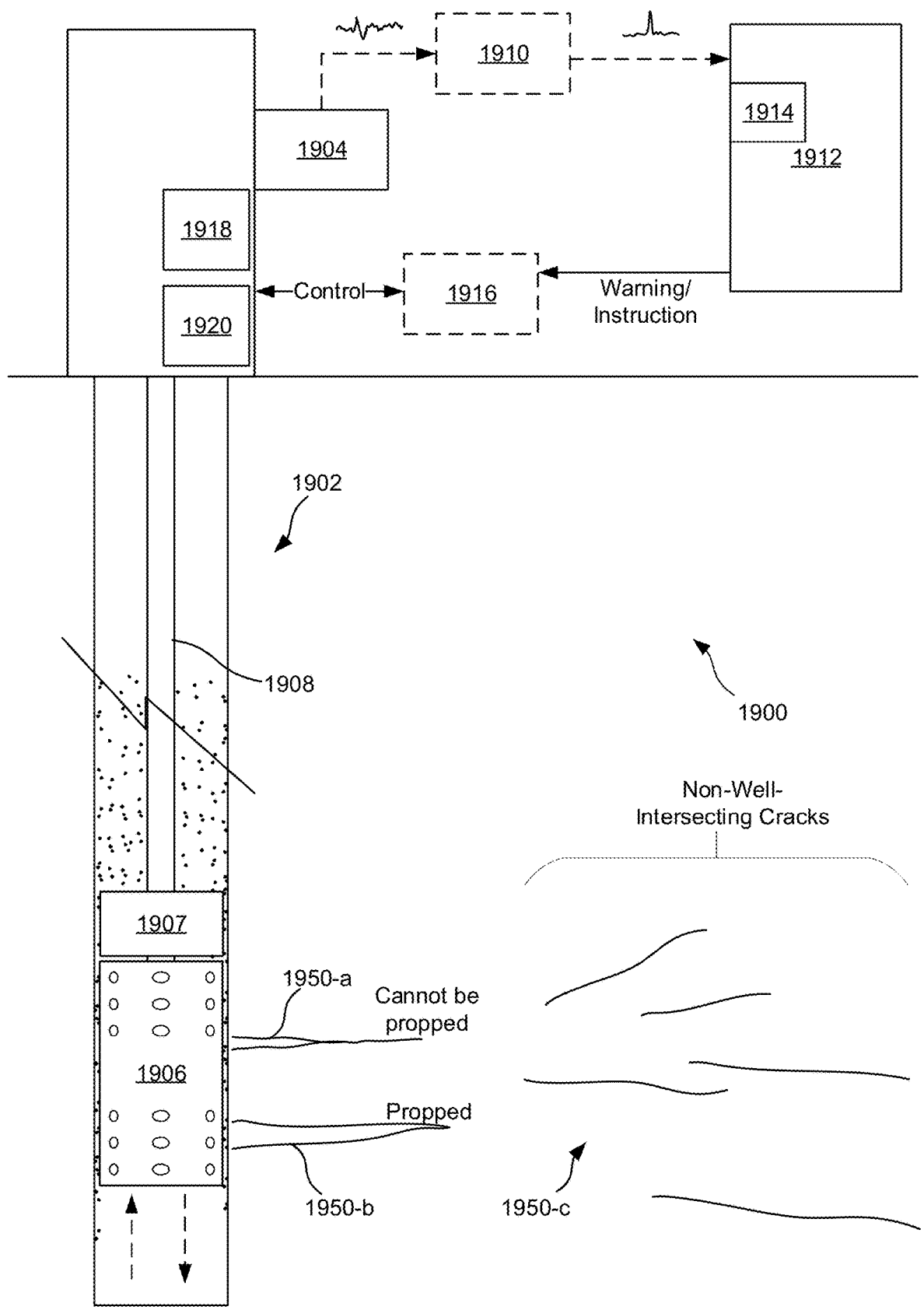
FIG. 19 illustrates an exemplary well including an acoustic or vibration sensor at the wellhead according to an embodiment of the disclosure.

The following provides a more detailed description of the system 1800 shown in FIG. 18, where FIG. 18 illustrates a more detailed embodiment of some example components that may be used to carry out the method shown in FIG. 17 and/or to underly the components shown in FIGS. 19 and 20. Specifically, FIG. 18 illustrates a system 1800 configured for determining cluster efficiency, and optionally controlling fracking operations to facilitate an even dispersion of fractures (e.g., fracture or crack count for each cluster in a multi-cluster stage is approximately the same), in accordance with one or more implementations. In some implementations, system 1800 may include one or more computing platforms 1802. Computing platform(s) 1802 may be configured to communicate with one or more remote platforms 1804 according to a client/server architecture, a peer-to-peer architecture, and/or other architectures. Remote platform(s) 1804 may be configured to communicate with other remote platforms via computing platform(s) 1802 and/or according to a client/server architecture, a peer-to-peer architecture, and/or other architectures. Users or operators may access system 1800 via remote platform(s) 1804.

Computing platform(s) 1802 may be configured by machine-readable instructions 1806. Machine-readable instructions 1806 may include one or more instruction modules. The instruction modules may include computer program modules. The instruction modules may include one or more of acoustic or vibration data acquiring module 1810, acoustic or vibration data transferring module 1812, acoustic or vibration data converting module 1814 (optional), data comparing module 1816, label assignment module 1818, fracture initiation module 1819, plug distance module 1820, feedback/control module 1822, model training module 1830, cluster map module 1836, and/or speed determining module 1826 to name a few non-limiting examples.

Acoustic or vibration sensor(s) 1808, previously described above, may be in communication with the computing platform(s) 1802 and may be configured to provide raw data to the processor(s) 1838. In some embodiments, the acoustic or vibration sensor(s) 1808 may be adapted for direct physical contact with fluid within a well (or alternatively, for direct physical contact with a component of the well such as a pipe). In some examples, the acoustic or vibration sensor 1808 may measure acoustic vibrations in fracking fluid in a wellhead, circulating fluid line, or standpipe of the well. In some examples, the sensor(s) 1808 may be high frequency sensors, for instance, designed for >1000 sample/second rate. In an embodiment, the acoustic or vibration sensor 1808 may include a piezoelectric material configured to generate a current or voltage proportional to an amplitude of vibration of the piezoelectric material. Some non-limiting examples of piezoelectric materials may include lead zirconate titanate (PZT), barium titanate, lead titanate, Rochelle salt, ammonium dihydrogen phosphate, lithium sulphate, quartz, topaz, zinc oxide, etc.

In some examples, acoustic or vibration data acquiring module 1810 may be configured to acquire acoustic or vibration data in a time domain from the sensor(s) 1808. For instance, the acoustic or vibration data acquiring module 1810 may be configured to convert the acoustic vibrations into an electrical signal in a time domain.

In some examples, acoustic vibration data transferring module 1812 may be configured to transfer the acoustic or vibration data to a spectrum analyzer (e.g., spectrum analyzer 1910) or any another device capable of transforming data from the time domain to the frequency domain. It should be noted that, the spectrum analyzer may or may not be part of the same computing platform that various other modules in FIG. 18 are a part of. For instance, the spectrum analyzer may be separate from a computing platform where comparisons of frequency signatures to the model occur. In some embodiments, acoustic or vibration data converting module 1814 may be configured to convert the acoustic or vibration data from the time domain to a frequency domain via the spectrum analyzer or another applicable device.

Fracture initiation module 1819 may be configured to identify a fracture initiation from the current frequency domain spectrum via a machine-learning system trained on previous frequency domain spectra measured as a result of previous fracture initiations and previously classified by the machine-learning system. In some cases, fracture initiation module 1819 may be configured to perform similar functions as one or more of the data comparing module 1816 and the label assignment module 1818. Additionally or alternatively, fracture initiation module 1819 may also be configured to analyze the electrical signal in the time domain during the window of time to identify two amplitude peaks corresponding to the fracture initiation found in the current frequency domain spectrum. In some embodiments, fracture initiation module may also measure a time between the two amplitude peaks and divide the time by two to give a result. This result may be passed on to the plug distance module 1820 for further computation.

Data comparing module 1816 may be configured to compare the acoustic or vibration data in the frequency domain to a model trained on frequency signatures, where the frequency signatures correspond to fracture initiation and/or to known crack types or qualities (e.g., connected to well, able to be propped, etc.). In some examples, the model may be trained to recognize frequency signatures corresponding to certain fracking fluid flow patterns. By way of non-limiting example, the comparing may comprise consideration of a number of frequency spikes, a width of the frequency spikes, and/or an amplitude of the frequency spikes pertaining to the frequency signatures, among other aspects of the frequency spectrum. In some embodiments, a fracture initiation can be identified from a plurality of frequency peaks in the spectrum as the peak having the greatest amplitude.

Label assignment module 1818 may be configured to assign one of a plurality of labels to the acoustic or vibration data in the frequency domain based on the comparing. By way of non-limiting example, the plurality of labels may include: fracture initiation, connected to the well, connected to another crack, diameter of the crack, length of the crack, and whether the crack has been propped. In some cases, the plurality of labels may be associated with binary values (i.e., 1 or 0, True or False, Yes or No), for instance, connected to the well or to another crack. Alternatively, the labels may be associated with numerical or alpha-numerical values, where a corresponding unit (e.g., mm, cm, ft) may be implied or explicitly stated. For instance, for the label "diameter of the crack" or "length of the crack", the label assignment module 1818 may assign a label of "4" if a unit (e.g., cm) is inherently implied. Alternatively, the label assignment module 1818 may assign a label of "4 cm" if the unit needs to be explicitly stated.

Plug distance module 1820 may be configured to compute a distance from the fracture initiation to the plug and display the computed distance on the operator display (e.g., operator display 1916). For instance, the plug distance module 1820 may multiply the result from the fracture initiation module 1819 with the speed of sound in the fracking fluid from the speed determining module 1826 to determine the distance from the frac initiation to the plug.

In some cases, feedback/control module 1822 may be configured to instruct a controller (e.g., controller 1918) to make adjustments to current or future fracking operations, for instance, in response to analysis of the cluster map generated by the cluster map module 1836. In some cases, the adjustments may include varying a parameter of the hydraulic fracturing operations to achieve a more even dispersion of fractures within fracture clusters of a subsequent stage, for instance. Additionally or alternatively, the feedback/control module 1822 may also be configured to control the pump and instruct it to start pumping fracking fluid into a stage of the well.

In some embodiments, model training module 1830 may be configured to train the model (also shown as model 1914 in FIG. 19) for recognizing acoustic or vibration data in the frequency domain using one or more of the plurality of labels or classifications.

In some embodiments, speed determining module 1826 may be configured to compute the speed of sound in the fracking fluid thought to be near the fracture initiation, which may then be used by the plug distance module 1820 to give a distance from the fracture initiation to the plug.

In some implementations, computing platform(s) 1802, remote platform(s) 1804, and/or external resources 1834 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which computing platform(s) 1802, remote platform(s) 1804, and/or external resources 1834 may be operatively linked via some other communication media.

A given remote platform 1804 may include one or more processors configured to execute computer program modules. The computer program modules may be configured to enable an expert or user associated with the given remote platform 1804 to interface with system 1800 and/or external resources 1834, and/or provide other functionality attributed herein to remote platform(s) 1804. By way of non-limiting example, a given remote platform 1804 and/or a given computing platform 1802 may include one or more of a server, a desktop computer, a laptop computer, a handheld computer, a tablet computing platform, a NetBook, a Smartphone, a gaming console, and/or other computing platforms.

External resources 1834 may include sources of information outside of system 1800, external entities participating with system 1800, and/or other resources. For instance, external data may be fed into the model to help with initial training. In some implementations, some or all of the functionality attributed herein to external resources 1834 may be provided by resources included in system 1800. One non-limiting example of an external resource is results data, such as oil/gas flow volume that may be measured by one or more sensors other than the acoustic or vibration sensor.

Computing platform(s) 1802 may include electronic storage 1840, one or more processors 1838, and/or other components. Computing platform(s) 1802 may include communication lines, or ports to enable the exchange of information with a network and/or other computing platforms. Illustration of computing platform(s) 1802 in FIG. 18 is not intended to be limiting. Computing platform(s) 1802 may include a plurality of hardware, software, and/or firmware components operating together to provide the functionality attributed herein to computing platform(s) 1802. For example, computing platform(s) 1802 may be implemented by a cloud of computing platforms operating together as computing platform(s) 1802. In an embodiment, the computing platform 1802 including the processor(s) 1838 may reside on the premises of the fracking operation, for instance, on the same pad as the well(s) being monitored/controlled.

Electronic storage 1840 may comprise non-transitory storage media that electronically stores information. The electronic storage media of electronic storage 1840 may include one or both of system storage that is provided integrally (i.e., substantially non-removable) with computing platform(s) 1802 and/or removable storage that is removably connectable to computing platform(s) 1802 via, for example, a port (e.g., a USB port, a firewire port, etc.) or a drive (e.g., a disk drive, etc.). Electronic storage 1840 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 1840 may include one or more virtual storage resources (e.g., cloud storage, a virtual private network, and/or other virtual storage resources). Electronic storage 1840 may store software algorithms, information determined by processor(s) 1838, information received from computing platform(s) 1802, information received from remote platform(s) 1804, and/or other information that enables computing platform(s) 1802 to function as described herein.

Processor(s) 1838 may be configured to provide information processing capabilities in computing platform(s) 1802. As such, processor(s) 1838 may include one or more of a digital processor, an analog processor, a digital circuit designed to process information, an analog circuit designed to process information, a state machine, and/or other mechanisms for electronically processing information. Although processor(s) 1838 is shown in FIG. 18 as a single entity, this is for illustrative purposes only. In some implementations, processor(s) 1838 may include a plurality of processing units. These processing units may be physically located within the same device, or processor(s) 1838 may represent processing functionality of a plurality of devices operating in coordination. Processor(s) 1838 may be configured to execute modules 1810, 1812, 1814, 1816, 1818, 1819, 1820, 1822, 1830, 1826, 1836, and/or other modules. Processor(s) 1838 may be configured to execute modules 1810, 1812, 1814, 1816, 1818, 1819, 1820, 1822, 1830, 1826, 1836, and/or other modules by software; hardware; firmware; some combination of software, hardware, and/or firmware; and/or other mechanisms for configuring processing capabilities on processor(s) 1838. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 1810, 1812, 1814, 1816, 1818, 1819, 1820, 1822, 1830, 1826, and/or 1836 are illustrated in FIG. 18 as being implemented within a single processing unit, in implementations in which processor(s) 1838 includes multiple processing units, one or more of modules 1810, 1812, 1814, 1816, 1818, 1819, 1820, 1822, 1826, 1836, and/or 1830 may be implemented remotely from the other modules. The description of the functionality provided by the different modules 1810, 1812, 1814, 1816, 1818, 1819, 1820, 1822, 1826, 1836, and/or 1830 described herein is for illustrative purposes, and is not intended to be limiting, as any of modules 1810, 1812, 1814, 1816, 1818, 1819, 1820, 1822, 1826, 1836, and/or 1830 may provide more or less functionality than is described. For example, one or more of modules 1810, 1812, 1814, 1816, 1818, 1819, 1820, 1822, 1826, 1836, and/or 1830 may be eliminated, and some or all of its functionality may be provided by other ones of modules 1810, 1812, 1814, 1816, 1818, 1819, 1820, 1822, 1826, 1836, and/or 1830. As another example, processor(s) 1838 may be configured to execute one or more additional modules that may perform some or all of the functionality attributed below to one of modules 1810, 1812, 1814, 1816, 1818, 1819, 1820, 1822, 1826, 1836, and/or 1830.

FIG. 19 illustrates a drilling system 1900 comprising an exemplary well 1902. In some examples, the well 1902 may comprise a wellhead 1920 and an acoustic or vibration sensor 1904 at the wellhead, where the acoustic or vibration sensor 1904 is in direct physical contact with fluid in the well. The acoustic or vibration sensor 1904 may be configured to measure acoustic vibrations in fracking fluid in the wellhead 1920, or alternatively, a circulating fluid line, or standpipe of the well 1902. In some cases, the drilling system 1900 may further comprise a perforation gun 1906 and a plug 1907 deployed at a stage in the well 1902. As shown, the perforation gun 1906 and the plug 1907 may be headed downhole and controlled via a wireline 1908. In some cases, one or more fractures and cracks having varying characteristics may be created due to ongoing fracking, for instance, via firing the perforating gun 1906 and pumping fracking fluid into the stage of the well 1902. In some embodiments, firing the perforating gun 1906 may set off a charge that causes perforation clusters or holes to form through the wellbore casing and cement and into the subterranean formation (e.g., shale), as shown in more detail in FIG. 20. Further, once high-pressure fracking fluid and/or proppant is pumped into the stage of the well, the pressure forces the fluid out into the perforation clusters and into the subterranean formation causing it to fracture. For instance, and as illustrated in FIG. 19, a number of cracks may be created, including a crack 1950-*a* that intersects the well 1902 but is too narrow to be propped, another crack 1950-*b* that intersects the well 1902 and is large enough to be propped, and one or more cracks 1950-*c* that do not intersect the well 1902. Although the perforation gun 1906 is illustrated in a vertical section of well, it should be noted that, in other embodiments, the perforation gun 1906 may be located in a horizontal or roughly horizontal section of the well 1902 (e.g., horizontal region 604 in FIG. 6).

The acoustic or vibration sensor 1913 may provide raw data (e.g., in a time domain) to a spectrum analyzer 1910 (optional) arranged on-site (or optionally at a location remote from the well pad). In some embodiments, the spectrum analyzer 1910 may be configured to convert the raw time series data to a frequency domain. A machine learning system 1912, including a model 1914, may be configured to search for and identify frequency signatures in the frequency domain of the data. In some embodiments, the model 1914 may be stored in electronic storage 1840. In some cases, the machine learning system 1912 may be configured to search for and identify time signatures in the raw data, without the use of the spectrum analyzer 1910. In some circumstances, even though conversion from time domain to frequency domain may not be performed for analysis or training the model, conversion may be performed prior to display on the operator's computer, since frequency domain representation may be more intuitive or easier to understand for a human.

In some cases, the identified frequency signatures may be associated with known frequency signatures for different fracking events and parameters, including, but not limited to, fracture initiation and/or crack parameters. For instance, water and proppant passing through smaller cracks, such as crack 1950-*a*, may generate higher frequency data and/or vibrations than larger cracks, such as crack 1950-*b*. As described in relation to FIGS. 6-13, pressure or sound waves may travel at different speeds through dense rock, sand, air, fluids in a fracture or well, etc. In such cases, the speed at which pressure or sound waves travel through the fracking fluid may need to be calculated, for instance, to determine a distance of the fracture initiation from the plug 1907.

In some circumstances, the model 1914 may be trained to recognize frequency signatures, for instance, associated with a fracture initiation from the current frequency domain spectrum via the machine-learning system 1912 and the model 1914. In some cases, the machine-learning system 1912 may be trained on previous frequency domain spectra measured as a result of previous fracture initiations and previously classified by the machine-learning system 1912.

After (or in parallel to) training the model 1914, the machine learning system 1912 may utilize one or more of the fracture initiation module 1819, the plug distance module 1820, the cluster map module 1836, and/or the speed determining module 1826 (described above in relation to FIG. 18) to analyze the electrical signal from the acoustic/vibration sensor 1904 in the time domain. The analysis may be used to obtain one or more of the speed of sound in the fracking fluid and a distance from the fracture initiation to the plug 1907. In some embodiments, the cluster map module 1836 may use the distance to create a cluster map of fracture initiations in the stage of the well 1902.

In some embodiments, at least the distance and the cluster map may be passed to an operator's computer and display 1916 to enable the operator to make manual adjustments to well operations via the controller 1918. Additionally or alternatively, the machine learning system 1912 may be configured to automatically adjust fracking operations through the controller 1918. Regardless of manual or automated control, the controller 1918 may be instructed to utilize different pressures on different stages, or different stage durations, and adjust pressure or duration for future stages based on previous stages. In other words, one or more pressure or duration adjustments may be made for future stages based on settings from previous stages that produced an even dispersion of fractures and the highest cluster efficiency. In some embodiments, the perforation gun 1906 may go to different potential cluster locations within a stage prior to firing. Adjusting fracking operations may involve adjusting one or more downhole parameters through the controller 1918 (if automatic control is enabled), or providing one or more suggestions to the operator (if manual control). Some non-limiting examples of downhole parameters may relate to distance of perforation gun 1906 from the plug 1907 (i.e., to allow for a more even dispersion of fractures), frac stage time, timing of proppant release, controlling perf gun firing (e.g., power), start and end of pumping down perf gun(s), start and end of pumping down plugs, pressurizing frack fluid to initiate creation of fractures, perf gun pressure level, pH of fluids forced into the formation, etc.

FIG. 20 illustrates a drilling system 2000 for determining cluster efficiency during hydraulic fracturing operations. In some cases, drilling system 2000 may be also deployed to disperse fractures more evenly within fracture clusters during hydraulic fracturing operations, in accordance with one or more implementations. In some examples, drilling system 2000 may implement one or more aspects of the figures described herein. As shown, drilling system 2000 comprises a wellbore 2001 (also referred to as a bore hole), drilling rig 2003, a pump truck 2004, a wellhead assembly comprising a well head 2006, and an acoustic or vibration sensor 2002. In the example shown, the acoustic or vibration sensor 2002 may be coupled to one of the interfaces of the wellhead 2006, such that the acoustic or vibration sensor 2002 is in direct physical contact with fluid in the wellhead 2006. In some other cases, the sensor 2002 may be coupled to a circulating fluid line 2009, or even a standpipe of the well. In either case, the sensor 2002 may be configured to convert acoustic vibrations measured in fracking fluid in the fracking wellhead 2006, the circulating fluid line 2009, or the standpipe into an electrical signal in the time domain. In some examples, the acoustic or vibration sensor 2002 may comprise wireless transmission hardware for supporting communication with a spoke computer, hub, or wide area network (not shown). In some cases, the acoustic sensor/vibration sensor 2002 samples at greater than 1 kHz. Furthermore, the acoustic/vibration sensor 2002 may be configured to be in contact with the fracking fluid in the well or circulating fluid line or the standpipe at the wellhead, or with a surface of the wellhead, circulating fluid line, or standpipe. In some cases, pressure sensor data (i.e., in addition to analyzing acoustic/vibration data, or as an alternative) may be measured and analyzed during the window of time.

Similar to FIG. 6, the wellbore 2001 may include a vertical and a horizontal region separated by a heel 2026. The horizontal region may extend beyond the figure to the right and a plug 2007 may separate the illustrated stage from additional stages further down the well (off the page to the right). In some cases, cluster spacing and dispersion of fractures plays a significant role in the well's 2000 performance. For instance, if the cluster spacing is too small (i.e., under a minimum threshold), the stimulated area between major fractures may overlap, which may adversely impact the efficiency of fracturing stimulation. In other cases, if the cluster spacing is too large (i.e., above a maximum threshold), the area between major fractures cannot be stimulated completely, which may impact reservoir recovery extent. While even fracture dispersion is the goal, often times it is not the case with currently used techniques. In particular, when fracking fluid is pumped down into the bore hole, a downhole cluster further away from the heel (e.g., the cluster near the plug 2007) may receive a lower volume or pressure of fracking fluid than an uphole cluster closer to the heel 2026. In such cases, fractures may be induced more easily in the uphole cluster. In some circumstances, a majority of the fracking fluid may only go into 1 or 2 clusters of a multi-cluster stage (e.g., 3 or 4 cluster stage).

FIG. 20 depicts one stage of a multi-cluster stage following cluster perforating. Cluster perforating may refer to the formation of multiple sets of perforations (e.g., perforations 2016). These perforations in the casing may also extend a short distance into the formation as shown, and they are often formed in clusters 2010, each cluster 2010 corresponding to a position of a perforation gun when fired. After perforations are made, the plug 2007 is sent downhole until it reaches an end of a stage to be fracked (as shown). Fracking fluid is then pumped into the borehole 2001 and passes through the perforations 2016 and begins expanding the perforations into fractures 2005 (only one fracture 2005 is shown, but in practice each perforation 2016 would likely see some fracture initiation, and thus clusters of fractures would form). For instance, after setting the plug 2007 to isolate the stage, multiple sets of perforations 2016 were fired via the perforation gun (e.g., shown as perf gun 1906 in FIG. 19). In the example shown, three sets of perforations 2016 comprising 4 perforations each have been fired to form three clusters 2010. In some embodiments, pump truck 2004 may be used to pump high-pressure fracking fluid down the borehole to induce fractures in the shale formation. A cluster can refer to a cluster of perforations or a cluster of fractures forming from the perforations. Cluster efficiency, however, refers to the distribution of fractures.

As shown, a fracture initiation has occurred (e.g., see fracture 2005) in a first cluster 2010 near the heel 2026. In some cases, fractures, such as fracture 2005, may be formed every few seconds (e.g., 2 seconds) once fracking fluid is pumped down into the borehole 2001. As noted above, in some embodiments, acoustic vibrations may be measured in fracking fluid in the wellhead 2006, the circulating fluid line 2009, or a standpipe of the well. In some cases, the electric signal from the sensor 2002 may be recorded to a memory, and a fracture initiation (e.g., of fracture 2005) may be identified from the time domain spectrum, or alternatively, the frequency domain spectrum. In some cases, a machine-learning system deploying an artificial intelligence algorithm, a neural network, etc., trained on previous frequency domain spectra measured as a result of previous fracture initiations and previously classified by the machine-learning system may be utilized for the identification. In some cases, the machine-learning system may be hosted on a local server, or alternatively, on a remote server in a different location from the drilling system 2000. If the latter, the electrical signal may be transported via a large area network to a remote-machine learning system to perform the frac initiation identification.

In some cases, one or more amplitude peaks corresponding to the fracture initiation may also be identified based on analyzing the electrical signal in the time domain during a window of time. In other words, following frequency domain analysis (i.e., to identify the fracture initiation), the raw time domain data measured by the acoustic/vibration sensor 2002 may be further analyzed to identify distinct amplitude peaks associated with a primary wave ($Q_1$) directly traveling uphole from the initiated fracture 2005 and a secondary wave ($Q_2$) first traveling downhole from the initiated fracture 2005, and then reflecting off of the plug 2007 (reflected wave $Q_{2'}$) and then traveling uphole following the primary wave ($Q_1$). The primary wave $Q_1$ and the reflected wave ($Q_{2'}$) may arrive at different times at the acoustic/vibration sensor 2002 since the distance traveled by them is also different. Further, the primary wave ($Q_1$) may be of a higher amplitude than the reflected wave since it follows a more direct path to the acoustic/vibration sensor. In some embodiments, the two amplitude peaks may be identified based on them exceeding an amplitude threshold. Additionally or alternatively, the two amplitude peaks may be identified based on a combination of an amplitude and/or bandwidth. In yet other cases, the amplitude peaks may be identified based on a frequency of the two amplitude peaks. In some embodiments, the analyzing the electrical signal for the window of time may be performed in the frequency domain to identify the two amplitude peaks. For instance, the electrical signal may be transformed from the time domain to the frequency domain for the window of time, and the two amplitude peaks may be identified by comparing the electrical signal in the frequency domain for the window of time to frequency domain data associated with previous pairs of amplitude peaks corresponding to previous fracture initiations.

As described above, by measuring a time span between the two amplitude peaks, dividing it by two, and further multiplying it by the speed of sound in the fracking fluid, a distance (shown as D1 in FIG. 20) from the fracture initiation to the plug may be calculated. In some cases, measuring a time between the two amplitude peaks comprises measuring a time between a maximum of a first of the two peaks and a maximum of a second of the two peaks. In some cases, the speed of sound in the fracking fluid may be a function of the arrival time of the primary wave from the fracture initiation and the arrival time of the reflected wave from the fracture initiation after reflecting off the plug, shown in equation (2) above. Further, since the location of the plug is known, a location of the fracture initiation (e.g., of fracture 2005) may be determined based on the distance between the fracture initiation and the plug. In some cases, the distance from the fracture initiation to the plug and/or the location of the fracture initiation may be displayed to an operator on a visual display of a user/operator device (not shown). The user/operator device may be selected from a group consisting of a smart phone, a laptop, a computer, a tablet, a NetBook, or any other applicable device. In some cases, the distance from the fracture initiation to the plug may be stored with other distances from prior fracture initiations to corresponding plugs, and referenced to different plug positions such that a mapping of fracture initiations in clusters associated with each plug position may be determined for a fracking stage. For instance, the distance (D1) from the fracture initiation to the plug 2007 may be stored with reference to the position of plug 2007 in a database, where the database may comprise other fracture initiation distances (D) and corresponding plug positions.

In some other cases, the perf gun may be controlled (e.g., via the wireline) to go to different potential cluster locations within a stage, such as a subsequent stage, based on the cluster map of fracture initiation distances and plug positions from previous stages. In this way, more even or more ideal fracture dispersion may be achieved by determining an optimal location for firing the perf gun (i.e., to form clusters) relative to where the plug is positioned. Ideal fracture dispersion may depend on the soil/formation structure and composition—and thus approaching an ideal fracture dispersion may involve increasing fracture spacing or decreasing fracture spacing based on analysis of cluster efficiency in a previous stage of a well or a previously fracked nearby well. It should be noted that while only a single fracture initiation is illustrated in FIG. 20, fracture initiation may be performed in each cluster 2010 of the stage. For instance, in some embodiments, fracture initiation may occur in each cluster of the stage once fracking fluid is pumped into the borehole. In some other cases, after fracture initiation in the first cluster, the plug 2007 may be moved uphole to initiate fractures in the second cluster, and so on. In such cases, the distance from the fracture initiation to the plug for the second and third clusters may also be stored in the database and referenced to the respective plug position. Thus, a mapping of fracture initiations in the different clusters associated with each plug position may be determined for the fracking stage.

Figure 21:
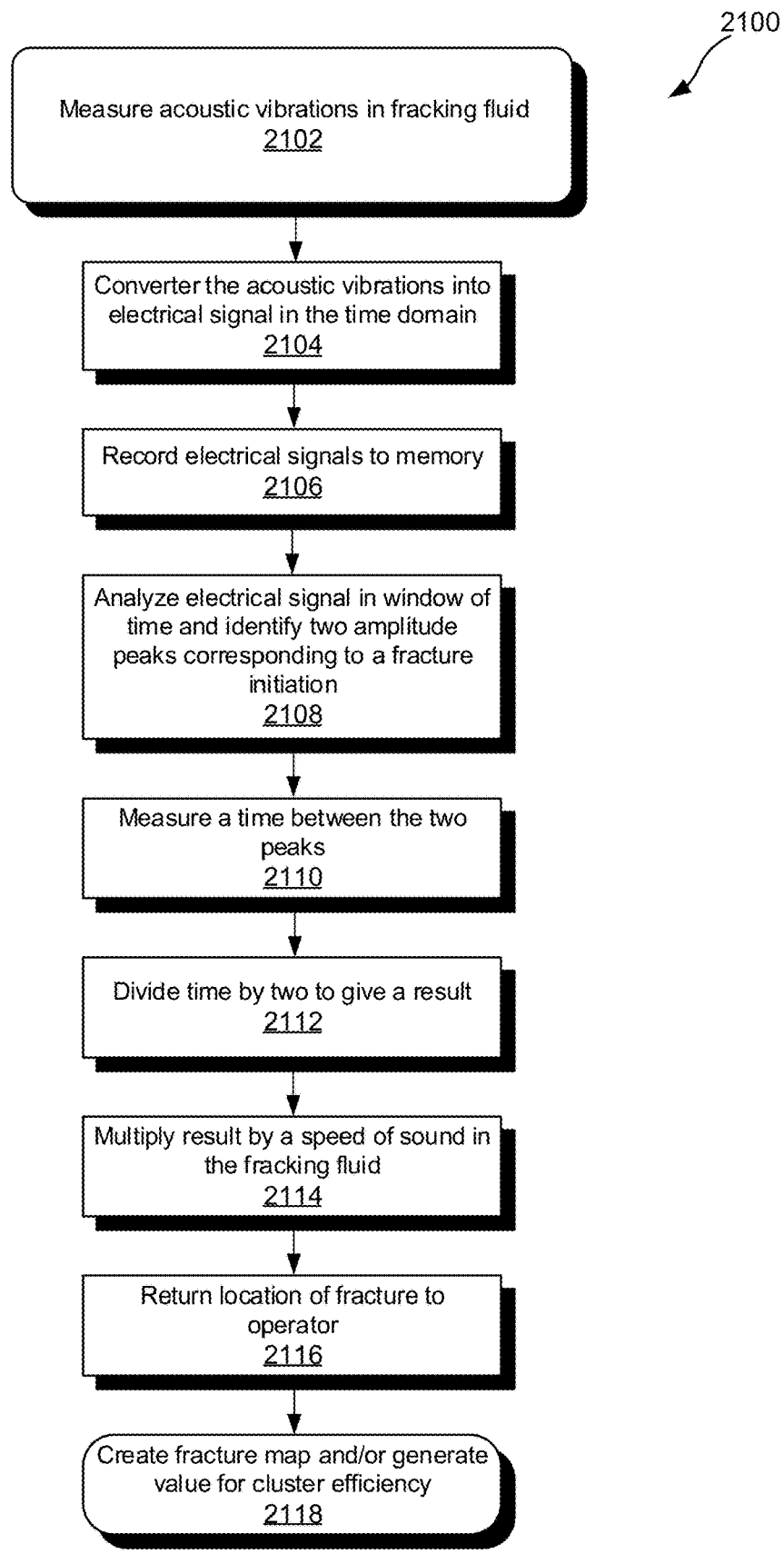
FIG. 21 illustrates a method of measuring and/or improving cluster efficiency.

FIG. 21 illustrates a method of measuring and/or improving cluster efficiency. The method 2100 can begin by measuring acoustic vibrations in fracking fluid in a fracking wellhead, circulating fluid line, or standpipe of a well (Block 2102) and then converting the acoustic vibrations into an electrical signal in a time domain (Block 2104). These electrical signals can be recorded to memory (Block 2106) and analyzed in the time domain for a window of time (Block 2108). This analysis can seek to identify two amplitude peaks corresponding to a fracture initiation (Block 2108), and in some cases can also make use of a frequency spectrum to help identify the fracture initiation. The method 2100 can then measure a time between the two amplitude peaks (Block 2110) and divide the time by two to give a result (Block 2112). This result can be multiplied by a speed of sound in the fracking fluid to give a distance between the fracture initiation and a plug at an end of a current fracking stage of the well (Block 2114). Finally, the location of the fracture initiation can be returned to an operator based on the distance between the fracture initiation and the plug (Block 2116) and this method 2100 can be repeated for a plurality of fracture initiations to form a map of the fractures or a value representing the cluster efficiency of a stage or well (Block 2118).

Additional Embodiments

In some examples of the method, system, computing platform, and non-transient computer-readable storage medium described herein the sensor samples at greater than 1 kHz. In some examples of the method, system, and non-transient computer-readable storage medium described herein the sensor is an acoustic sensor.

In some examples of the method, system, computing platform, and non-transient computer-readable storage medium described herein the two amplitude peaks are identified based on exceeding an amplitude threshold. In some examples of the method, system, computing platform, and non-transient computer-readable storage medium described herein the two amplitude peaks are identified based on a combination of amplitude and width. In some examples of the method, system, computing platform, and non-transient computer-readable storage medium described herein the two amplitude peaks are identified based on a frequency of the two amplitude peaks.

In some examples of the method, system, computing platform, and non-transient computer-readable storage medium described herein the sensor is configured to be in contact with the fracking fluid in the well or with a surface of the circulating fluid line or the standpipe at the wellhead.

Some examples of the method, system, computing platform, and non-transient computer readable storage medium may further include processes, features, means, or instructions for analyzing the electrical signal for the window of time in the frequency domain to identify the two amplitude peaks. Some examples of the method, system, computing platform, and non-transient computer readable storage medium may further include processes, features, means, or instructions for measuring and analyzing pressure sensor data during the window of time.

In some examples of the method, system, computing platform, and non-transient computer-readable storage medium described herein the machine-learning system is hosted on a local server. In some examples of the method, system, computing platform, and non-transient computer-readable storage medium described herein the electrical signal is transported via a large area network to a remote machine-learning system.

In some examples of the method, system, computing platform, and non-transient computer-readable storage medium described herein the distance from the fracture initiation to the plug is stored with other distances from prior fracture initiations to corresponding plugs and referenced to different plug positions such that a mapping of fracture initiations in clusters associated with each plug position can be determined for a fracking stage.

In some examples, the system further comprises: a wellbore with a casing; and a fracking pump.

In some examples of the method, system, computing platform, and non-transient computer-readable storage medium described herein measuring a time between the two amplitude peaks comprises measuring a time between a maximum of a first of the two peaks and a maximum of a second of the two peaks.

In some examples of the method, system, computing platform, and non-transient computer-readable storage medium described herein the speed of sound in the fracking fluid is a function of arrival time of a primary wave from the fracture initiation and arrival time of a reflected wave from the fracture initiation after reflecting off the plug.

In some examples of the method, system, computing platform, and non-transient computer-readable storage medium described herein the speed of sound, S, in the fracking fluid is:

$S=(G+P)+2(F+E)/(A_2-A_1)$, where G is a firing depth of a perforation gun, P is a depth of the plug, F is a distance between the sensor and the wellhead, E is a distance from the sensor to a fluid end at the surface of the well, $A_1$ is the arrival time of the primary wave from the fracture initiation, and $A_2$ is the arrival time of the reflected wave from the fracture initiation and reflected off the plug.

In some examples of the method, system, computing platform, and non-transient computer-readable storage medium described herein the electrical signal is transformed from the time domain to the frequency domain for the window of time, and the two amplitude peaks are identified by comparing the electrical signal in the frequency domain for the window of time to frequency domain data associated with previous pairs of amplitude peaks corresponding to previous fracture initiations.

In some examples of the method and non-transient computer-readable storage medium described herein the measuring is performed by a sensor coupled to the wellhead, circulating fluid line, or standpipe. In some examples of the method and non-transient computer-readable storage medium described herein the measuring is performed by a sensor, and wherein the sensor is configured to be in contact with the fracking fluid in the well or with a surface of the circulating fluid line or the standpipe at the wellhead.

In some examples of the method and non-transient computer-readable storage medium described herein, the method further comprises identifying the fracture initiation from the electrical signal via a machine-learning system trained on previous frequency domain spectra measured as a result of previous fracture initiations and previously classified by the machine-learning system.

In some examples of the method and non-transient computer-readable storage medium described herein the electrical signal is transformed from the time domain to the frequency domain for a window of time, and the two amplitude peaks are identified by comparing the electrical signal in the frequency domain for the window of time to frequency domain data associated with previous pairs of amplitude peaks corresponding to previous fracture initiations.

In some examples of the method and non-transient computer-readable storage medium described herein, the method further comprises performing the identifying based also on analysis of pressure sensor data during the window of time.

In some examples of the method and non-transient computer-readable storage medium described herein the analyzing is performed on a locally-hosted machine-learning system. In some examples of the method and non-transient computer-readable storage medium described herein the electrical signal in the time domain is transported via a large area network to a remote server hosting a machine-learning system configured to perform the analyzing.

In some examples of the method and non-transient computer-readable storage medium described herein, the method further comprises adjusting parameters of subsequent fracking operations to improve cluster efficiency of fracture initiations. In some examples of the method and non-transient computer-readable storage medium described herein, the method further comprises storing the distance from the fracture initiation to the plug with other distances from prior fracture initiations to the plug, wherein the distance from the fracture initiation to the plug and the other distances from prior fracture initiations are referenced to different plug positions such that a mapping of fracture initiations in clusters associated with each plug position can be determined for a fracking stage.

In some examples of the method and non-transient computer-readable storage medium described herein measuring a time between the two amplitude peaks comprises measuring a time between a maximum of a first of the two peaks and a maximum of a second of the two peaks.

In some examples, the speed of sound in the fracking fluid is a function of arrival time of a primary wave from the fracture initiation and arrival time of a reflected wave from the fracture initiation after reflecting off the plug, wherein the speed of sound, S, in the fracking fluid is: $S=(G+P)+2(F+E)/(A_2-A_1)$, where G is a firing depth of a perforation gun, P is a depth of the plug, F is a distance between the sensor and the wellhead, E is a distance from the sensor to a fluid end at the surface of the well, $A_1$ is the arrival time of the primary wave from the fracture initiation, and $A_2$ is the arrival time of the reflected wave from the fracture initiation and reflected off the plug.

In some embodiments, the electrical signal is transformed from the time domain to the frequency domain for a window of time, and the two amplitude peaks are identified by comparing the electrical signal in the frequency domain for the window of time to frequency domain data associated with previous pairs of amplitude peaks corresponding to previous fracture initiations.

In some examples of the method and non-transient computer-readable storage medium described herein the sensor samples at greater than 1 kHz, and the sensor is one of an acoustic or vibration or piezoelectric sensor.

Other aspects of the disclosure can include a non-transitory, tangible computer readable storage medium, encoded with processor readable instructions to perform a method for determining cluster efficiency during hydraulic fracturing operations, the method comprising: converting the acoustic vibrations into an electrical signal in a time domain; recording the electrical signal to a memory; identifying a fracture initiation from the electrical signal in the time domain via identification of two amplitude peaks occurring within a threshold period of time of each other; measuring a time between the two amplitude peaks; dividing the time by two to give a result; multiplying the result by a speed of sound in the fracking fluid to give a distance between the fracture initiation and a plug at an end of a current fracking stage of the well; and using the distance to create a cluster map of fracture initiations in the stage of the well. The non-transitory, tangible computer readable storage medium can further include the measuring is performed by a sensor coupled to the wellhead, circulating fluid line, or standpipe. The non-transitory, tangible computer readable storage medium, wherein the sensor samples at greater than 1 kHz. The non-transitory, tangible computer readable storage medium wherein the sensor is an acoustic sensor. The non-transitory, tangible computer readable storage medium wherein the two amplitude peaks are identified based on exceeding an amplitude threshold. The non-transitory, tangible computer readable storage medium, wherein the two amplitude peaks are identified based on a combination of amplitude and width. The non-transitory, tangible computer readable storage medium, wherein the measuring is performed by a sensor, and wherein the sensor is configured to be in contact with the fracking fluid in the well or with a surface of the circulating fluid line or the standpipe at the wellhead. The non-transitory, tangible computer readable storage medium, wherein the method further comprises: analyzing the electrical signal for the window of time in the frequency domain to identify the two amplitude peaks. The non-transitory, tangible computer readable storage medium wherein the method further comprises: performing the identifying based also on analysis of pressure sensor data during the window of time. The non-transitory, tangible computer readable storage medium wherein the analyzing is performed on a locally-hosted machine-learning system. The non-transitory, tangible computer readable storage medium wherein the electrical signal in the time domain is transported via a large area network to a remote server hosting a machine-learning system configured to perform the analyzing. The non-transitory, tangible computer readable storage medium wherein the method further comprises: adjusting parameters of subsequent fracking operations to improve cluster efficiency of fracture initiations. The non-transitory, tangible computer readable storage medium wherein the method further comprises: storing the distance from the fracture initiation to the plug with other distances from prior fracture initiations to the plug, and referenced to different plug positions such that a mapping of fracture initiations in clusters associated with each plug position can be determined for a fracking stage. The non-transitory, tangible computer readable storage medium wherein, measuring a time between the two amplitude peaks comprises measuring a time between a maximum of a first of the two peaks and a maximum of a second of the two peaks. The non-transitory, tangible computer readable storage medium wherein, the speed of sound in the fracking fluid is a function of arrival time of a primary wave from the fracture initiation and arrival time of a reflected wave from the fracture initiation after reflecting off the plug. The non-transitory, tangible computer readable storage medium wherein, the speed of sound, S, in the fracking fluid is:

$$S=(G+P)+2(F+E)/(A_2-A_1),$$

where G is a firing depth of a perforation gun, P is a depth of the plug, F is a distance between the sensor and the wellhead, E is a distance from the sensor to a fluid end at the surface of the well, $A_1$ is the arrival time of the primary wave from the fracture initiation, and $A_2$ is the arrival time of the reflected wave from the fracture initiation and reflected off the plug.

The non-transitory, tangible computer readable storage medium wherein, the electrical signal is transformed from the time domain to the frequency domain for a window of time, and the two amplitude peaks are identified by comparing the electrical signal in the frequency domain for the window of time to frequency domain data associated with previous pairs of amplitude peaks corresponding to previous fracture initiations.

Another aspect of the disclosure can be described as a non-transitory, tangible computer readable storage medium, encoded with processor readable instructions to perform a method of more evenly dispersing fractures within fracture clusters during hydraulic fracturing operations, the method comprising: pumping fracking fluid into a stage of a well; measuring acoustic vibrations in fracking fluid in a wellhead, circulating fluid line, or standpipe of the well; converting the acoustic vibrations into an electrical signal in a time domain; recording the electrical signal to a memory; identifying a fracture initiation from a current frequency domain spectrum via a machine-learning system trained on previous frequency domain spectra measured as a result of previous fracture initiations and previously classified by the machine-learning system; analyzing the electrical signal in the time domain during a window of time and identifying two amplitude peaks corresponding to the fracture initiation found in the current frequency domain spectrum; measuring a time between the two amplitude peaks; dividing the time by two to give a result; multiplying the result by a speed of sound in fracking fluid thought to be near the fracture initiation to give a distance from the fracture initiation to a plug; and using the distance to create a cluster map of fracture initiations in the stage of the well; and adjusting a parameter of the hydraulic fracturing operations based on the cluster map to achieve more even dispersion of fractures in a subsequent stage. The non-transitory, tangible computer readable storage medium wherein, the measuring is performed by a sensor coupled to the wellhead, the circulating fluid line, or the standpipe. The non-transitory, tangible computer readable storage medium wherein, the sensor samples at greater than 1 kHz. The non-transitory, tangible computer readable storage medium wherein, the sensor is an acoustic sensor. The non-transitory, tangible computer readable storage medium wherein, the two amplitude peaks are identified based on exceeding an amplitude threshold. The non-transitory, tangible computer readable storage medium wherein, the two amplitude peaks are identified based on a combination of amplitude and width. The non-transitory, tangible computer readable storage medium wherein, the two amplitude peaks are identified based on a frequency of the two amplitude peaks. The non-transitory, tangible computer readable storage medium wherein, the measuring is performed by a sensor, and wherein the sensor is configured to be in contact with the fracking fluid in the well or with a surface of the circulating fluid line or a surface of the standpipe at the wellhead. The non-transitory, tangible computer readable storage medium wherein, the method further comprises: performing the identifying based also on analysis of pressure sensor data during the window of time. The non-transitory, tangible computer readable storage medium wherein, the analyzing is performed on a locally-hosted machine-learning system. The non-transitory, tangible computer readable storage medium wherein, the electrical signal in the time domain is transported via a large area network to a remote server hosting a machine-learning system configured to perform the analyzing. The non-transitory, tangible computer readable storage medium wherein, the method further comprises storing the distance from the fracture initiation to the plug with other distances from prior fracture initiations to the plug, and referenced to different plug positions such that a mapping of fracture initiations in clusters associated with each plug position can be determined for a fracking stage. The non-transitory, tangible computer readable storage medium wherein, measuring a time between the two amplitude peaks comprises measuring a time between a maximum of a first of the two peaks and a maximum of a second of the two peaks. The non-transitory, tangible computer readable storage medium wherein, the speed of sound in the fracking fluid is a function of arrival time of a primary wave from the fracture initiation and arrival time of a reflected wave from the fracture initiation after reflecting off the plug. The non-transitory, tangible computer readable storage medium wherein, the speed of sound, S, in the fracking fluid is:

$$S=(G+P)+2(F+E)/(A_2-A_1),$$

where G is a firing depth of a perforation gun, P is a depth of the plug, F is a distance between the sensor and the wellhead, E is a distance from the sensor to a fluid end at the surface of the well, $A_1$ is the arrival time of the primary wave from the fracture initiation, and $A_2$ is the arrival time of the reflected wave from the fracture initiation and reflected off the plug.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

As used herein, the recitation of "at least one of A, B and C" is intended to mean "either A, B, C or any combination of A, B and C." The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A system for determining cluster efficiency during hydraulic fracturing operations, the system comprising:
   a sensor coupled to a fracking wellhead, circulating fluid line, or standpipe of a well and configured to convert acoustic vibrations measured in fracking fluid in the fracking wellhead, circulating fluid line, or standpipe into an electrical signal in a time domain;
   a memory configured to store the electrical signal;
   a machine-learning system trained on previous electrical signals measured as a result of previous fracture initiations, the machine-learning system comprising tangible non-transient computer readable media encoded with processor reasonable instructions that when executed cause the machine-learning system to:
      analyze the electrical signal in the time domain for a window of time and identify two amplitude peaks corresponding to a fracture initiation, a first of the two amplitude peaks corresponding to an arrival time of a primary wave generated by the fracture initiation, a second of the two amplitude peaks corresponding to an arrival time of a reflected wave generated by the fracture initiation and reflected off a plug at an end of a current fracking stage of the well;
      measure a time between the two amplitude peaks;
      divide the time by two to give a result;
      multiply the result by a speed of sound in the fracking fluid to give a distance from the fracture initiation to the plug; and
   a user interface configured to return a location of the fracture initiation to an operator based on the distance between the fracture initiation and the plug.

2. The system of claim 1, wherein the sensor samples at greater than 1 kHz.

3. The system of claim 1, wherein the sensor is an acoustic sensor.

4. The system of claim 1, wherein the two amplitude peaks are identified based on exceeding an amplitude threshold.

5. The system of claim 1, wherein the two amplitude peaks are identified based on a combination of amplitude and width.

6. The system of claim 1, wherein the two amplitude peaks are identified based on a frequency of the two amplitude peaks.

7. The system of claim 1, wherein the sensor is configured to be in contact with the fracking fluid in the well or with a surface of the circulating fluid line or the standpipe at the wellhead.

8. The system of claim 1, further comprising analyzing the electrical signal for the window of time in the frequency domain to identify the two amplitude peaks.

9. The system of claim 1, further comprising measuring and analyzing pressure sensor data during the window of time.

10. The system of claim 1, wherein the machine-learning system is hosted on a local server.

11. The system of claim 1, wherein the electrical signal is transported via a large area network to a remote machine-learning system.

12. The system of claim 1, wherein the distance from the fracture initiation to the plug is stored with other distances from prior fracture initiations to corresponding plugs, and referenced to different plug positions such that a mapping of fracture initiations in clusters associated with each plug position can be determined for a fracking stage.

13. The system of claim 1, further comprising:

a wellbore with a casing; and a fracking pump.

14. The system of claim 1, wherein to measure a time between the two amplitude peaks comprises measuring a time between a maximum of a first of the two peaks and a maximum of a second of the two peaks.

15. The system of claim 1, wherein the speed of sound in the fracking fluid is a function of arrival time of a primary wave from the fracture initiation and arrival time of a reflected wave from the fracture initiation after reflecting off the plug.

16. The system of claim 15, wherein the speed of sound, S, in the fracking fluid is:

$$S=(G+P)+2(F+E)/(A_2-A_1),$$

where G is a firing depth of a perforation gun, P is a depth of the plug, F is a distance between the sensor and the wellhead, E is a distance from the sensor to a fluid end at the surface of the well, $A_1$ is the arrival time of the primary wave from the fracture initiation, and $A_2$ is the arrival time of the reflected wave from the fracture initiation and reflected off the plug.

17. The system of claim 1, wherein the electrical signal is transformed from the time domain to the frequency domain for the window of time, and the two amplitude peaks are identified by comparing the electrical signal in the frequency domain for the window of time to frequency domain data associated with previous pairs of amplitude peaks corresponding to previous fracture initiations.

18. A method of determining cluster efficiency during hydraulic fracturing operations, the method comprising:

measuring acoustic vibrations in fracking fluid in a fracking wellhead, circulating fluid line, or standpipe of a well;

converting the acoustic vibrations into an electrical signal in a time domain;

recording the electrical signal to a memory;

analyzing the electrical signal in the time domain for a window of time and identifying two amplitude peaks corresponding to a fracture initiation;

measuring a time between the two amplitude peaks;

dividing the time by two to give a result;

multiplying the result by a speed of sound in the fracking fluid to give a distance between the fracture initiation and a plug at an end of a current fracking stage of the well; and returning a location of the fracture initiation to an operator based on the distance between the fracture initiation and the plug.

19. The method of claim 18, wherein the measuring is performed by a sensor coupled to the wellhead, circulating fluid line, or standpipe.

20. The method of claim 19, wherein the sensor samples at greater than 1 kHz.

21. The method of claim 19, wherein the sensor is an acoustic sensor.

22. The method of claim 18, wherein the two amplitude peaks are identified based on exceeding an amplitude threshold.

23. The method of claim 18, wherein the two amplitude peaks are identified based on a combination of amplitude and width.

24. The method of claim 18, wherein the two amplitude peaks are identified based on a frequency of the two amplitude peaks.

25. The method of claim 18, wherein the measuring is performed by a sensor, and wherein the sensor is configured to be in contact with the fracking fluid in the well or with a surface of the circulating fluid line or the standpipe at the wellhead.

26. The method of claim 18, further comprising analyzing the electrical signal for the window of time in the frequency domain to identify the two amplitude peaks.

27. The method of claim 26, further comprising identifying the fracture initiation from the electrical signal via a machine-learning system trained on previous frequency domain spectra measured as a result of previous fracture initiations and previously classified by the machine-learning system.

28. The method of claim 26, wherein the electrical signal is transformed from the time domain to the frequency domain for a window of time, and the two amplitude peaks are identified by comparing the electrical signal in the frequency domain for the window of time to frequency domain data associated with previous pairs of amplitude peaks corresponding to previous fracture initiations.

29. The method of claim 18, further comprising performing the identifying based also on analysis of pressure sensor data during the window of time.

30. The method of claim 18, wherein the analyzing is performed on a locally-hosted machine-learning system.

31. The method of claim 18, wherein the electrical signal in the time domain is transported via a large area network to a remote server hosting a machine-learning system configured to perform the analyzing.

32. The method of claim 18, further comprising adjusting parameters of subsequent fracking operations to improve cluster efficiency of fracture initiations.

33. The method of claim 18, further comprising storing the distance from the fracture initiation to the plug with other distances from prior fracture initiations to the plug, and referenced to different plug positions such that a mapping of fracture initiations in clusters associated with each plug position can be determined for a fracking stage.

34. The method of claim 18, wherein measuring a time between the two amplitude peaks comprises measuring a time between a maximum of a first of the two peaks and a maximum of a second of the two peaks.

35. The method of claim 18, wherein the speed of sound in the fracking fluid is a function of arrival time of a primary wave from the fracture initiation and arrival time of a reflected wave from the fracture initiation after reflecting off the plug.

36. The method of claim 35, wherein the speed of sound, S, in the fracking fluid is:

$$S=(G+P)+2(F+E)/(A_2-A_1),$$

where G is a firing depth of a perforation gun, P is a depth of the plug, F is a distance between the sensor and the wellhead, E is a distance from the sensor to a fluid end at the surface of the well, $A_1$ is the arrival time of the primary wave from the fracture initiation, and $A_2$ is the arrival time of the reflected wave from the fracture initiation and reflected off the plug.

37. A method of more evenly dispersing fractures within fracture clusters during hydraulic fracturing operations, the method comprising:
pumping fracking fluid into a stage of a well;
measuring acoustic vibrations in fracking fluid in a wellhead, circulating fluid line, or standpipe of the well;
converting the acoustic vibrations into an electrical signal in a time domain;
recording the electrical signal to a memory;
identifying a fracture initiation from the electrical signal in the time domain via identification of two amplitude peaks occurring within a threshold period of time of each other;
measuring a time between the two amplitude peaks;
dividing the time by two to give a result;
multiplying the result by a speed of sound in the fracking fluid to give a distance between the fracture initiation and a plug at an end of a current fracking stage of the well;
using the distance to create a cluster map of fracture initiations in the stage of the well; and
adjusting a parameter of the hydraulic fracturing operations based on the cluster map to achieve more even dispersion of fractures in a subsequent stage.

38. The method of claim 37, wherein the measuring is performed by a sensor coupled to the wellhead, the circulating fluid line, or the standpipe.

39. The method of claim 38, wherein the sensor samples at greater than 1 kHz.

40. The method of claim 38, wherein the sensor is an acoustic sensor.

41. The method of claim 37, wherein the two amplitude peaks are identified based on exceeding an amplitude threshold.

42. The method of claim 37, wherein the two amplitude peaks are identified based on a combination of amplitude and width.

43. The method of claim 37, wherein the two amplitude peaks are identified based on a frequency of the two amplitude peaks.

44. The method of claim 37, wherein the measuring is performed by a sensor, and wherein the sensor is configured to be in contact with the fracking fluid in the well or with a surface of the circulating fluid line or the standpipe at the wellhead.

45. The method of claim 37, further comprising analyzing the electrical signal for the window of time in the frequency domain to identify the two amplitude peaks.

46. The method of claim 45, further comprising identifying the fracture initiation from the electrical signal via a machine-learning system trained on previous frequency domain spectra measured as a result of previous fracture initiations and previously classified by the machine-learning system.

47. The method of claim 45, wherein the electrical signal is transformed from the time domain to the frequency domain for a window of time, and the two amplitude peaks are identified by comparing the electrical signal in the frequency domain for the window of time to frequency domain data associated with previous pairs of amplitude peaks corresponding to previous fracture initiations.

48. The method of claim 37, further comprising performing the identifying based also on analysis of pressure sensor data during the window of time.

49. The method of claim 37, wherein the analyzing is performed on a locally-hosted machine-learning system.

50. The method of claim 37, wherein the electrical signal in the time domain is transported via a large area network to a remote server hosting a machine-learning system configured to perform the analyzing.

51. The method of claim 37, further comprising adjusting parameters of subsequent fracking operations to improve cluster efficiency of fracture initiations.

52. The method of claim 37, further comprising storing the distance from the fracture initiation to the plug with other distances from prior fracture initiations to the plug, and referenced to different plug positions such that a mapping of fracture initiations in clusters associated with each plug position can be determined for a fracking stage.

53. The method of claim 37, wherein measuring a time between the two amplitude peaks comprises measuring a time between a maximum of a first of the two peaks and a maximum of a second of the two peaks.

54. The method of claim 37, wherein the speed of sound in the fracking fluid is a function of arrival time of a primary wave from the fracture initiation and arrival time of a reflected wave from the fracture initiation after reflecting off the plug.

55. The method of claim 54, wherein the speed of sound, S, in the fracking fluid is:

$$S=(G+P)+2(F+E)/(A_2-A_1),$$

where G is a firing depth of a perforation gun, P is a depth of the plug, F is a distance between the sensor and the wellhead, E is a distance from the sensor to a fluid end at the surface of the well, $A_1$ is the arrival time of the primary wave from the fracture initiation, and $A_2$ is the arrival time of the reflected wave from the fracture initiation and reflected off the plug.

* * * * *